(12) United States Patent
Elazzouni et al.

(10) Patent No.: US 11,711,743 B1
(45) Date of Patent: Jul. 25, 2023

(54) ARCHITECTURE AND PROTOCOLS TO SUPPORT INDUSTRIAL INTERNET OF THINGS AND WIRELESS PROGRAMMABLE LOGIC CONTROLLER COMMUNICATIONS

(71) Applicant: QUALCOMM Incorporated, San Diego, CA (US)

(72) Inventors: Sherif Elazzouni, San Diego, CA (US); Ozcan Ozturk, San Diego, CA (US); Karl Georg Hampel, Jersey City, NJ (US); Rajat Prakash, San Diego, CA (US); Fatih Ulupinar, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/681,540

(22) Filed: Feb. 25, 2022

(51) Int. Cl.
*H04W 40/22* (2009.01)
*H04L 45/16* (2022.01)
*H04L 45/24* (2022.01)
*H04W 76/15* (2018.01)

(52) U.S. Cl.
CPC ............ *H04W 40/22* (2013.01); *H04L 45/16* (2013.01); *H04L 45/24* (2013.01); *H04W 76/15* (2018.02)

(58) Field of Classification Search
CPC ............................. H04W 40/22; H04W 76/15
See application file for complete search history.

(56) References Cited

U.S. PATENT DOCUMENTS

| 2012/0254389 | A1* | 10/2012 | Amemiya | H04L 67/141 709/223 |
| 2012/0328038 | A1* | 12/2012 | Ebisuzaki | H04L 67/1097 375/267 |
| 2014/0286156 | A1* | 9/2014 | Kohli | H04W 56/00 370/252 |
| 2020/0029384 | A1* | 1/2020 | Hong | H04W 36/305 |

* cited by examiner

Primary Examiner — Bryan Y Lee
(74) Attorney, Agent, or Firm — Holland & Hart / Qualcomm

(57) ABSTRACT

Methods, systems, and devices for wireless communications are described. A wireless device may establish connectivity between the wireless device and a user equipment (UE) via a first communication path, and between the wireless device and the UE via a second communication path that includes a relay device. The wireless device may transmit, via the first communication path, a first message in a first format to the UE, including first data, and transmit, via the second communication path to the relay device, a second message in a second format and including the first data, the second format indicating that the relay device is to relay the first data to the UE. The relay device may receive, via a first portion of the second communication path, the first message and may transmit, to the UE via a second portion of the second path, a second message including the first data.

20 Claims, 35 Drawing Sheets

ARCHITECTURE AND PROTOCOLS TO SUPPORT INDUSTRIAL INTERNET OF THINGS AND WIRELESS PROGRAMMABLE LOGIC CONTROLLER COMMUNICATIONS

FIELD OF TECHNOLOGY

The following relates to wireless communications, including architecture and protocols to support industrial internet of things (IoT) and wireless programmable logic controller (PLC) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, (e.g., internet of things (IoT), factories) Programmable Logic Controllers (PLC) and Sensors/Actuator (S/A) units may communicate with each other. For example, the PLC and S/A units may have traditionally been implemented as UEs (e.g., wirelessly connected to a common base station), thus, making the PLC-S/A connection a UE-UE PC5 sidelink. However, in some wireless communications systems, the PLC may act as a 5G-NR femtocell (e.g., a base station with modified capabilities). In such examples, the connection between PLC and S/A may be a traditional Uu link.

SUMMARY

The described techniques relate to improved methods, systems, devices, and apparatuses that support architecture and protocols to support industrial internet of things (IoT) and wireless programmable logic controller (PLC) communications. Generally, the described techniques provide for multi-path communications in industrial networks. Direct Uu communications between a PLC and an S/A may be subject to blocking or degradation of radio conditions that may impact communication reliability between the PLC and the S/A (e.g., may cause blocking or radio link degradation in critical industrial applications, or both).

To mitigate these issues a central base station may be implemented that manages multiple PLCs and may be associated with higher reliability radio channel connection to the nodes (e.g., PLCs and SAs) in the network (e.g., may be less susceptible to blocking or degradation due to location). This central base station may relay communications between the PLC and the S/A offering a backup multi-hop path between PLC and S/A that is more reliable than the direct path. However, this path may be associated with more latency because the path contains at least two hops, and the path may be limited by capacity because a small number of nodes may communicate with the central base station at a same time. Thus, it may be beneficial to utilize two paths for reliable efficient transmission, where for example, most (e.g., default) transmissions occur on the direct PLC-SA path, and upon failure may occur on the alternate multi-hop path. Alternatively, low-latency high reliability traffic may benefit from duplication and transmission on the direct and the two-hop path. Dynamic path control may be utilized to balance capacity and latency.

A method for wireless communication at wireless device is described. The method may include establishing connectivity between the wireless device and a user equipment (UE) via a first communication path, and between the wireless device and the UE via a second communication path that includes a relay device, transmitting, via the first communication path, a first message in a first format to the UE, the first message including first data, and transmitting, via the second communication path to the relay device, a second message in a second format and including the first data, the second format indicating that the relay device is to relay the first data to the UE.

An apparatus for wireless communication at wireless device is described. The apparatus may include a processor, memory coupled with the processor, and instructions stored in the memory. The instructions may be executable by the processor to cause the apparatus to establish connectivity between the wireless device and a UE via a first communication path, and between the wireless device and the UE via a second communication path that includes a relay device, transmit, via the first communication path, a first message in a first format to the UE, the first message including first data, and transmit, via the second communication path to the relay device, a second message in a second format and including the first data, the second format indicating that the relay device is to relay the first data to the UE.

Another apparatus for wireless communication at wireless device is described. The apparatus may include means for establishing connectivity between the wireless device and a UE via a first communication path, and between the wireless device and the UE via a second communication path that includes a relay device, means for transmitting, via the first communication path, a first message in a first format to the UE, the first message including first data, and means for transmitting, via the second communication path to the relay device, a second message in a second format and including the first data, the second format indicating that the relay device is to relay the first data to the UE.

A non-transitory computer-readable medium storing code for wireless communication at wireless device is described. The code may include instructions executable by a processor to establish connectivity between the wireless device and a UE via a first communication path, and between the wireless device and the UE via a second communication path that includes a relay device, transmit, via the first communication path, a first message in a first format to the UE, the first message including first data, and transmit, via the second communication path to the relay device, a second message in a second format and including the first data, the second format indicating that the relay device is to relay the first data to the UE.

In some examples of the method, apparatuses, and non-transitory computer-readable medium described herein, establishing the connectivity between the wireless device and the UE via the first communication path may include operations, features, means, or instructions for transmitting a connection configuration message based on a management layer determination to establish the first communication path and receiving a configuration response message indicating a network address associated with the UE via the first communication path based on the connection configuration message.

In some examples of the method, apparatuses, and non-transitory computer-readable medium described herein, establishing the connectivity between the wireless device and the UE via the second communication path may include operations, features, means, or instructions for transmitting, to the relay device, a first connection configuration message based on a management layer determination to establish the second communication path and receiving, from the relay device, a configuration response message indicating a forwarding network address associated with the second communication path based on the first connection configuration message.

In some examples of the method, apparatuses, and non-transitory computer-readable medium described herein, establishing the connectivity between the wireless device and the UE via the first communication path may include operations, features, means, or instructions for transmitting, to the relay device, a message transfer request for establishing a bearer context for communicating with the UE via the first communication path, receiving, from the relay device, a bearer context configuration for communicating bearer traffic between the wireless device and the UE based on the message transfer request, and transmitting, to the UE, a configuration message indicating the bearer context configuration, where the first data transmitted via the first communication path may be bearer data.

In some examples of the method, apparatuses, and non-transitory computer-readable medium described herein, establishing the connectivity between the wireless device and the UE via the second communication path may include operations, features, means, or instructions for forwarding, to the relay device, a measurement report based on receiving the measurement report from the UE, receiving, from the relay device, a connection configuration transfer message for a secondary cell addition procedure, and transmitting, to the relay device, a first connection configuration message based on receiving the connection configuration transfer message.

In some examples of the method, apparatuses, and non-transitory computer-readable medium described herein, the second message may be transmitted via an X2 interface between the wireless device and the relay device.

Some examples of the method, apparatuses, and non-transitory computer-readable medium described herein may further include operations, features, means, or instructions for receiving a negative feedback message from the UE or determining that the first message was associated with an error, where the second message may be transmitted based on the negative feedback message or the error.

In some examples of the method, apparatuses, and non-transitory computer-readable medium described herein, a central unit of the wireless device includes a user plane.

In some examples of the method, apparatuses, and non-transitory computer-readable medium described herein, the central unit of the wireless device further includes a control plane.

In some examples of the method, apparatuses, and non-transitory computer-readable medium described herein, the wireless device includes a programmable logic controller, an integrated access and backhaul node, or a base station.

In some examples of the method, apparatuses, and non-transitory computer-readable medium described herein, the relay device includes a central base station or a donor base station connected to an internet provider or a network entity.

In some examples of the method, apparatuses, and non-transitory computer-readable medium described herein, the first message and the second message may be transmitted simultaneously.

A method for wireless communication at a relay device is described. The method may include receiving, from a wireless device via a first portion of a path, a first message in a first format and including a first data, the first format indicating that the relay device is to relay the first data to a UE, the first portion associated with a first type of communications link and transmitting, to the UE via a second portion of the path, a second message in a second format and including the first data, the second portion associated with a second type of communications link.

An apparatus for wireless communication at a relay device is described. The apparatus may include a processor, memory coupled with the processor, and instructions stored in the memory. The instructions may be executable by the processor to cause the apparatus to receive, from a wireless device via a first portion of a path, a first message in a first format and including a first data, the first format indicating that the relay device is to relay the first data to a UE, the first portion associated with a first type of communications link and transmit, to the UE via a second portion of the path, a second message in a second format and including the first data, the second portion associated with a second type of communications link.

Another apparatus for wireless communication at a relay device is described. The apparatus may include means for receiving, from a wireless device via a first portion of a path, a first message in a first format and including a first data, the first format indicating that the relay device is to relay the first data to a UE, the first portion associated with a first type of communications link and means for transmitting, to the UE via a second portion of the path, a second message in a second format and including the first data, the second portion associated with a second type of communications link.

A non-transitory computer-readable medium storing code for wireless communication at a relay device is described. The code may include instructions executable by a processor to receive, from a wireless device via a first portion of a path, a first message in a first format and including a first data, the first format indicating that the relay device is to relay the first data to a UE, the first portion associated with a first type of communications link and transmit, to the UE via a second portion of the path, a second message in a second format and including the first data, the second portion associated with a second type of communications link.

Some examples of the method, apparatuses, and non-transitory computer-readable medium described herein may further include operations, features, means, or instructions for receiving, from the wireless device, a first connection configuration message based on a management layer determination to establish the path and transmitting, to the wireless device, a configuration response message indicating a forwarding network address associated with the path based on the first connection configuration message.

Some examples of the method, apparatuses, and non-transitory computer-readable medium described herein may further include operations, features, means, or instructions for receiving, from the wireless device, a measurement report associated with the UE, transmitting, to the wireless device, a connection configuration transfer message for a secondary cell addition procedure, and receiving, from the wireless device, a first connection configuration message based on receiving the connection configuration transfer message.

In some examples of the method, apparatuses, and non-transitory computer-readable medium described herein, the second message in the second format may be transmitted via L2 radio link control signaling, L3 internet protocol signaling, or L2 backhaul adaption protocol signaling.

A method for wireless communication at a UE is described. The method may include establishing connectivity between the UE and a wireless device via a first communication path, and between the UE and the wireless device via a second communication path that includes a relay device, receiving, via the first communication path from the wireless device, a first message in a first format, the first message including first data, and receiving, via the second communication path from the relay device, a second message in a second format and including the first data, the second format indicating that the relay device is to relay the first data to the UE.

An apparatus for wireless communication at a UE is described. The apparatus may include a processor, memory coupled with the processor, and instructions stored in the memory. The instructions may be executable by the processor to cause the apparatus to establish connectivity between the UE and a wireless device via a first communication path, and between the UE and the wireless device via a second communication path that includes a relay device, receive, via the first communication path from the wireless device, a first message in a first format, the first message including first data, and receive, via the second communication path from the relay device, a second message in a second format and including the first data, the second format indicating that the relay device is to relay the first data to the UE.

Another apparatus for wireless communication at a UE is described. The apparatus may include means for establishing connectivity between the UE and a wireless device via a first communication path, and between the UE and the wireless device via a second communication path that includes a relay device, means for receiving, via the first communication path from the wireless device, a first message in a first format, the first message including first data, and means for receiving, via the second communication path from the relay device, a second message in a second format and including the first data, the second format indicating that the relay device is to relay the first data to the UE.

A non-transitory computer-readable medium storing code for wireless communication at a UE is described. The code may include instructions executable by a processor to establish connectivity between the UE and a wireless device via a first communication path, and between the UE and the wireless device via a second communication path that includes a relay device, receive, via the first communication path from the wireless device, a first message in a first format, the first message including first data, and receive, via the second communication path from the relay device, a second message in a second format and including the first data, the second format indicating that the relay device is to relay the first data to the UE.

Some examples of the method, apparatuses, and non-transitory computer-readable medium described herein may further include operations, features, means, or instructions for transmitting, to the wireless device via the first communication path or the second communication path, a negative feedback message, where receiving the second message may be based on transmitting the negative feedback message.

DETAILED DESCRIPTION

Figure 1:
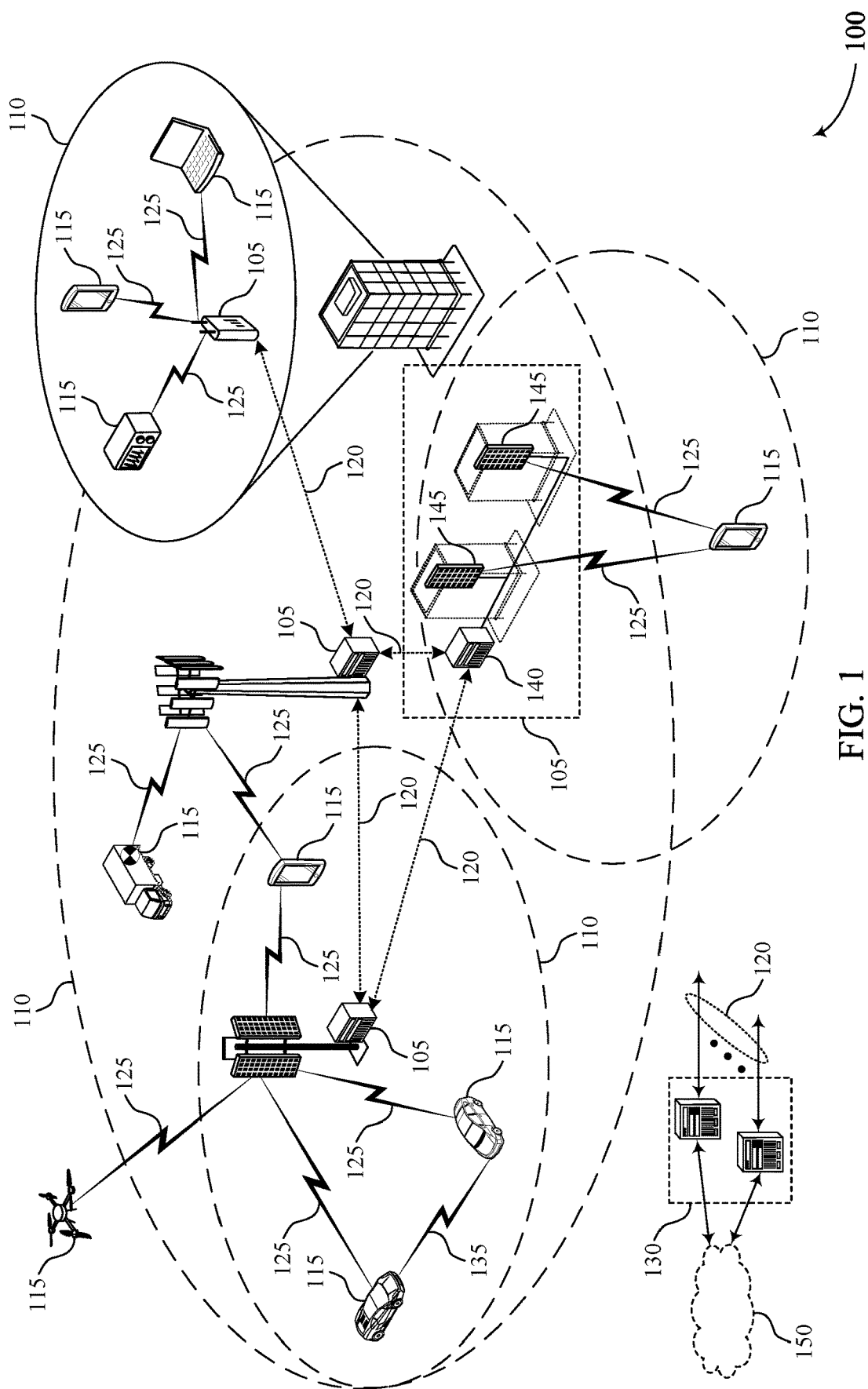
FIG. 1 illustrates an example of a wireless communications system that supports architecture and protocols to support industrial internet of things (IoT) and wireless programmable logic controller (PLC) communications in accordance with aspects of the present disclosure.

In some wireless communications systems, e.g., internet of things (IoT), factories, etc.) Programmable Logic Controllers (PLC) and Sensors/Actuator (S/A) units may communicate with each other. For example, the PLC and S/A units may have traditionally been implemented as UEs (e.g., wirelessly connected to a common gNB), thus, making the PLC-S/A connection a UE-UE PC5 sidelink. However, in some wireless communications systems, the PLC may act as a 5G-NR femtocell (e.g., a base station with modified capabilities). In such examples, the connection between PLC and S/A may be a traditional Uu link.

Direct Uu communications between a PLC and an S/A may be subject to blocking or degradation of radio conditions that may impact communication reliability between the PLC and the S/A (e.g., may cause blocking or radio link degradation in critical industrial applications, or both).

To mitigate these issues a central base station may be implemented that manages multiple PLCs and may be associated with higher reliability radio channel connection to the nodes (e.g., PLCs and S/As) in the network (e.g., may be less susceptible to blocking or degradation due to location). This central base station may relay communications between the PLC and the S/A offering a backup multi-hop path between PLC and S/A that is more reliable than the direct path. However, this path may be associated with more latency because the path contains at least two hops, and the path may be limited by capacity because a small number of nodes may communicate with the central base station at a same time.

Thus, it may be beneficial to utilize two paths for reliable efficient transmission, where for example, most (e.g., default) transmissions occur on the direct PLC-S/A path, and upon failure may occur on the alternate multi-hop path. Alternatively, low-latency high reliability traffic that is very critical may benefit from duplication and transmission on the direct and the two-hop path. Dynamic path control may be utilized to balance capacity and latency. By mixing and matching the design options (e.g., message formats, relay device configuration, transmission aggregation, path configuration, PLC components, forwarding configurations, path management configurations, among other examples), there may be at least five viable options that may be used to realize the PLC-S/A Uu communications link in an industrial network.

Particular aspects of the subject matter described in this disclosure may be implemented to realize one or more of the following potential advantages. The techniques employed by the described communication devices may provide benefits and enhancements to the operation of the communication devices, including high-reliability, low-latency communications. For example, transmitting, via a second communication path to the relay device, a second message in a second format and comprising the first data, the second format indicating that the relay device is to relay the first data to the UE may provide improvements to Uu communications between a PLC and an S/A by increasing the likelihood a data packet will be successfully transmitted by supporting an additional communication paths for increased communication diversity. In some implementations, establishing multiple connectivities provides at least a second path for communications when a first path has a poor connection or for redundancy when a data packet has a high priority, among other examples thereby increasing reliability. In some other implementations, establishing multiple communication paths by transmitting a connection configuration message may also support improvements to low latency communications, power consumption, and spectral efficiency, among other benefits by providing additional pathways for communications that may be utilized when a first path is unreliable or experiences interference. In some examples, transmitting, by a relay device to the UE via a second portion of the second path, a second message in a second format and including the first data, the second portion associated with a second type of communications link may increase the likelihood that the first data will be received by the UE from the PLC.

Aspects of the disclosure are initially described in the context of wireless communications systems. Aspects of the disclosure are further discussed in the context of plane configuration, protocol stack configurations, and process flows. Aspects of the disclosure are further illustrated by and described with reference to apparatus diagrams, system diagrams, and flowcharts that relate to architecture and protocols to support industrial IoT and wireless PLC communications.

FIG. 1 illustrates an example of a wireless communications system 100 that supports architecture and protocols to support industrial IoT and wireless PLC communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by other base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from other base stations 105 may be approximately aligned in time. For asynchronous operation, the base stations 105 may have different frame timings, and transmissions from other base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may be an example of an industrial network that operates according to one or more layered protocol stacks at each of a number of devices. For example, the wireless communications system 100 may include a PLC coupled with a base station 105 and in communications with one or more other base stations 105 and S/As which may be examples of or have similar functionality to a UE 115. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a PLC coupled with a base station 105 may communication directly with an S/A 115 or may communicate indirectly with an S/A 115 via a donor base station 105 that is physically located in the wireless communications system 100 at a position that is unlikely to experience interference with other devices of the network (e.g., may be located on a ceiling of the industrial network). The donor base station 105 may be an example of a relay device 105.

In some examples, a PLC of the wireless communications system 100 may establish connectivity between the PLC and a UE 115 (e.g., an S/A) via a first communication path (e.g., via a direct communication path), and between the PLC and the UE 115 via a second communication path that includes a relay device 105. The PLC may transmit, via the direct communication path to the UE 115, first data in a first message according to a first format, and may transmit, via the second communication path to the relay device 105, the first data in a second message having a second format, where the second format indicates to the relay device 105 that the relay device is to relay the first data to the UE 115.

The relay device 105 may receive the first message via a first portion of the second path associated with a first type of communications link, and may transmit, to the UE 115 via a second portion of the second path, the first data in a third message according to a third format, where the second portion of the second path may be associated with a second type of communications link. In some examples, the UE 115 may receive the third message based on transmitting a negative feedback message associated with the first message.

Figure 2:
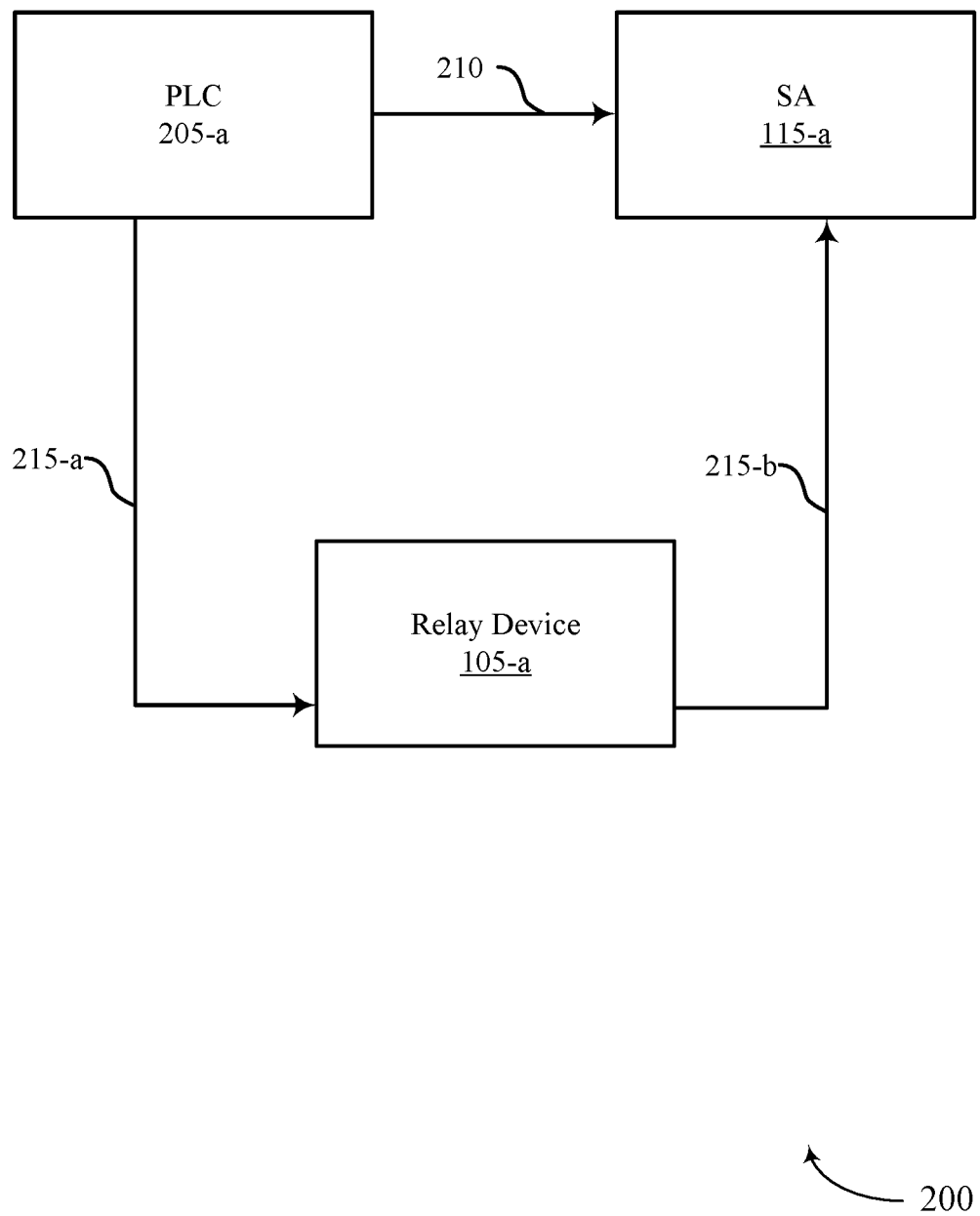
FIG. 2 illustrates an example of a wireless communications system that supports architecture and protocols to support industrial IoT and wireless PLC communications in accordance with aspects of the present disclosure.

FIG. 2 illustrates an example of a wireless communications system 200 that supports architecture and protocols to support industrial IoT and wireless PLC communications in accordance with aspects of the present disclosure. In some examples, wireless communications system 200 may implement aspects of wireless communications system 100. In wireless communications system 200, a PLC 205-a may communicate with an S/A 115-a (e.g., which may be an example of or may have similar functions as a UE 115 as described with reference to FIG. 1, or a device node) within the wireless communications system 200. The PLC 205-a may be associated with one or more base stations 105 and may issue a series of commands (e.g., motion commands for a piece of equipment), receive sensor inputs (e.g., position of a robotic arm of a piece of equipment), and coordinate with other PLCs. In some examples, the PLC 205-a may be an example of a base station 105 having a reduced functionality. The PLC 205-a may communicate directly with the S/A 115-a or may communicate with the S/A via a relay device 105-a. The relay device 105-b may be an example of a network entity (e.g., a base station 105) coupled with a core network servicing the wireless communications system 200. In some cases, the wireless communications system 200 may be located in an industrial setting, where the relay device 105-a may be configured for direct communications with the network of the industrial setting, and where each of the S/A 115-a and the PLC 205-a may be associated with a piece of equipment within the industrial setting, although techniques provided herein may be used in any on a number of other deployment scenarios.

In some examples, the wireless communications system 200 may support multi-path & multi-hop transmission and may further include PLC-NW traffic which may include traffic between a PLC and a network entity such as a ceiling base station 105 or a donor base station 105, which may act as a relay device 105-a for multi-hop communications. A first path, Path 1 210 may include PLC-S/A traffic and may be a direct path. A second path, Path 2 215 may include PLC-S/A traffic via a relay device and may be a multi-hop path including a first hop 215-a and a second hop 215-b.

That is, the wireless communications system 200 may include at least two-types of traffic. For example, PLC-S/A traffic may include command and control communications, sensor measurements, among other examples and PLC-NW traffic may include communications to and from an application server of the relay device 105-a or a management system of the relay device 105-a, among other examples. Communications between the PLC 205-a and the relay device 105-a may be similar to backhaul communications as described with reference to FIG. 1.

For example, a dynamic & adaptive multi-path mode may increase capacity, lower latency, and increase reliability of PLC-S/A traffic because a direct path may not guarantee continuous high reliability (e.g., $10^{-6}$ PER). Such a dynamic & adaptive multi-path mode may include dynamic/adaptive switching between communicating via a direct path and a two-hop path and may include aggregation of transmissions across paths (e.g., may include redundancy handling, packet duplicate removal, or failure reporting), and fast failure recovery (e.g., reacting to direct path blockage or shadowing, fast switching when a switching time is less than a survival time), among other examples.

Table 1 below outlines various options for protocol stack configurations at each device of the wireless communications system 200 and each option may support for multi-path-multi-hop transmissions by the PLC 205-a to the S/A 115-a.

| Options | PLC Cmpnts | S/A Cmpnts | NW-Assisted Path Forwarding | Path Mgmt & Ctrl | Aggregation/ RRC | Notes |
|---|---|---|---|---|---|---|
| Option 1 | PLC App DU CU (CP + UP) UPF | S/A app UE | L3 IP forwarding via UPF | Management Layer (above PDCP) | No disaggregation RRC managed by PLC | |
| Option 2 | PLC App DU CU (UP only) UPF | S/A app UE | L3 IP forwarding via UPF | Management Layer (above PDCP) | Disaggregated RRC managed by gNB (ceiling/donor) | |
| Option 3 | PLC App DU CU (UP only) UPF | S/A app UE | L2 RLC forwarding | PDCP duplication | Disaggregated RRC managed by gNB (ceiling/donor) | F1 connection between donor and PLC |
| Option 4 | PLC App DU CU (UP only) UPF | S/A app UE | L2 RLC forwarding | PDCP duplication | Non-disaggregated RRC managed by PLC | Xn between donor NE and PLC; PLC is SCG & NE is MCG; SN-terminated PDCP duplication |
| Option 5 | PLC App DU CU (UP + CP) UPF AMF, SMF | S/A app UE | L2 BAP forwarding | Management Layer (above PDCP), possibly included in UPF | Non disaggregated, PLC carries a small local "CN" and operates as a donor | Network in a box-type solution: complex PLC design |

Table 1 may include information for five different path architecture options, where each option may enable multi-path-multi-hop transmissions by the PLC 205-a to the S/A 115-a to support higher reliability communications. Each option may include a PLC architecture, an S/A architecture, a path forwarding configuration, a path management and control configuration, and an aggregation configuration.

For example, the PLC architecture may specify the components of a PLC 205-a operating according to each Option. For example, the PLC architecture may include a distributed unit (DU), or a centralized unit (CU), or both, or may include a UPF, and an AMF, or may specifically include a CP-CU or a UP-CU, or both, or any combination thereof, according to Table 1.

The S/A architecture may specify the components of the S/A. In the present disclosure the S/A is described as including application layers and UE functionality but it is to be understood that the techniques described herein may be implemented with any sort of S/A 115 or UE 115 deployed in an industrial setting, for example.

The path forwarding configuration may specify how the relay device 105-a (which may be an example of a central base station or a network entity that is coupled with the core network or the internet, among other examples) forwards or relays data received from the PLC 205-a to the S/A 115-a. For example, each option may specify whether the relay device 105-a reads L3 IP headers to forward the data or whether relay device 105-a can forward the data over the L2, or whether relay device 105-a employs backhaul adaptation protocol (BAP) functionality (e.g., for over-the-air (OTA) backhaul communications) from an IAB associated with the relay device 105-a.

The path management and control configuration may specify a layer in which path management is performed. For example, path management may be performed in an introduced upper layer above a PDCP layer of the relay device 105-a or performed in the PDCP layer, among other examples.

The aggregation configuration may specify whether the option implements aggregated or disaggregated control plane (CP) and user plane (UP) blocks. For example, disaggregation is a design principle where the CP and the UP blocks are physically located in different geographical areas (e.g., are incorporated in different nodes or devices). That is, one network component may have some CP functionality while other UP functionality is performed by a different network component. Aggregation or Disaggregation may specify where an RRC layer will be implemented (e.g., at the PLC 205-a or the relay device 105-a).

FIGS. 3 through 7 relate to Option 1. For example, Option 1 presents a non-disaggregated design where each PLC contains a separate CU-CP (e.g., CU-CP of PLC 205-b and CU-CP of relay device 105-b as depicted in the UP of FIG. 3A and the CP of FIG. 3B).

Figure 9A:
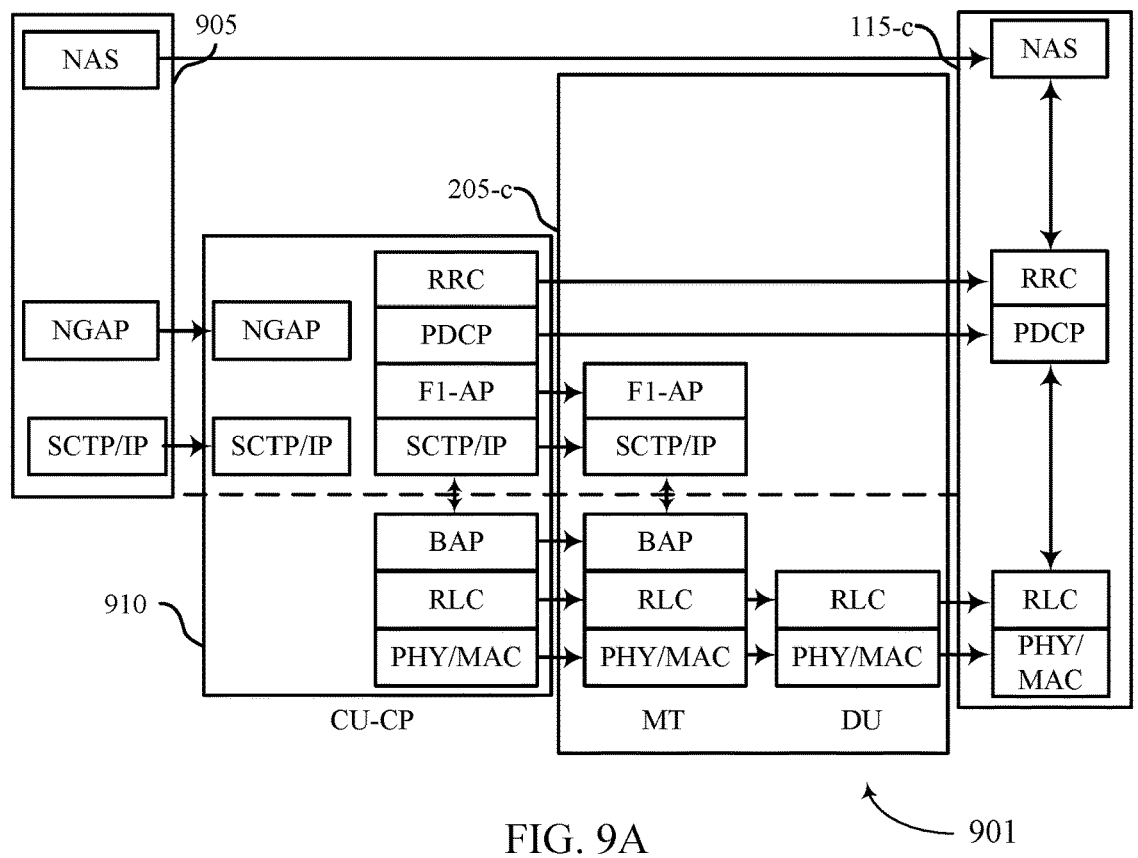
FIGS. 9A & 9B illustrate examples of a control plane protocol stack that supports architecture and protocols to support industrial IoT and wireless PLC communications in accordance with aspects of the present disclosure.
Figure 9B:
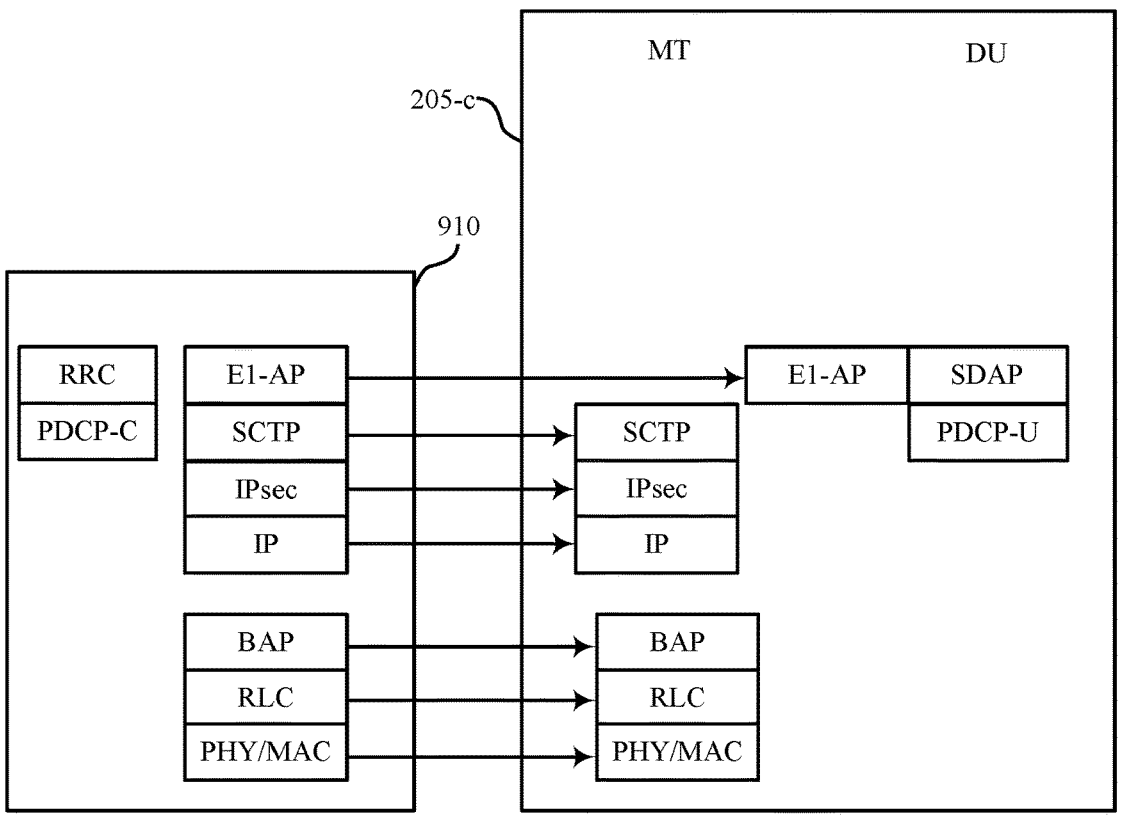
Figure 10:
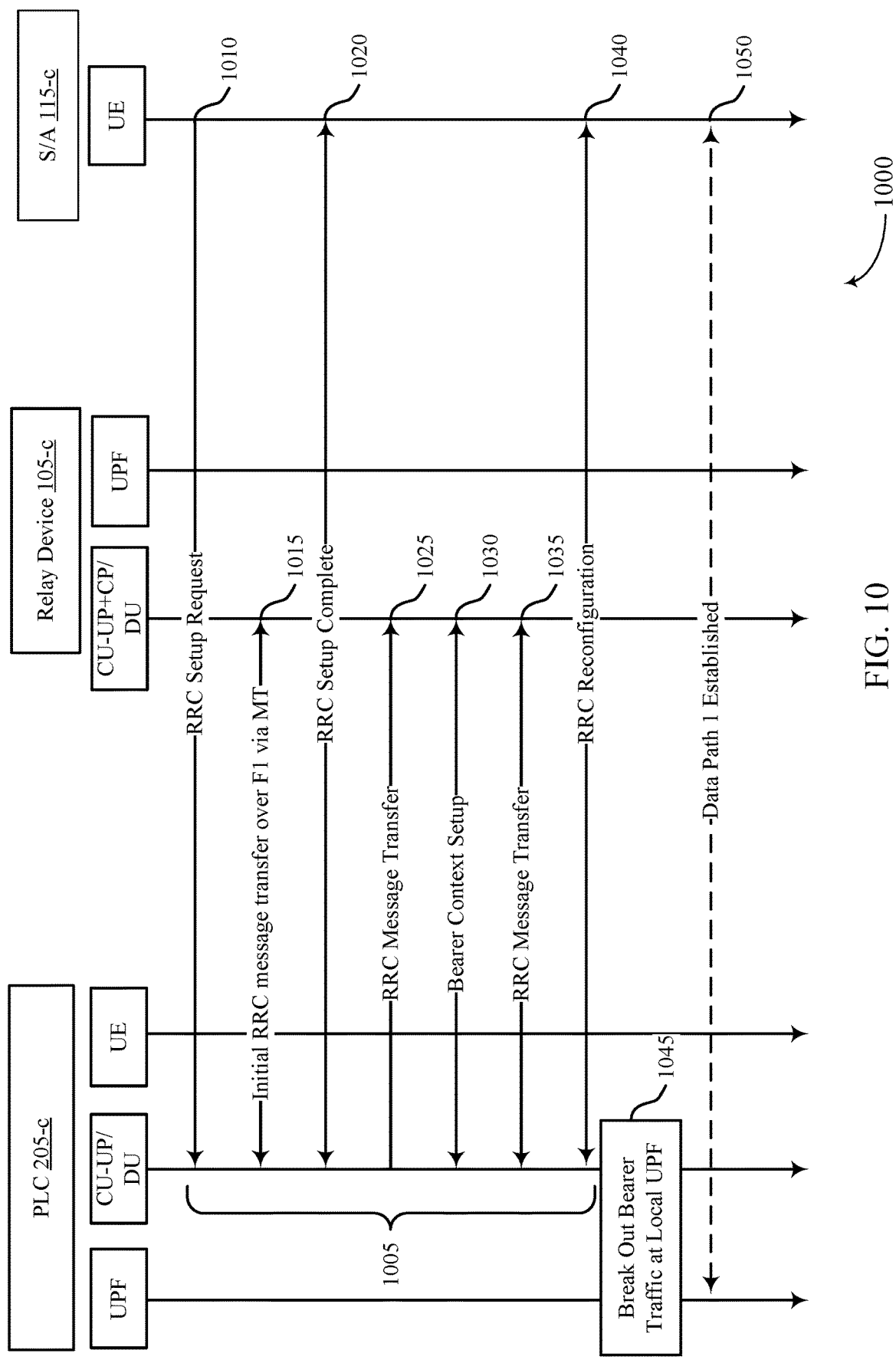
FIG. 10 illustrates an example of a process flow that supports architecture and protocols to support industrial IoT and wireless PLC communications in accordance with aspects of the present disclosure.

FIGS. 8 through 10 relate to Option 2 which may be similar to Option 1 in the UP but may include a CP that is disaggregated (e.g., the relay device 105-c contains the singular CU-CP of the system).

Figure 11A:
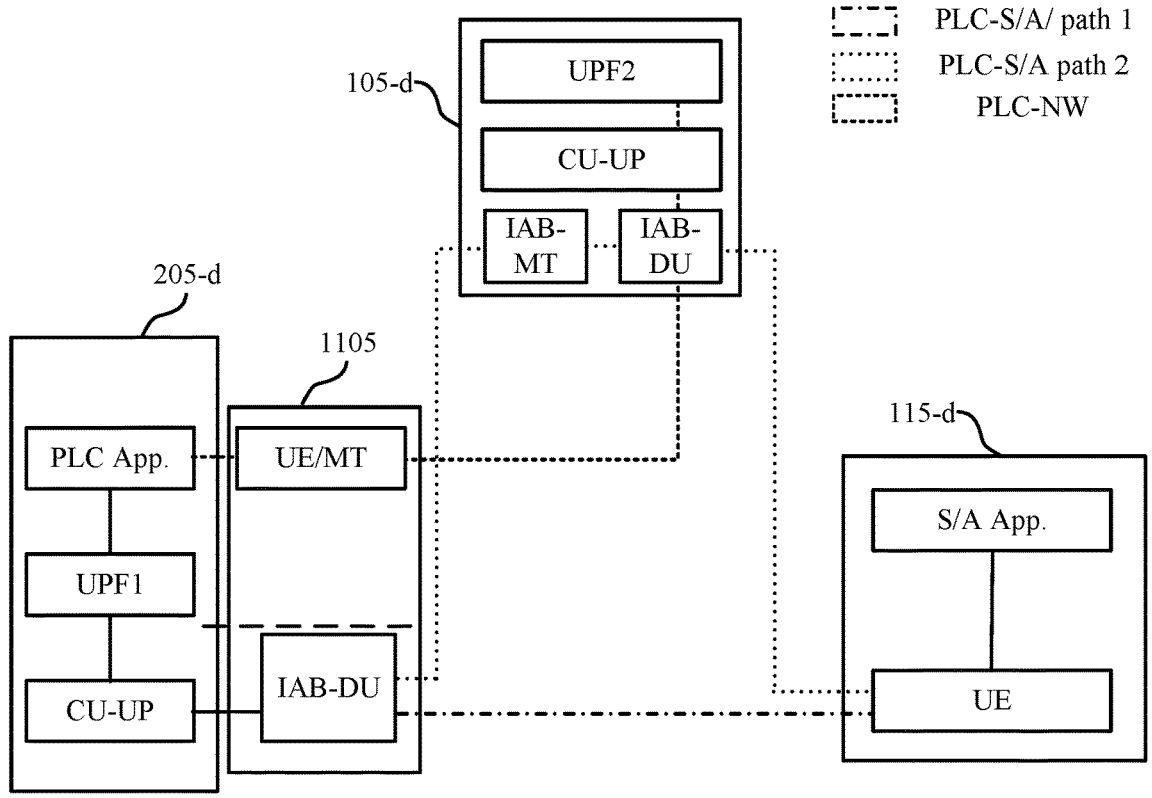
FIGS. 11A & 11B illustrate examples of a plane configuration that supports architecture and protocols to support industrial IoT and wireless PLC communications in accordance with aspects of the present disclosure.
Figure 11B:
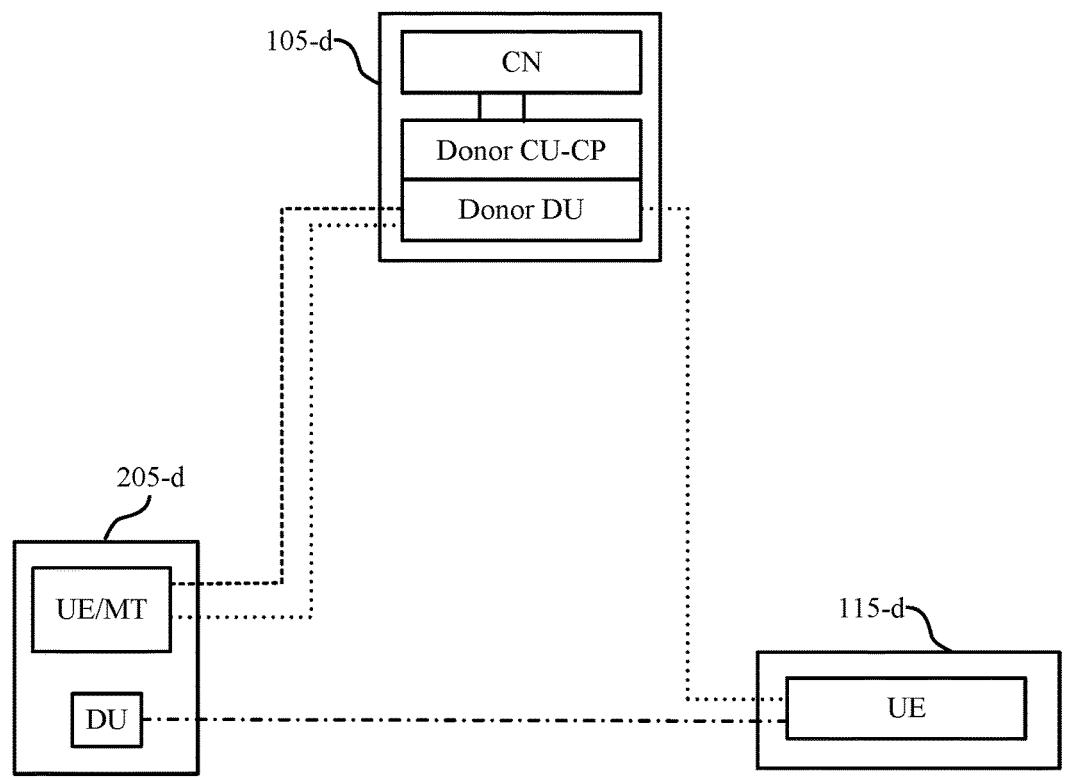
Figure 12:
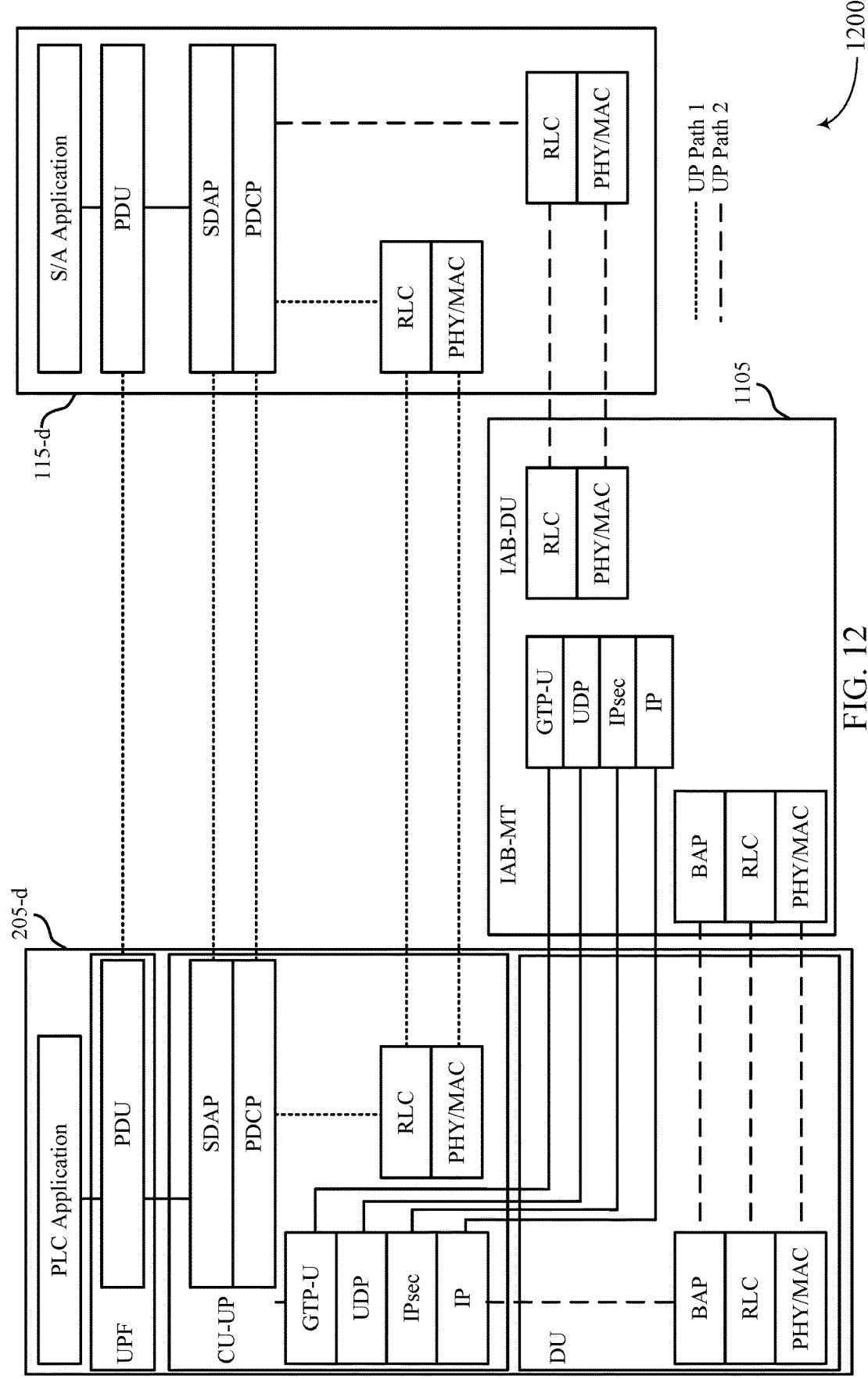
FIG. 12 illustrates an example of a user plane protocol stack that supports architecture and protocols to support industrial IoT and wireless PLC communications in accordance with aspects of the present disclosure.
Figure 13:
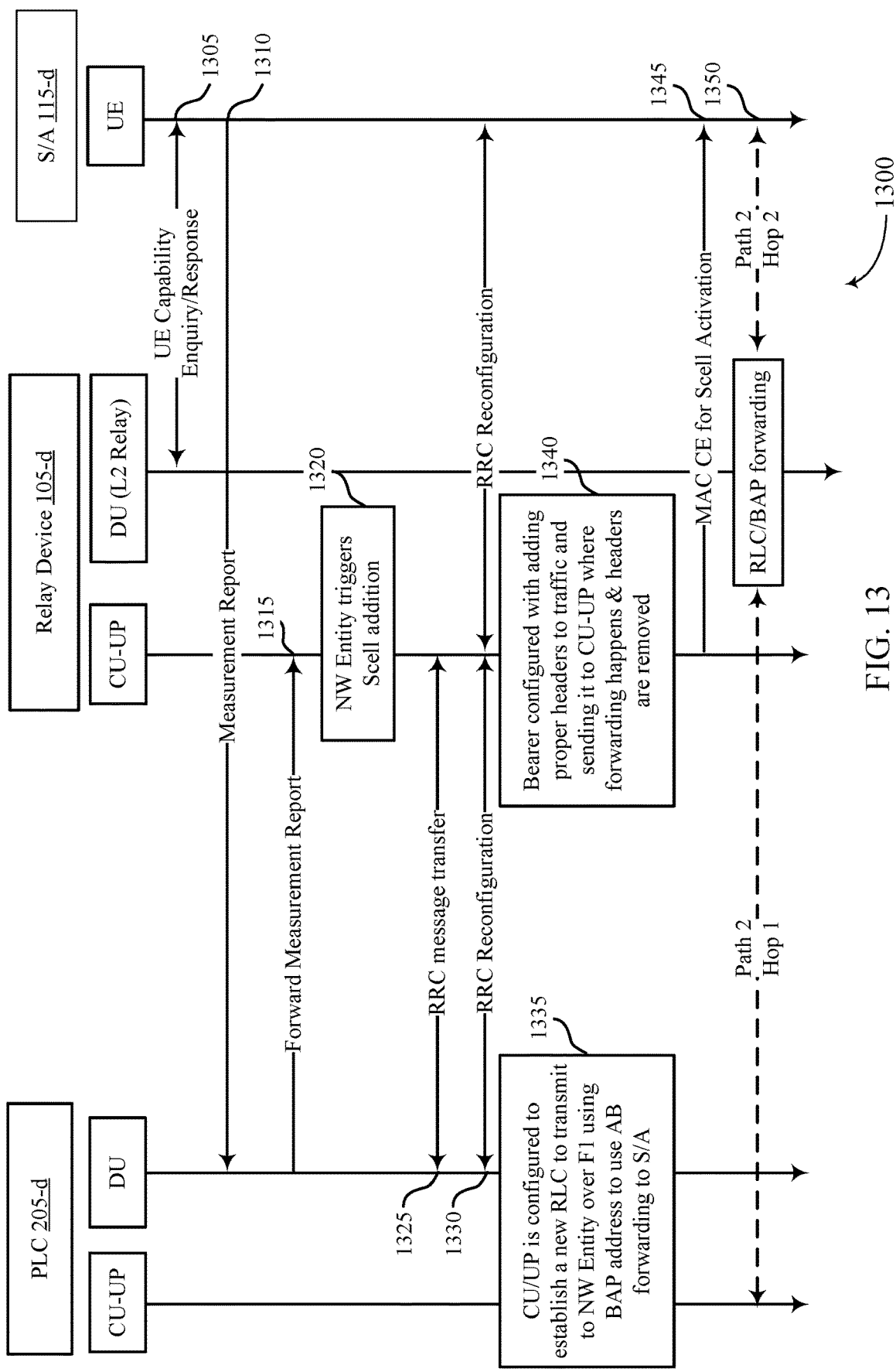
FIG. 13 illustrates an example of a process flow that supports architecture and protocols to support industrial IoT and wireless PLC communications in accordance with aspects of the present disclosure.

FIGS. 11 through 13 relate to Option 3. For example, Option 3 presents a non-disaggregated design which may support an implementation that uses an existing Dual Connectivity (e.g., PDCP duplication) framework to offer path diversity.

Figure 14A:
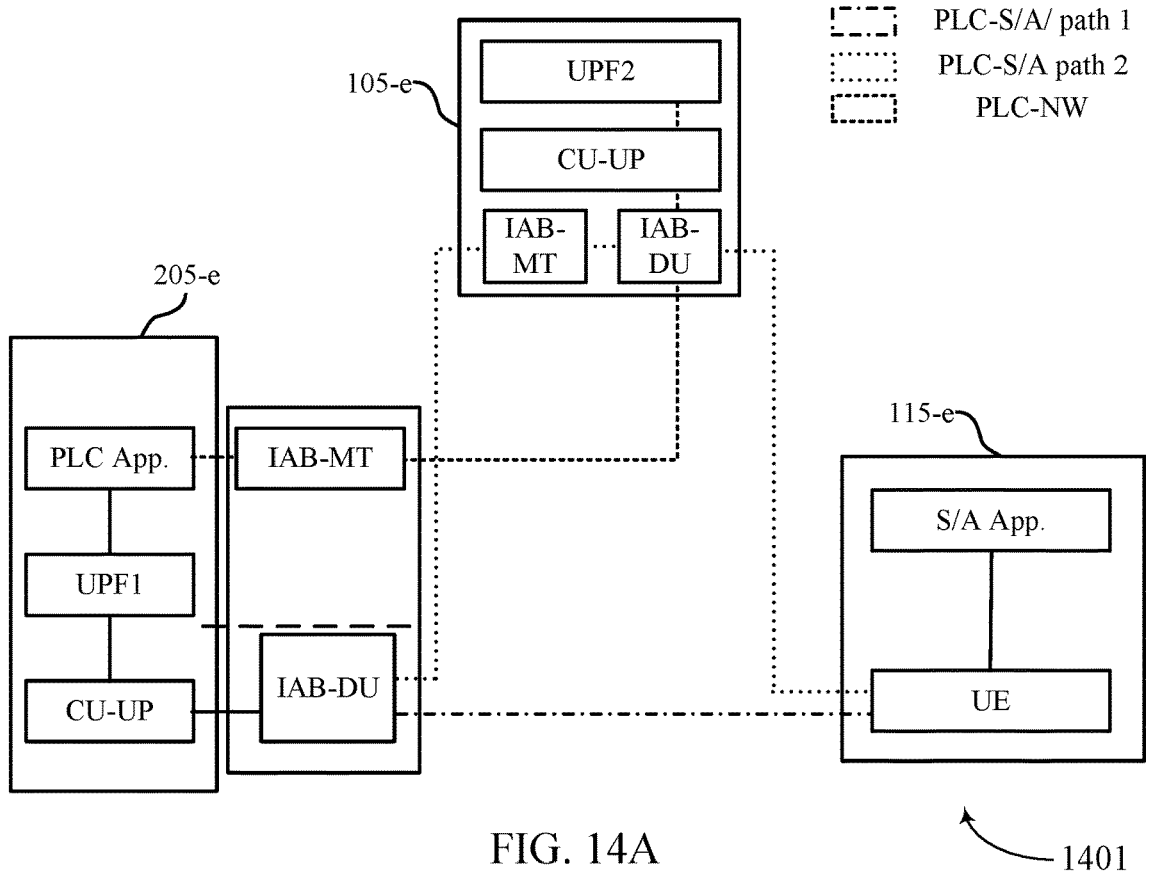
FIGS. 14A & 14B illustrate examples of a plane configuration that supports architecture and protocols to support industrial IoT and wireless PLC communications in accordance with aspects of the present disclosure.
Figure 14B:
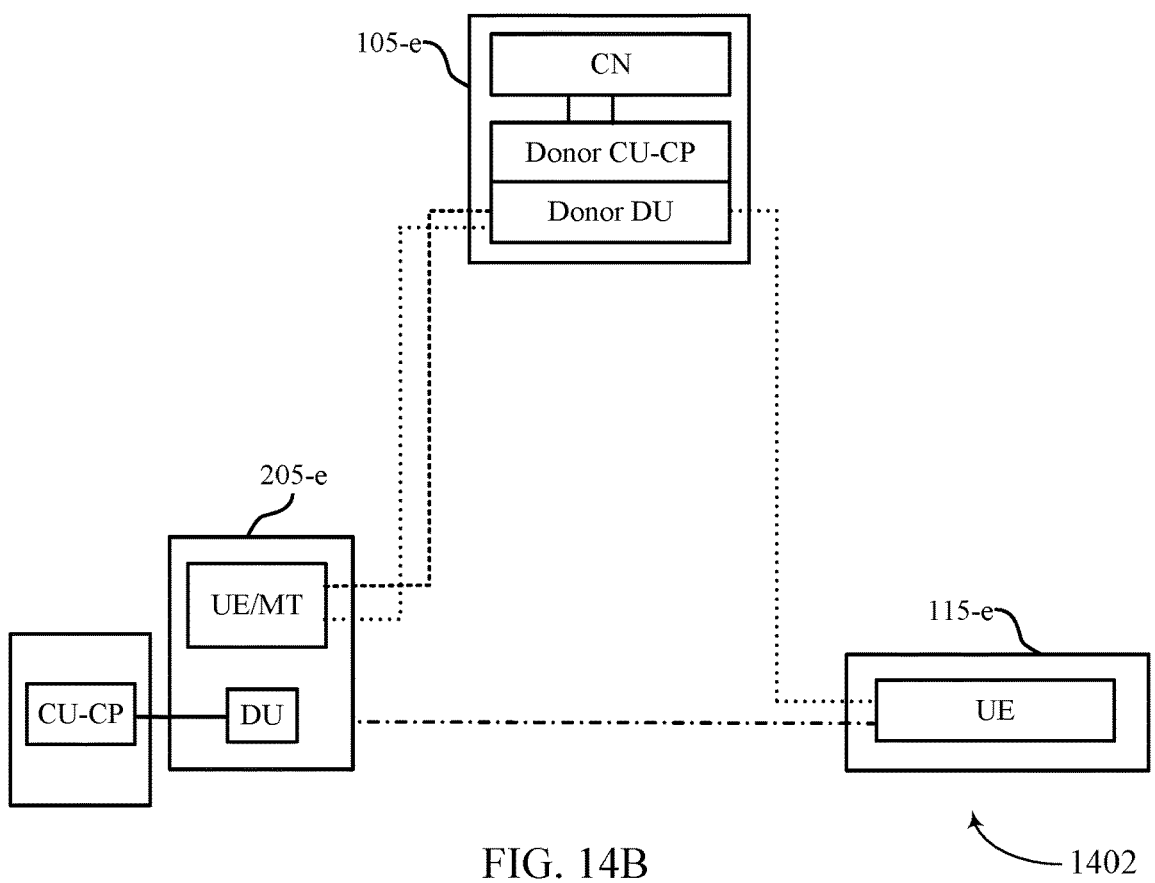
Figure 15:
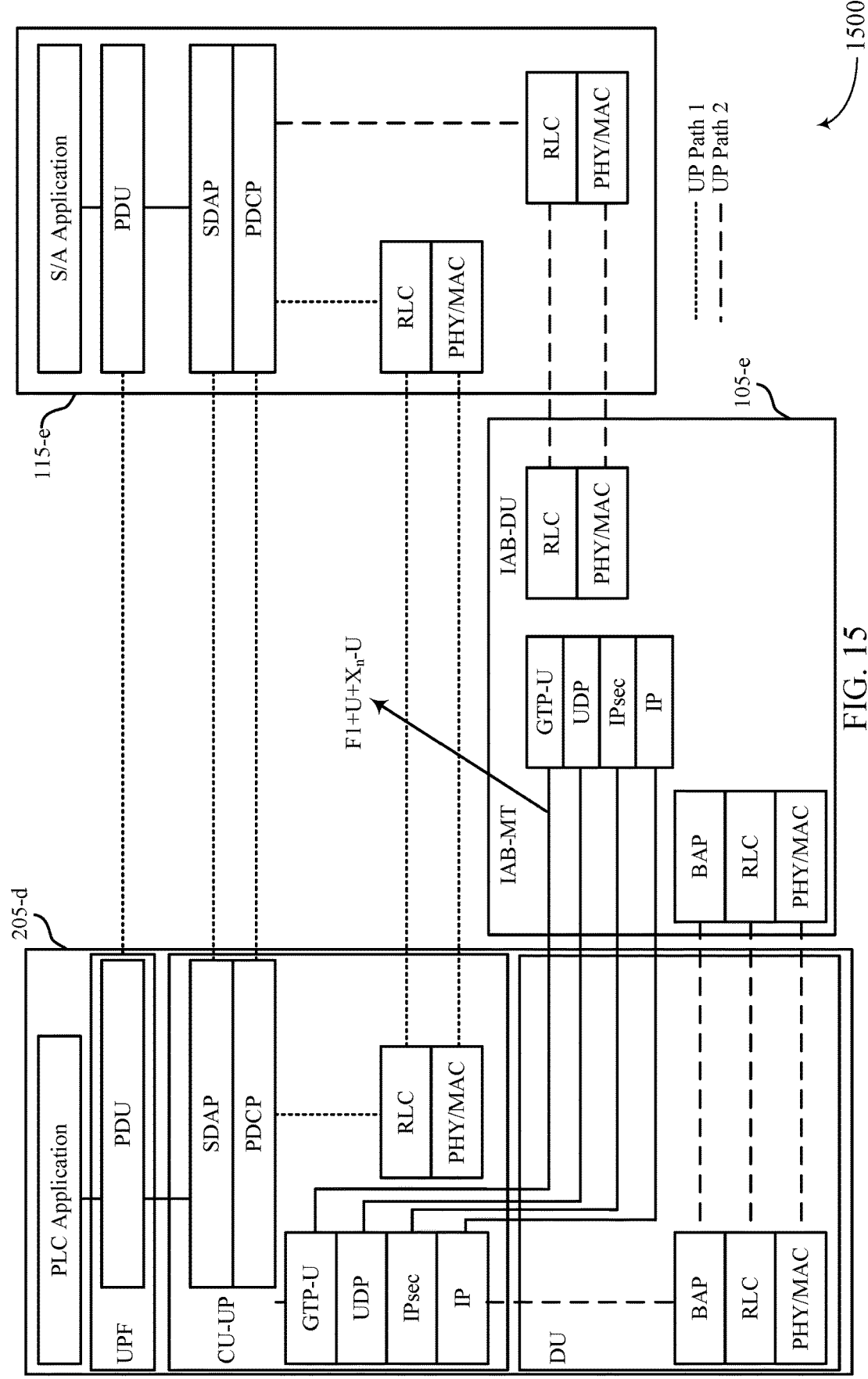
FIG. 15 illustrates an example of a user plane protocol stack that supports architecture and protocols to support industrial IoT and wireless PLC communications in accordance with aspects of the present disclosure.
Figure 16:
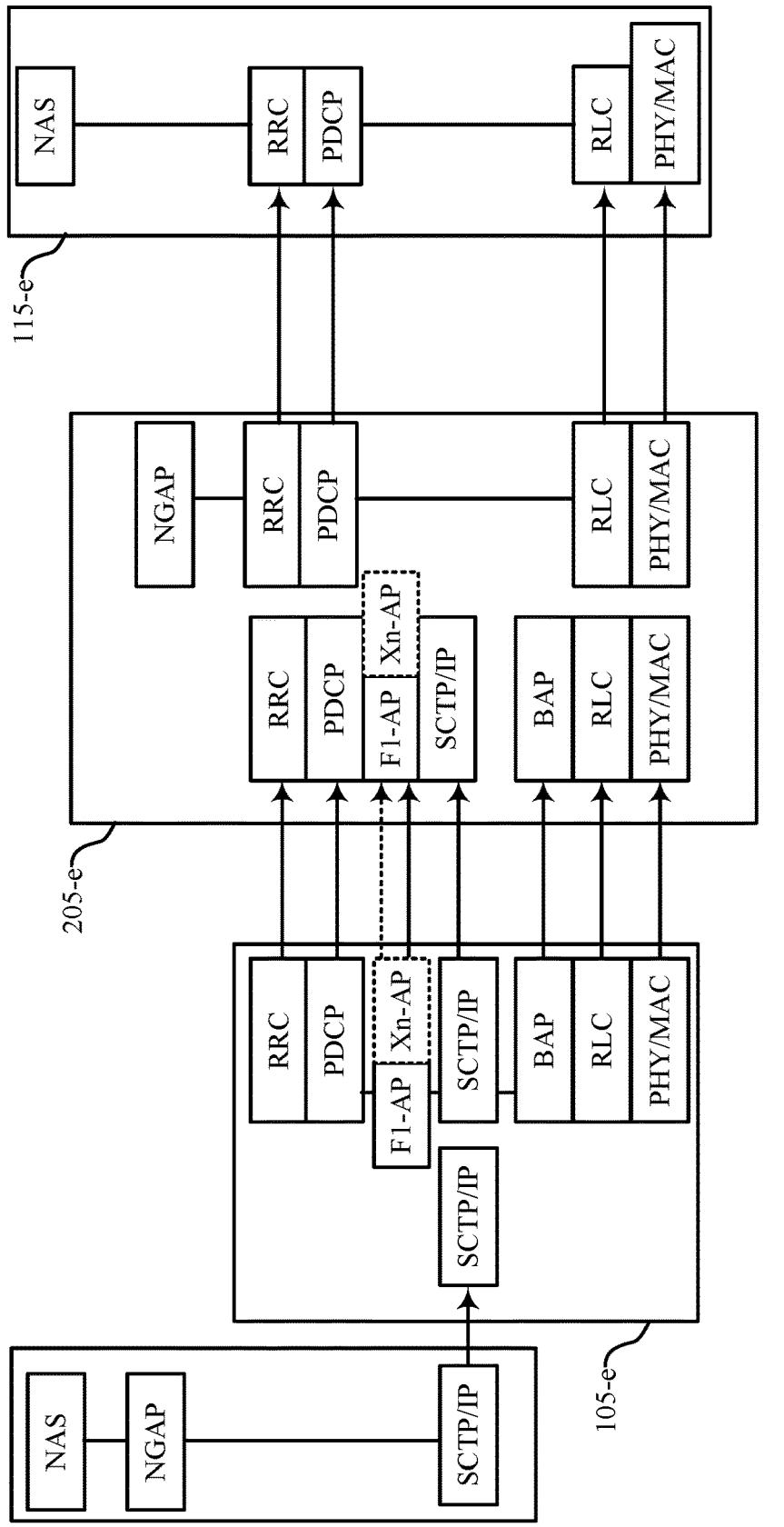
FIG. 16 illustrates an example of a control plane protocol stack that supports architecture and protocols to support industrial IoT and wireless PLC communications in accordance with aspects of the present disclosure.

FIGS. 14 through 16 relate to Option 4. For example, Option 4 presents a disaggregated design which may support a similar PDCP duplication design as Option 3.

FIGS. 17 through 19 relate to Option 5. For example, Option 5 present an IAB structure, where instead of assuming that the relay device is a donor, it is assumed that each PLC is a donor containing UP and CP cognitive network (CN) elements such as a UPF, an AMF, and a session management function (SMF).

Figure 3A:
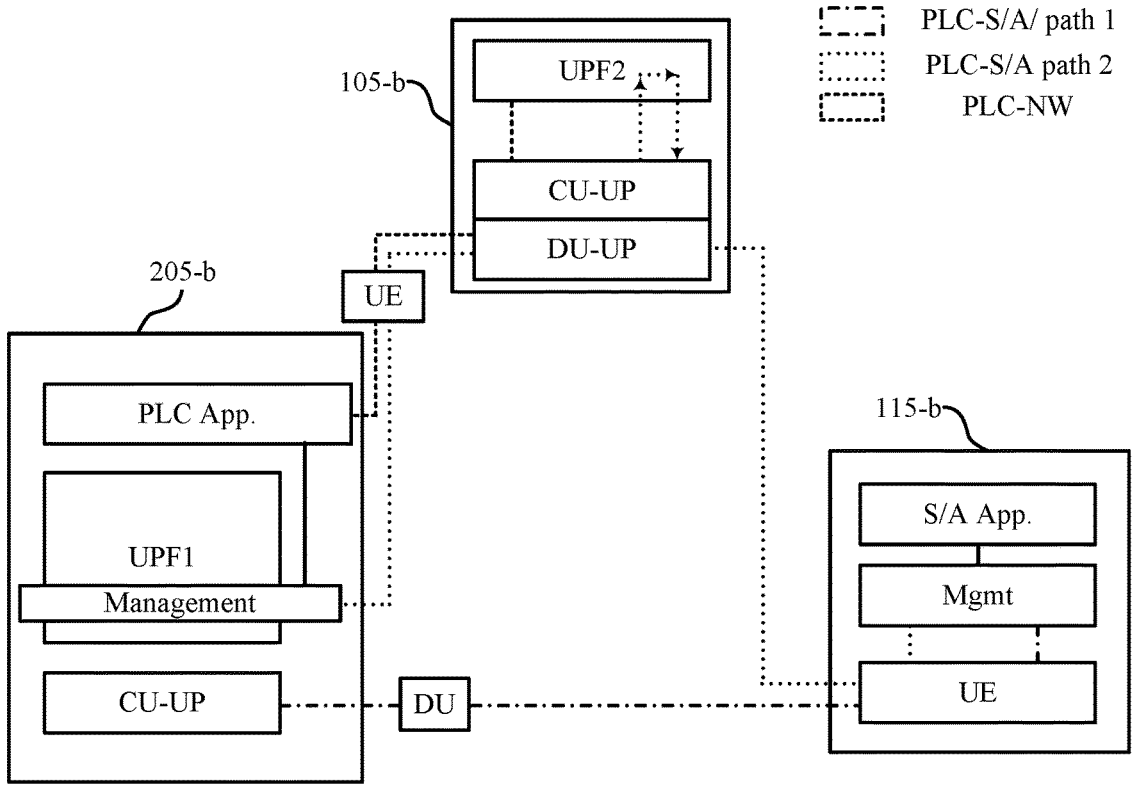
FIGS. 3A & 3B illustrate examples of a plane configuration that supports architecture and protocols to support industrial IoT and wireless PLC communications in accordance with aspects of the present disclosure.
Figure 3B:
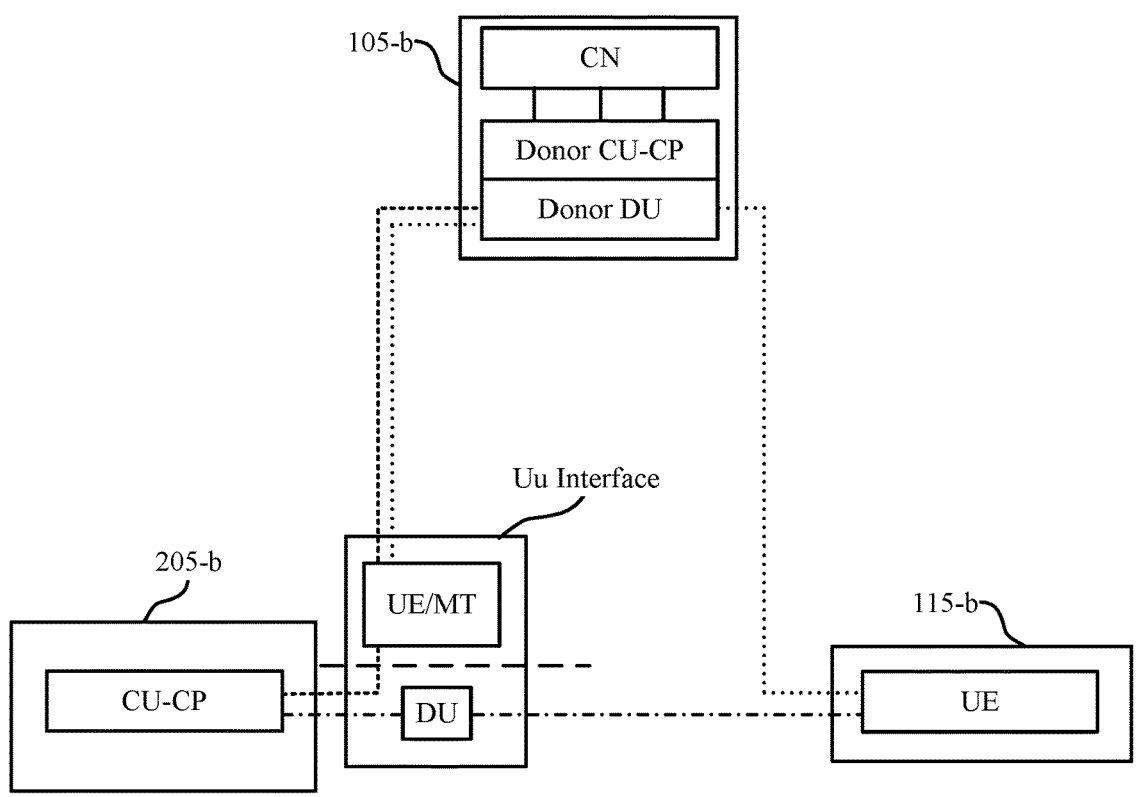

FIGS. 3A & 3B illustrate examples of a plane configuration 301 and a plane configuration 302 that each supports architecture and protocols to support industrial IoT and wireless PLC communications in accordance with aspects of the present disclosure. For example, FIG. 3A may illustrate a UP configuration for Option 1 and FIG. 3B may illustrate a CP configuration for Option 1. Each of FIGS. 3A & 3B may include a PLC 205-b, a relay device 105-b and an S/A 115-b which may be examples of the corresponding devices as described with reference to FIGS. 1 & 2.

In the example, of FIG. 3A, the PLC 205-b may include a split configuration including a DU portion that may perform similar functionalities as a base station 105 to communicate with the S/A 115-b and a UE portion to communicate with the relay device 105-b. Path 1 (e.g., the direct path) may be a Uu path between the PLC 205-b and the S/A 115-b where a UPF1 of the PLC 205-b acts as an anchor for a protocol data unit (PDU) session for communicating data having a first format between the PLC 205-b and the S/A 115-b and data transmitted via Path 2, for example, having a second format, may initiate at a UE portion of the PLC 205-b, which transmits the data to the relay device 105-b, where the second format indicates that the relay device is to forward the data. The relay device 105-b may rely on a UPF2 to forward packets between uplink and downlink (as is available in Rel-16 for UE-UE communication). The relay device 105-b may forward a data packet to the S/A 115-b via a Uu interface. Communications in the opposite direction (e.g., form the S/A 115-b to the PLC 205-b) may function similarly.

For example, the path management may be managed by a newly introduced management layer. In the PLC 205-a, the management layer may be capable of connecting to both the UPF1 and the UE protocol stack of the PLC 205-b. The PLC 205-b may additionally include a CU-UP layer for transmitting communications via Path 1.

For example, FIG. 3A generally depicts a UP architecture where a data packet created at the PLC 205-b application layer may go to the UPF layer of the PLC 205-b, where the UPF layer may include some functionalities called a management layer. The management layer may include higher layer functionalities and at the transmitter (e.g., the PLC 205-b) may control or manage the duplication of data packets, the formatting of packets, or the routing of data packets (or, e.g., a combination thereof) and at the receiver (e.g., the S/A 115-b) may detect and remove duplicates. For example, the management layer may detect that the network associated with the PLC 205-b has low reliability and may receive a data packet form the application layer of the PLC 205-b and duplicate the data packet for transmission via Path 1, Path 2, or both. In some examples, the management layer of the S/A 115-b may detect and remove duplicates. In some examples, the management layer may select one of Path 1 or Path 2 (e.g., may select a data packet format) associated with a higher reliability for transmitting the data packet without duplicating the data packet. In the example of Option 1, the PLC 205-b includes a UPF and the management layer may be included in or may interface with the UPF of the PLC 205-b.

For Path 1 transmissions, the management layer of the PLC 205-b may determine to route at least one copy of the data packet via Path 1. For example, the data packet may be transmitted to the CU-UP, for example, including a PDCP layer and an RLC layer and from the CU-UP, the data packet may be transmitted to the DU of the PLC 205-b which may function as a base station 105 which transmits the data packet to the S/A 115-b using a first format (e.g., including a first set of headers and other identifying information in addition to the data of the data packet) via a Uu interface. The UE layers of the S/A 115-b may receive the data packet and may forwards the data packet to the management layer of the S/A 115-b which may determine if any duplicates exist and may remove such duplicate data packets.

In some examples, the DU functioning as a base station 105 may not communicate with the relay device 105-b via OTA communications and thus the PLC 205-b may further include layers that function as a UE 115 (e.g., sometimes in an IAB architecture this portion may be referred to as an MT). Thus, for Path 2, the UE portion of the PLC 205-b may interface with the management layer of the PLC 205-b and may receive a data packet duplicate or copy and may transmit the copy to the relay device 105-b using a second format (e.g., including a second set of headers and other identifying information in addition to the data of the data packet) via a second Uu interface. In some examples, the second format may indicate to the relay device 105-b that the data packet is to be forwarded to the S/A 115-b. The relay device 105-b may receive the data packet at a DU-UP layer which may send the data packet through the Cu-UP to the UPF 2 layer which may act as a central UPF. In general, a UPF may be capable of reading and rerouting, routing, or forwarding packets or PDUs locally. Thus, the UPF2 may read the data packet received from the PLC 205-b and may determine that the data packet is intended for the S/A 115-b based on a format of the data packet (e.g., a second format including a second set of headers and other identifying information in addition to the data of the data packet). The UPF 2 may route the data packet back to the CU-UP while changing the format of the data packet, where the CU-UP may transmit the data packet back to the DU-UP and then via a third Uu interface may transmit the data packet to the S/A 115-b.

That is, the relay device 105-b may receive the first data in the first format via the PLC-S/A first hop at a DU-UP layer of the relay device 105-b. The DU-UP layer of the relay device 105-b may forward the data to the CU-UP layer which may forward the first data to the UPF2 which may perform L3 local forwarding between PDU sessions through the DU-UP to the S/A.

In the example of FIG. 3B, the CP of the PLC 205-b may include base station 105 and UE 115 components. The UE 115 components of the PLC 205-b may transmit data via a Uu interface with the relay device 105-b via an F1-AP communication link for PLC-NW communications or via an RRC communications link for PLC-S/A communications (e.g., including hop 1 and hop 2). The RRC path may include a tunneled N1/N2/N4 interface via the Uu interface.

For example, the PLC 205-b may include a CU-CP as part of a non-disaggregated design where the CU-UP (e.g., of the UP depicted in FIG. 3A) and the CU-CP (e.g., of the CP depicted in FIG. 3B) are both included in the PLC 205-b. In some examples, the CU-CP may perform RRC signaling or may include RRC layers that may manage Uu link of Path 1 between the PLC 205-b and the S/A 115-b. The CU-CP of the PLC 205-b may manage or control one or more settings of the Path 1 such as power settings, grants, scheduling, etc. The CP of the PLC 205-b may include a DU and a UE portion coupled with a base station 105 associated with the PLC 205-b. The PLC 205-b may communicate with the relay device 105-b via an F1-AP interface (e.g., between the base station functionalities of the PLC 205-*b* and the relay device 105-*b*) using the UE/MT block between to control communications between the PLC 205-*b* and the relay device 105-*b* and via a second RRC connection supported by the CU-CP (e.g., donor CU-CP) of the relay device 105-*b*. The F1-AP protocol may be included between the CU-CP and the UE MT.

In some examples, at the relay device 105-*b*, the CN layer, the Donor CU-CP layer, and the Donor DU may be coupled via a NAS connection, where the CU-CP supports Path 2 traffic (e.g., PLC-S/A traffic) and PLC-NW traffic.

Figure 4A:
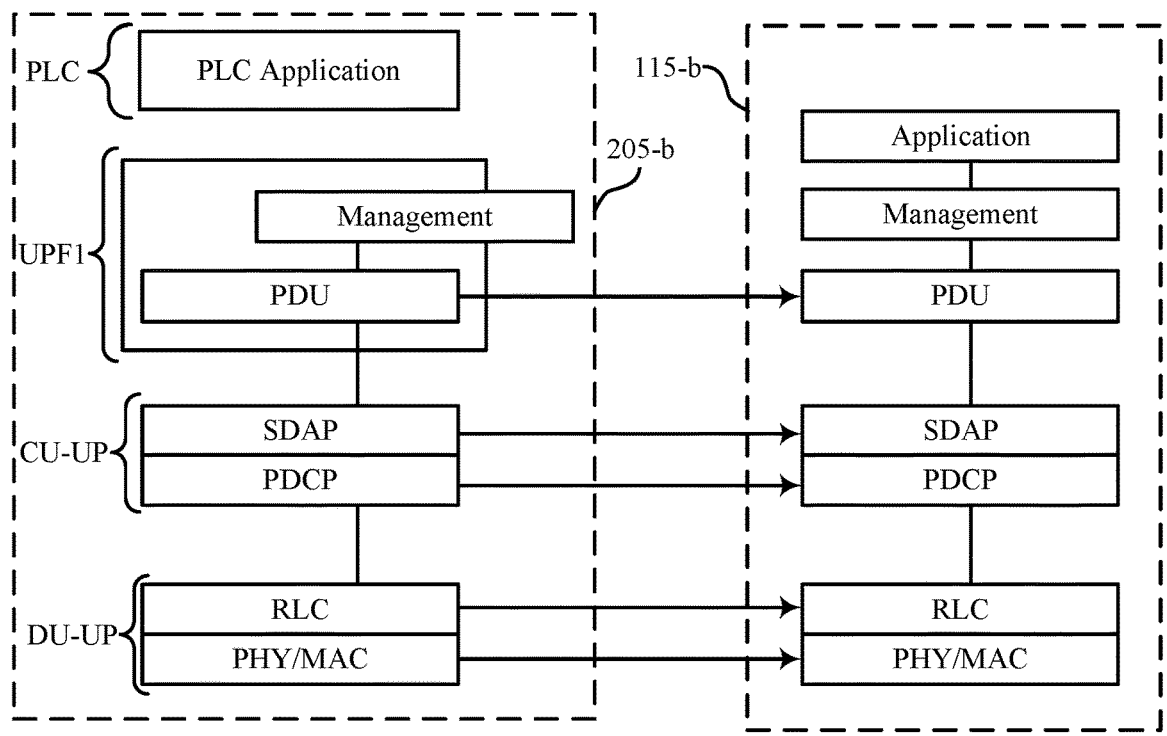
FIGS. 4A & 4B illustrate examples of a user plane protocol stack configuration that supports architecture and protocols to support industrial IoT and wireless PLC communications in accordance with aspects of the present disclosure.
Figure 4B:
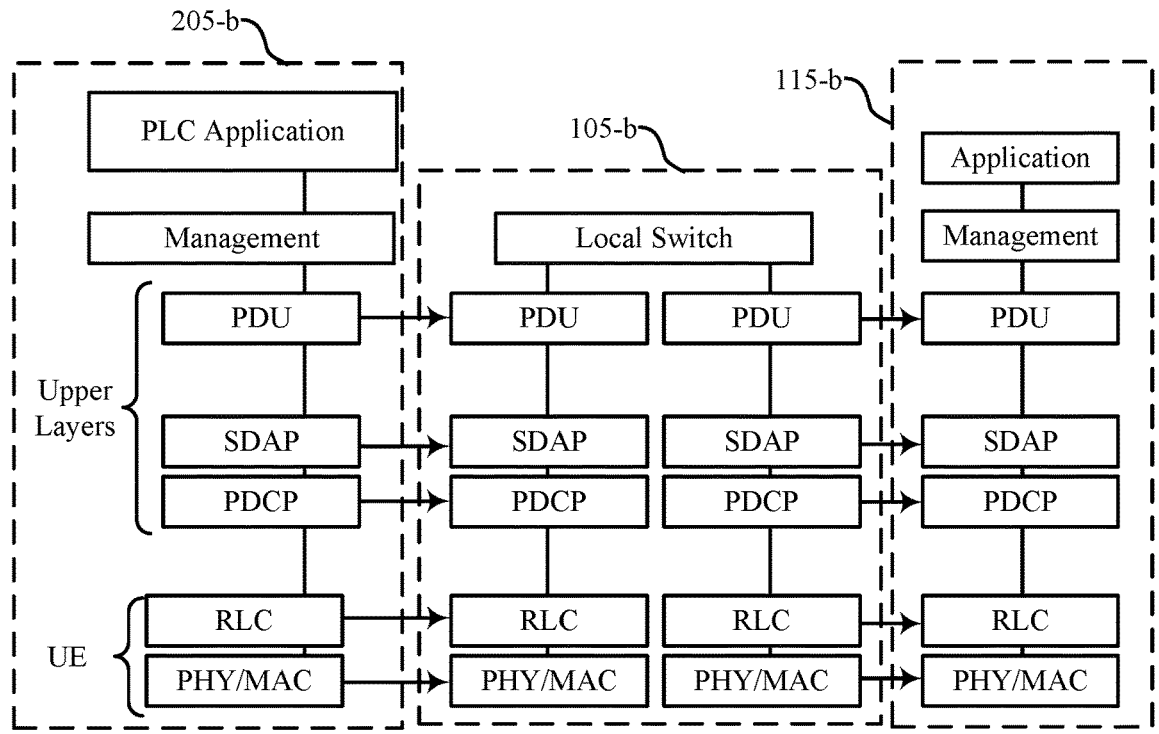

FIGS. 4A & 4B may illustrate examples of a UP protocol stack 401 and 402 that each support architecture and protocols to support industrial IoT and wireless PLC communications in accordance with aspects of the present disclosure. For example, the UP protocol stack 401 may correspond to a UP protocol stack that supports Path 1 of the multi-path communications scheme and the UP protocol stack 402 may correspond to a UP protocol stack that supports Path 2 of the multi-path communications scheme.

The UP protocol stack 401 may include a UP protocol stack of the PLC 205-*b* and the S/A 115-*b*.

In the example of FIG. 4A (as relating to Option 1, path 1), the PLC 205-*b* may perform two roles in the protocol stack. For example, the PLC 205-*b* may perform the role of a network entity, including a DU, a CU, and a UPF, that communicates with the S/A 115-*b* via a Uu communication link via path 1. The PLC 205-*b* may additionally perform the role of a UE for communications via a two-hop alternate path to the relay device 105-*b* and may perform the role of a UE for any PLC-NW traffic.

For example, in Path 1 (e.g., the direct path), the PLC 205-*b* may communicate with the S/A 115-*b* (e.g., a UE protocol stack of the S/A 115-*b*) using base station functionalities associated with the PLC 205-*b* protocol stack, where a UPF layer of the PLC may include the newly introduced management layer. The relay device 105-*b* may not be involved in communications via path 1. For example, the PDU session may be established between UPF1 (e.g., the local UPF at PLC 405) and the S/A.

The UP protocol stack 402 may include a UP protocol stack of the PLC 205-*b*, the donor CU of the relay device 105-*b*, and the S/A 115-*b*.

In the example of FIG. 4B (as relating to Option 1, path 2), a first independent PDU session may be established between the PLC 205-*b* and the relay device 105-*b* for communications having a first format and a second independent PDU session may be established between the relay device and the S/A for communications having a second format but potentially including a same data portion as the first format communications. Communications via path 2 may rely on UPF local forwarding (e.g., as defined with reference to 3GPP Rel. 16) between PDU sessions to route packets between hop 1 and hop 2 of path 2. To aggregate packets between paths the newly introduced management layer may be used to tag ethernet packets at or before transmission by the PLC 205-*b* and may remove duplicates at or after reception by the S/A 115-*b*.

For Path 2, the relay device 105-*b* may include the DU, CU, and UPF as described with reference to FIG. 3, where the UE functionality of the PLC 205-*b* communicates with the S/A 115-*b* via the relay device 105-*b* utilizing UPF forwarding, where the management layer of the PLC 205-*b* may assign a different IP address to the data packet corresponding to each path. For example, from the point-of-view of an L3 interface of the relay device 105-*b*, the S/A 115-*b* may be assigned two different IP addresses because the S/A 115-*b* may be connected to the PLC 205-*b* (e.g., UPF 1) via a first PDU session and may be connected to the relay device 105-*b* (e.g., UPF2) via a second PDU session.

Due to the different nature of path 1, which includes a priority scheduling algorithm (PSA) at UPF1, and path 2 which includes a PSA at UPF2 thereby defining the role of the PLC 205-*b* as a network entity on path 1 and a UE on path 2, the management layer may be capable of interacting with both UPF1 and the S/A 115-*b* (e.g., UE) protocol stack. In such examples, the management layer at the S/A 115-*b* may have to manage two IP addresses (e.g., two different IP addresses) for the two paths, because each of path 1 and path 2 terminates at a respective UPF (e.g., UPF 1 and UPF 2).

Figure 5A:
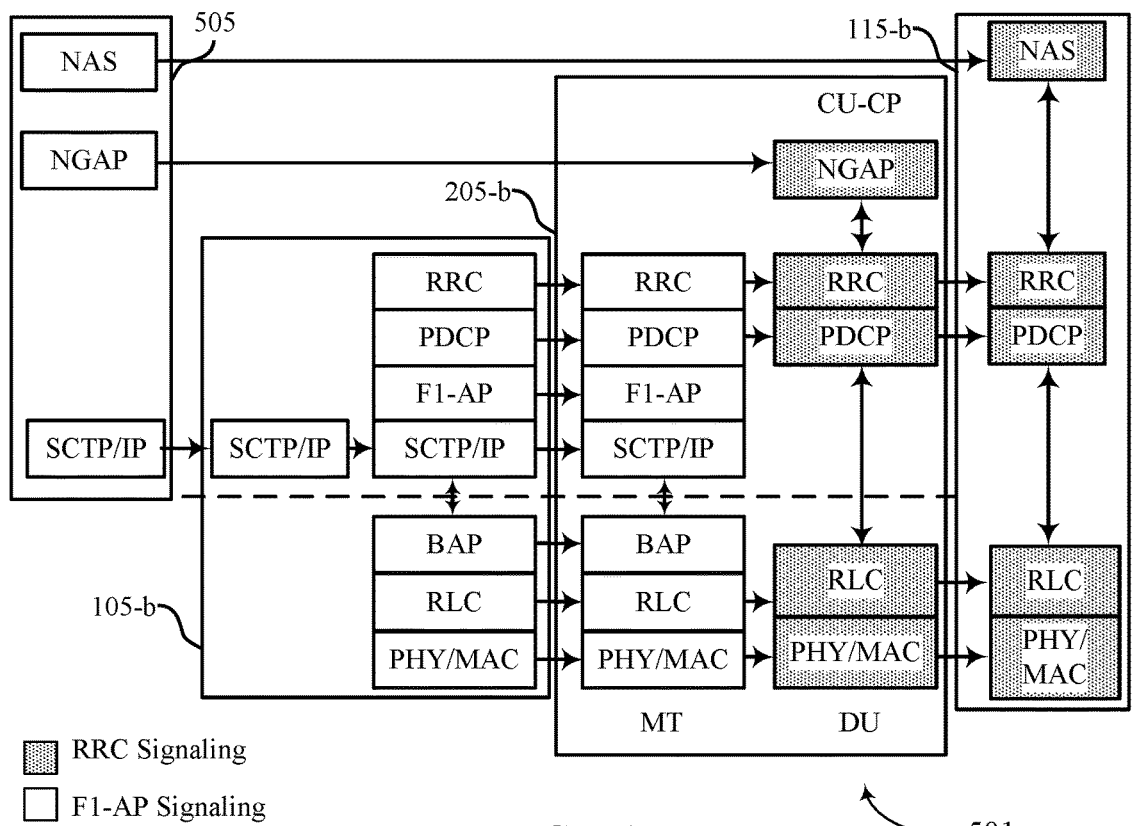
FIGS. 5A & 5B illustrate examples of a control plane protocol stack that supports architecture and protocols to support industrial IoT and wireless PLC communications in accordance with aspects of the present disclosure.
Figure 5B:
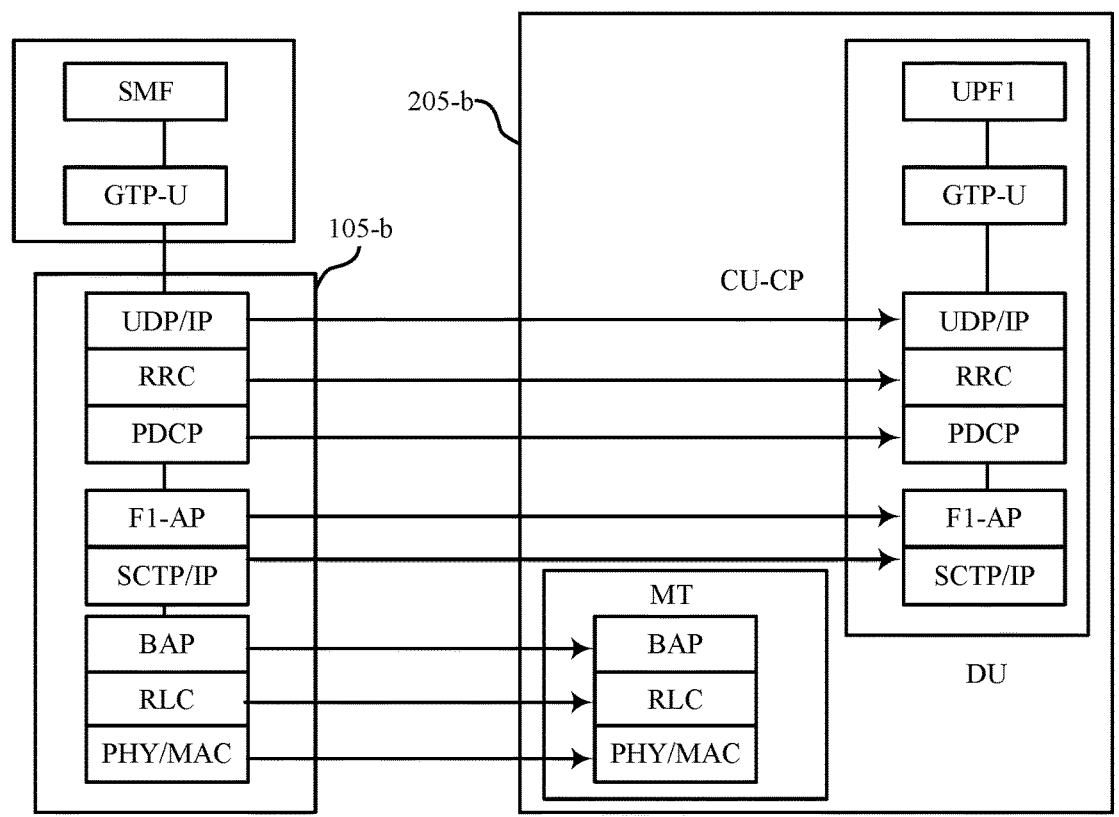

FIGS. 5A & 5B illustrate examples of a CP protocol stack 501 and 502 that each supports architecture and protocols to support industrial IoT and wireless PLC communications in accordance with aspects of the present disclosure. For example, the CP protocol stacks 501 and 502 may correspond to portions of a CP protocol stack that support path 1 of the multi-path communications scheme.

In the example of FIG. 5A (as relating to the CPs of the PLC 205-*b*, the relay device 105-*b*, an AMF 505 associated with (e.g., co-located with) the relay device 105-*b*, and the S/A 115-*a* of Option 1, path 1), the PLC 205-*b* may act as a femtocell capable of establishing an RRC connection to different S/As (e.g., including S/A 115-*b*). In such examples, the AMF 505 may be collocated at a ceiling/donor base station 105 (e.g., the relay device 105-*b*). To communicate with the AMF and communicate a data packet to the S/A 115-*b*, the PLC 205-*b* may establish an OTA N1/N2 tunnel, for example, to establish the second Uu interface (e.g., Uu communications link between the PLC 250-*b* and the relay device 105-*b*). For example, an IP tunnel may encapsulate N1/N2 signaling intended for a PLC femtocell (e.g., including PLC 205-*b*) and other UEs 115 (e.g., S/As 115) respectively (e.g., that flows over the UP as IP traffic). According to Option 1, the RRC layer may be located at the PLC CU-CP in a non-disaggregated design.

The Uu interface (e.g., Uu2) between the relay device 105-*b* and the PLC 205-*b* may be configured via N1/N2 IP tunneled NAS signaling (e.g., of which the second format may include or consist), while a Uu interface (e.g., Uu1) between the base station-side PLC 205-*b* and the S/A 115-*b* may be configured via RRC signaling. In some examples, a data packet transmitted via the RRC connection may include control information associated with the RRC connection, of which the first format may include or consist.

In the example of FIG. 5B (as relating to IP-tunneled NAS signaling over F1 for establishing Path 1), due to the presence of a UPF at the PLC 205-*b* (UPF1), a connection to the SMF may be used (e.g., collocated with a mounted gNB). This may rely on IP tunneling of N4 between the SMF and UPF1.

In the CP, the PLC 205-*b* may establish a direct RRC connection to the S/A 115-*a* due to disaggregated design. Other CN components such as the AMF are placed over the relay device 105-*b* and may be connect to the PLC 205-*b* via an F1-AP protocol. Due to the UPF1 presence at the PLC 205-*b*, the N4 stack may also be tunneled via the F1-AP protocol.

Note that the management layers of the S/A 115-*b* may separate IP addresses for the different paths since they both connect to different anchor UPFs (e.g., UPF1 and UPF2 as described with reference to FIG. 3).

Figure 6:
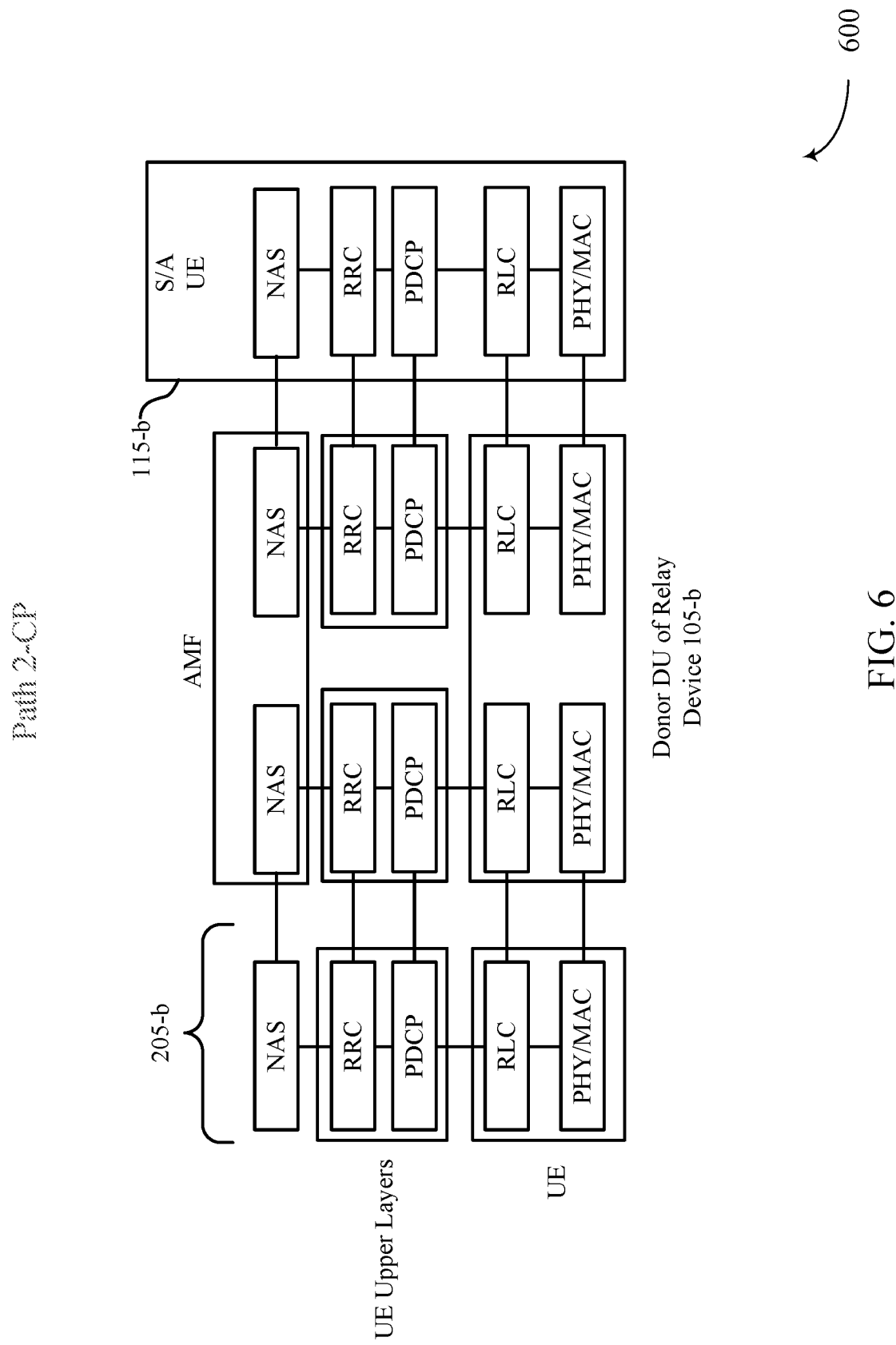
FIG. 6 illustrates an example of a control plane protocol stack that supports architecture and protocols to support industrial IoT and wireless PLC communications in accordance with aspects of the present disclosure.

FIG. 6 illustrates an example of a CP protocol stack 600 that supports architecture and protocols to support industrial IoT and wireless PLC communications in accordance with aspects of the present disclosure. For example, the CP protocol stack 600 may correspond to a CP protocol stack that supports path 2 of the multi-path communications scheme. The CP protocol stack may depict the layers involved in establishing an RRC connection between the S/A 115-b and the relay device 105-b and between the UE components of the PLC 205-b and the relay device 105-b. That is, for Path 2, the relay device 105-b may establish two RRC paths with two effective UE 115.

For example, in the two-hop path (e.g., Path 2), the PLC 205-b and the S/A 115-b may both be visible to the relay device 105-b as separate UEs 115. Each of the PLC 205-b and the S/A 115-b may maintain a separate CP/RRC connection to the relay device 105-b and the corresponding CN.

Figure 7:
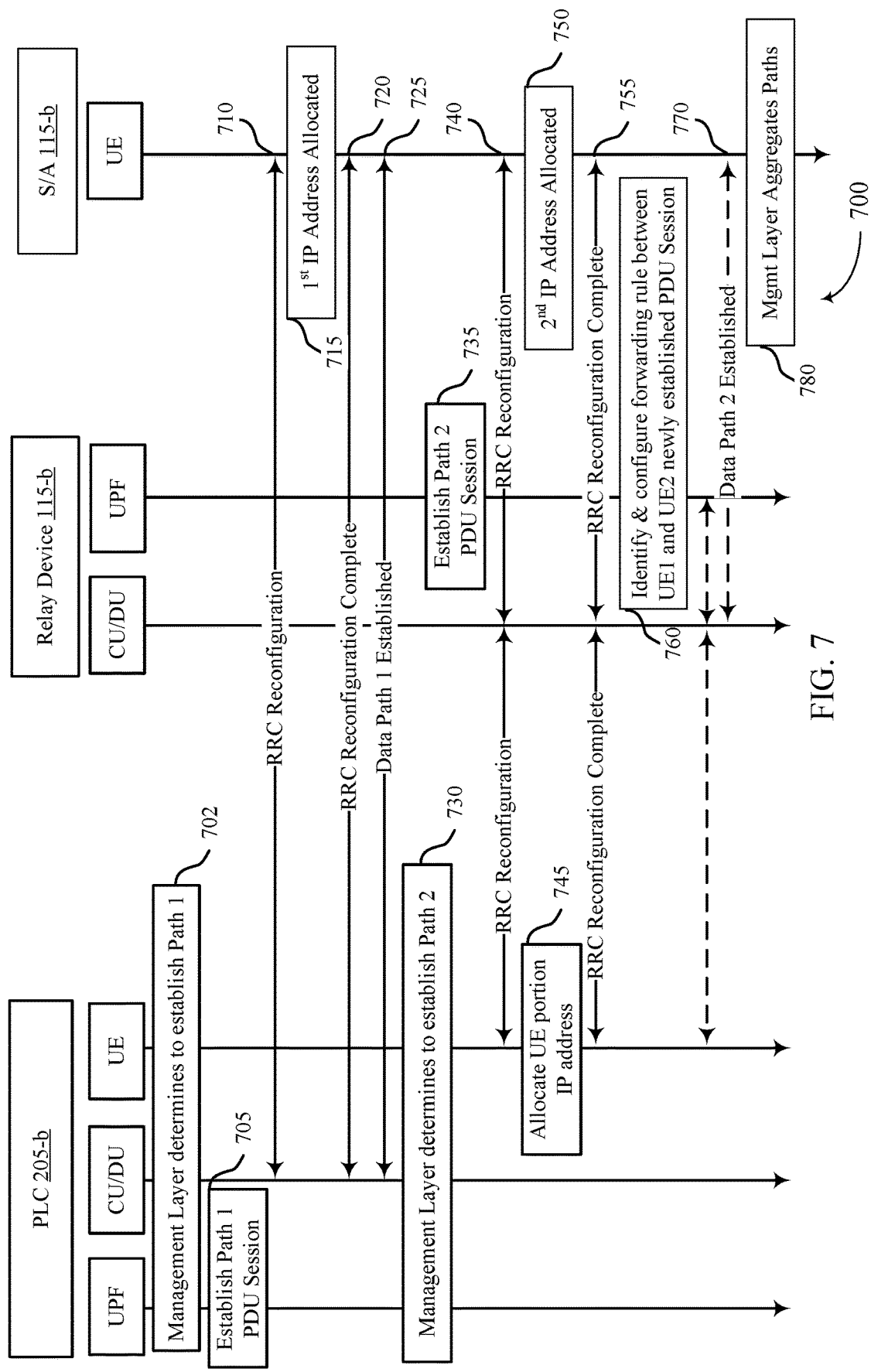
FIG. 7 illustrates an example of a process flow that supports architecture and protocols to support industrial IoT and wireless PLC communications in accordance with aspects of the present disclosure.

FIG. 7 illustrates an example of a process flow 700 that supports architecture and protocols to support industrial IoT and wireless PLC communications in accordance with aspects of the present disclosure. For example, the process flow 700 may depict portions of a method for establishing Path 1 between the PLC 205-b and S/A 115-b and for establishing Path 2 between the PLC 205-b, the relay device 105-b and the S/A 115-b, each according to Option 1.

For example, at 702, the management layer of the PLC 205-b may determine to establish a Path 1 for direct communications between the PLC 205-b and the S/A 115-b. As such, at 705, the UPF layer of the PLC 205-b may establish a Path 1 PDU session. At 710, the CU/DU of the PLC 205-b may perform an RRC (re)configuration procedure with the S/A 115-b and, based on the procedure, at 715, the S/A 115-b may allocate a first IP address for communications via Path 1. Path 1 may be established, at 725, based on the completion of the RRC (re)configuration procedure at 720. The first format may include the first IP address.

Additionally, or alternatively, at 730, the management layer of the PLC 205-b may determine to establish a Path 2 for indirect communications between the PLC 205-b and the S/A 115-b via the relay device 105-b. In some examples, determining to establish the Path 2 may be based on one or more channel conditions associated with Path 1 communications (e.g., interference, low reliability, etc.). For instance, an observed interference level on Path 1 exceeding a first threshold, an observed channel reliability level on Path 1 falling below a second threshold, or both, may prompt establishment of Path 2. As such, at 735, the UPF layer of the relay device 105-b may establish a Path 2 PDU session. At 740, the UE portion of the PLC 205-b may perform an RRC (re)configuration procedure with the CU/DU of the relay device 105-b which may perform an RRC (re)configuration procedure with the S/A 115-b and, based on the procedure, at 745 and 750, the UE portion of the PLC 205-b may allocate a second IP address for communications via Path 2. The second format may include the second IP address. At 755, the UE portion of the PLC 205-b, the CU/DU of the relay device 105-b, and the S/A 115-b may complete the RRC (re)configuration procedure and, at 760, the UPF of the relay device 105-b may identify and configure one or more forwarding rules for received data packets intended for the S/A 115-b (e.g., via the Path 2 PDU session). Path 2 may be established based on the completion of the RRC (re)configuration procedure, at 770, and the determination of the one or more forwarding rules. In some examples, at 780, the management layer of the S/A 115-b may aggregate or manage Path 1 and Path 2 communications.

Figure 8A:
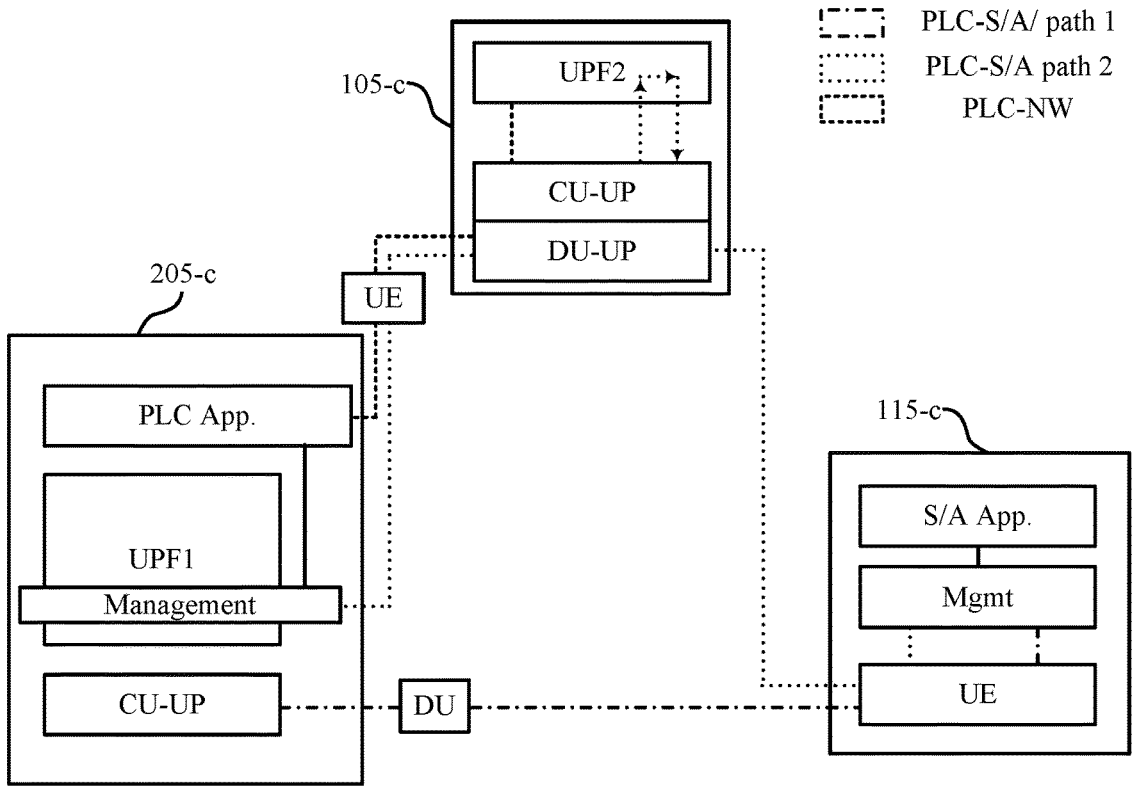
FIGS. 8A & 8B illustrate examples of a plane configuration that supports architecture and protocols to support industrial IoT and wireless PLC communications in accordance with aspects of the present disclosure.
Figure 8B:
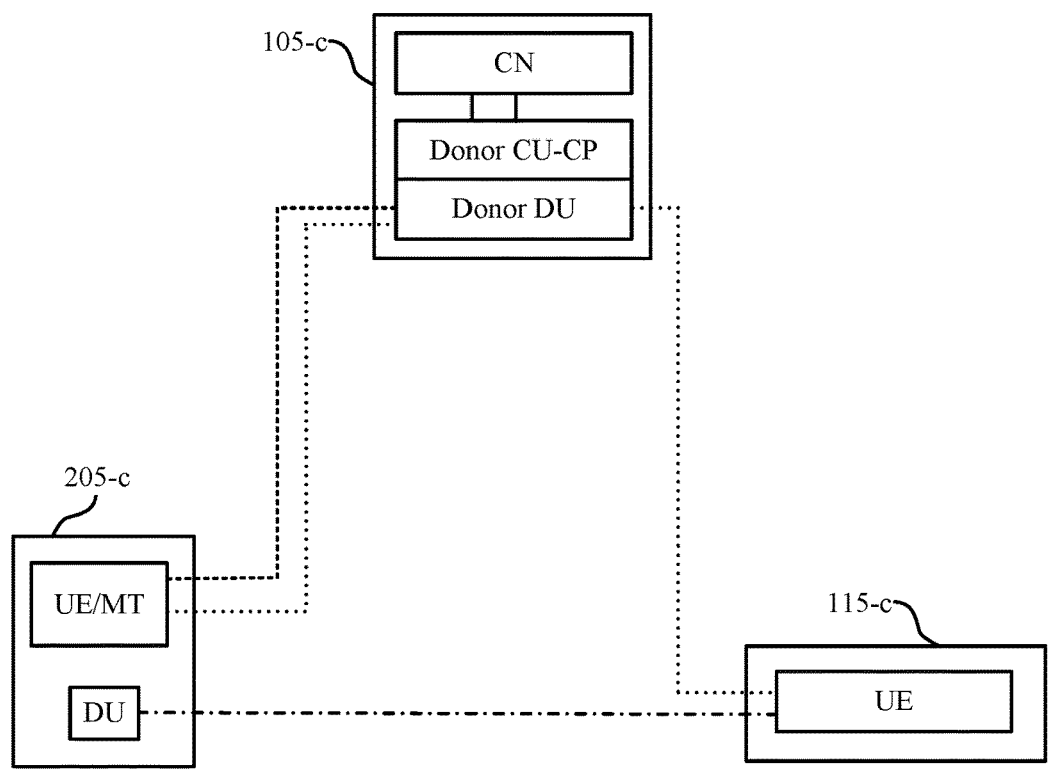

FIGS. 8A & 8B illustrate examples of a plane configuration 801 and 802 that each supports architecture and protocols to support industrial IoT and wireless PLC communications in accordance with aspects of the present disclosure. For example, FIG. 8A may illustrate a UP configuration 801 for Option 2 and FIG. 8B may illustrate a CP configuration 802 for Option 2. Each of FIGS. 8A & 8B may include a PLC 205-c, a relay device 105-c and an S/A 115-c which may be examples of the corresponding devices as described with reference to FIGS. 1 & 2.

Option 2 may include a disaggregated design including a centralized CU-CP thereby minimizing the number of RRCs in the system. For example, the network configuration of Option 2 may include one RRC providing centralized control for each of the Uu interfaces (e.g., Uu1 between the PLC 205-c and the S/A 115-c, Uu2 between the PLC 205-c and the relay device 105-c, and Uu3 between the relay device 105-c and the S/A 115-c). That is Option 2 may include a centralized CU-CP in the CP and a distributed CU-UP in the UP such that a singular RRC may control each Uu communications link in the network.

For example, the UP configuration 801 of Option 2 may be similar to the UP configuration 301 of Option 1 as described with reference to FIG. 3A. However, the CP configuration 802 may include a disaggregated design where the associated network contains one CU-CP (e.g., including one RRC) located at the relay device 105-c. This may offers a centralized RRC that can optimize PLC CPs jointly. That is, as the number of PLCs scales within the network, the number of RRCs remains singular. In such examples, the L2 UP at the PLC 205-c may be connected the RRC at the relay device 105-c via an over-the-air E1 interface.

In the example, of FIG. 8B, the PLC 205-c may not include a CU-CP (e.g., RRC layer). The PLC 205-c may transmit data or control information to the relay device 105-c via an F1-AP/E1 communication link for S/A-NW communications (e.g., according to a second format associated with the F1-AP/E1 connection) and may transmit communications for the S/A 115-c through the relay device 105-c via an RRC communications link (e.g., including Hop 1 and Hop 2), for example, according to a first format associated with the RRC connection. A CU-CP layer of the relay device 105-c may support Path 1, Path 2, and PLC-NW traffic.

FIGS. 9A & 9B illustrate examples of a CP protocol stack 901 and 902 that each support architecture and protocols to support industrial IoT and wireless PLC communications in accordance with aspects of the present disclosure. For example, the CP protocol stacks 901 and 902 may correspond to portions of a CP protocol stack that support path 1 of the multi-path communications scheme according to Option 2.

According to Option 2, (e.g., which includes a disaggregated CU-CP design) the RRC may be located at a CU-CP layer 910 of the relay device 105-c which may enable a centralized CP, potential PLC coordination, and lower costs & complexity and may include an AMF 905. The RRC located in the CU-CP layer 910 may behave similarly to an IAB architecture in the CP.

The CP may not scale with the number of PLCs in the industrial network unlike the UP where the number of CU-UP and UPF(s) is equal to the number of PLCs and may use an F1-AP interface between the CU-CP and each S/A 115 of the network (e.g., including S/A 115-c). In the example of Option 2, the UP may be similar to Option 1 in that the two portions of Path 2 may be visible to the relay device 105-c as separate UE paths.

In the example of FIG. 9B, the disaggregated design may include an OTA E1 interface between the CU-CP 910 of the relay device 105-c and the CU-UP of the PLC 205-c while the rest of the UP and CP protocol stacks may be similar to the CP stack and UP stack described with reference to Option 1 (e.g., FIGS. 3-7) and may include a non-disaggregated design.

The E1 interface may enable disaggregated design communications and may include OTA communications between the base station components of the PLC 205-c and the relay device 105-c.

FIG. 10 illustrates an example of a process flow 1000 that supports architecture and protocols to support industrial IoT and wireless PLC communications in accordance with aspects of the present disclosure. For example, the process flow 1000 may depict portions of a method for establishing Path 1 between the PLC 205-c and S/A 115-b according to the architecture of Option 2. The establishment of Path 2 between the PLC 205-c, the relay device 105-c and the S/A 115-c, may be similar to the procedure described in Option 1 with reference to FIG. 7.

The PLC 205-c, the relay device 105-c, and the S/A 115-c may perform an RRC configuration procedure 1005 for establishing Path 1. The RRC configuration procedure 1005 may include transmitting an RRC connection setup request by the S/A 115-c at 1010; communicating an initial RRC message transfer over F1 via MT at 1015; a completion of the RRC setup at 1020; an RRC message transfer at 1025; a Bearer context setup at 1030; an RRC message transfer at 1035; and an RRC reconfiguration completion at 1040. Based on the RRC configuration procedure 1005, the PLC 205-c may breakout of bearer traffic at the UPF of the PLC 205-c. For example, at 1045, the PLC 205-c may determine the configured RRC channel is for the Uu interface between the PLC 205-c and the S/A 115-c and may perform a breakout procedure for Path 1 data traffic. The PLC 205-c may separate the Path 1 RRC configuration and may connect the Path 1 RRC configuration to the UPF of the PLC 205-c and may use the UPF for UP protocols. At 1050, Path 1 may be established based on performing the breakout procedure for Path 1 data traffic at 1045.

For example, in a traditional IAB architecture, the PLC 205-c may include an application that may act as a gateway or a relay to the relay device 105-d. However, in Option 2, the PLC 205-c may include an application that additionally controls the S/A 115-c. But, because the S/A 115-c is communicating with the PLC 205-c application rather than the relay device 105-c (or, for example, the network associated with the relay device 105-c) and because the RRC layer is collocated with the relay device 105-c, traditionally communications would travel from the S/A 115-c to the PLC 205-c and then to the relay device 105-c and then to the internet, but instead communications intended for the PLC 205-c or the S/A 115-c are broken out by the UPF function of the PLC 205-c so Path 1 communications end up at the intended recipient. In some examples, communications may be broken out according to a format of the communications.

FIGS. 11A & 11B illustrate examples of a plane configuration 1101 and 1102 that each supports architecture and protocols to support industrial IoT and wireless PLC communications in accordance with aspects of the present disclosure. For example, FIG. 11A may illustrate a UP configuration 1101 for Option 3 and FIG. 11B may illustrate a CP configuration 1102 for Option 3. Each of FIGS. 11A & 11B may include a PLC 205-d, a relay device 105-d and an S/A 115-d which may be examples of the corresponding devices as described with reference to FIGS. 1 & 2.

Option 3 uses an existing Dual Connectivity (PDCP duplication) framework to offer path diversity. For example, path management and control may be performed via the PDCP and a management layer may not be used to maintain a dual-stack for the PLC-S/A connection (e.g., Path 1). Further, the S/A 115-d may not maintain an IP address for each of Paths 1 and 2. Option 3 may include a disaggregated design because one CU-CP exists at the relay device 105-c. For example, the PLC 205-d may not include a CU-CP and may utilize the CU-CP at the relay device 105-d which may centralize the CU-CP and may control each RRC connection of the system The first path (e.g., Path 1) is a direct path between the PLC 205-d (e.g., PLC femtocell) and the S/A 115-d. The second path (e.g., Path 2) uses an RLC leg to establish dual connectivity. Path 2 utilizes a newly added DU L2 forwarding functionality according to IP or BAP protocols, where the receiving PDCP may aggregate dual transmissions.

For example, the IAB-MT of the relay device 105-d may use RLC forwarding and the IAB-DU of the UE portion 1105 of PLC 205-d may determine a set of forwarding rules from the RLC channel ID for receiving the first data. In some examples, one or more of the forwarding rules may be based on a format of the first data.

PDCP duplication may obviate a use for an addition management layer at the PLC 205-d and the S/A 115-d (e.g., as described with reference to Option 1). PDCP duplication may include duplication and routing a PDCP layer of the relay device 105-d (e.g., existing within the CU-UP and the CU-CP of the relay device 105-d).

In some examples, forwarding may be performed by the DU layer of the relay device 105-d and may bypass the UPF layer and the CU-UP layer of the relay device 105-d thereby decreasing a latency associated with communicating the data packet via Path 2. The UPF layer and the CU-UP layer may be provided for PLC-NW traffic.

In the CP, the RRC layer may be centralized at the relay device 105-d, similarly as in Option 2 (e.g., as described with reference to FIGS. 8 through 10).

FIG. 12 illustrates an example of a UP protocol stack 1200 that supports architecture and protocols to support industrial IoT and wireless PLC communications in accordance with aspects of the present disclosure. For example, the UP protocol stack 1200 may correspond to a UP protocol stack that supports Path 1 and Path 2 of the multi-path communications scheme according to Option 3.

Option 3 may include PDCP duplication between the CU-UP of the PLC 205-d and the S/A 115-d to obtain path redundancy. This may obviate a use for a management layer because the PDCP may manage duplication, routing security, path control and management, etc. Path 1 may act as the primary path in PDCP duplication/MN in dual connectivity and path 2 may tunnel the secondary path (SN) over the F1-U layer.

In some examples (e.g., some traditional examples), PDCP duplication may involve a PDCP layer of the relay device 105-c managing two redundant communication links connected to a same UE 115. In some examples, the redundant communication links may be associated with different TRPs or different MAC entities and may include a single communication hop and may thereby be formatted according to an association with the different TRPs of MAC entities. The example of Option 3, however may include an additional forwarding entity such as a DU or an MT including a DU. That is, Option 3 may newly present an architecture for PDCP duplication via an indirect path including multiple hops (e.g., Path 2). The relay device 105-d may include an IAB node and may be configured via a GTP-U tunnel with BAP layer protocols for backhaul connections. In some examples, a data packet transmitting via Path 2 may include different or additional formatting as compared to a data packet transmitted via Path 1 for compatibility with the GTP-U tunnel and the BAP layer protocols, where the format may indicate that the data packet is to be forwarded to an S/A.

The BAP layer, and the GTP-U layer may add additional headers to a data packet intended for the S/A 115-*d* that may not be supported by the S/A 115-*d*. For example, each layer at the PLC 205-*d* may add an extra bit or an extra header, some of which may be unable to be read by the S/A 115-*d*. In such examples, one or more layers of the relay device 105-*d* may strip the unsupported headers (e.g., the BAP header) and may forward the stripped data packet to the S/A 115-*d* via the DU portion of the relay device 105-*d* which may transmit the stripped data packet over the second hop of Path 2 (e.g., Uu3).

In other words, a backhaul header may be added over the indirect path (e.g., Path 2) so that the data packet may be transmitted from the PLC 205-*d* to the relay device 105-*d*. But, because the Uu3 is not a backhaul connection, the relay device 105-*d* may strip the backhaul header from the data packet for transmission to the S/A 115-*c* via Hop 2 of Path 2. In some examples, the backhaul header may indicate to the relay device 105-*d* that the data packet is intended for the S/A 115-*d*

In some examples, along path 2, the relay device 105-*d* may receive a first hop via the F1-U layer and may terminate the F1-U tunnel at the DU and may preform L2 forwarding to the S/A 115-*d*. In some example, the forwarding may be entirely performed in the DU layer based on an RLC LCID which may obviate a use for UPF L3 forwarding.

In some examples, the transmitting PDCP of the PLC 205-*d* and the receiving PDCP of the S/A 115-*d* of Path 1 may utilize split bearers to send the traffic over the two paths according to policy/network conditions. In some examples, the protocol stack CP of Option 3 may be similar to the protocol stack CP of Option 2. An $X_n$ interface may be maintained over the MN and SN through the IAB interface. In some examples, DU forwarding may be based on RLC ID and in some examples may be based on an IP/BAP address.

FIG. 13 illustrates an example of a process flow 1300 that supports architecture and protocols to support industrial IoT and wireless PLC communications in accordance with aspects of the present disclosure. For example, the process flow 1300 may depict portions of a method for establishing Path 2 between the PLC 205-*c* and S/A 115-*b* via the relay device 105-*d* according to the architecture of Option 3. The establishment of Path 2 between the PLC 205-*c*, the relay device 105-*c* and the S/A 115-*c*, may be similar to other options described herein.

Process flow 1300 may depict a secondary path (e.g., Path 2) activation procedure. For example, at 1305, a DU layer of the relay device 105-*d* may transmit a UE capability enquiry to the S/A 115-*d* and the S/A 115-*d* may in turn transmit a UE capability response. At 1310, the S/A 115-*d* may transmit a measurement report to a DU layer of the PLC 205-*d* which, at 1315, may forward the report to the CU-CP layer of the relay device 105-*d*. Based on receiving the measurement report, at 1320, the CU-CP may trigger a secondary cell (SCell) addition procedure for relayed communications between the relay device 105-*d* and the S/A 115-*d*.

At 1325, the PLC 205-*d* and the CU-CP may perform an RRC message transfer to support an RRC (re)configuration procedure between the CU-CP of the relay device 105-*d* and the PLC 205-*d* and between the CU-CP and the S/A 115-*d*.

In some example, at 1335, the CU-UP of the PLC 205-*d* may be configured to establish a new RLC link to transmit communications to the relay device 105-*d* over an F1 interface using a BAP address (e.g., BAP header bit as part of a second format for Path 2 communications) for forwarding to the S/A 115-*d*. In some examples, based on the RRC (re)configuration procedure at 1330, at 1340, a bearer context may be configured and may include adding headers to traffic (e.g., as part of the second format for Path 2 communications) and transmitting traffic to the CU-CP where forwarding occurs and some headers are removed. At 1345, the CU-CP may transmit a MAC-CE for SCell activation to the S/A 115-*d*. As such, at 1350, a data packet transmitted via Path 2 may be communicated via Hop 1, the relay device 105-*d* may perform RLC/BAP forwarding and may forward the data packet to the S/A 115-*d* via hop 2. In some examples, the relay device 105-*d* may perform the RLC/BAP forwarding based on the data packet having the second format.

FIGS. 14A & 14B illustrates examples of a plane configuration 1401 and 1402 that each supports architecture and protocols to support industrial IoT and wireless PLC communications in accordance with aspects of the present disclosure. For example, FIG. 14A may illustrate a UP configuration 1401 for Option 4 and FIG. 14B may illustrate a CP configuration 1402 for Option 4. Each of FIGS. 14A & 14B may include a PLC 205-*e*, a relay device 105-*e* and an S/A 115-*e* which may be examples of the corresponding devices as described with reference to FIGS. 1 & 2.

Option 4 uses a similar PDCP duplication design to Option 3 for a non-disaggregated design, i.e., the PLC 205-*e* may include a CU-CP that has an RRC and a PDCP-C. This enables the PDCP of the relay device 105-*e* and the PDCP of the PLC 205-*e* to establish an Xn-AP interface to signal information to aid with interference management, mobility management and dual connectivity.

An Xn interface may be maintained over MN and SN through the IAB interface. In some examples, Option 4 may include a CU-CP (e.g., RRC layer) at the PLC 205-*e* unlike Option 3.

FIG. 15 illustrates an example of a UP protocol stack 1500 that supports architecture and protocols to support industrial IoT and wireless PLC communications in accordance with aspects of the present disclosure. For example, the UP protocol stack 1500 may correspond to a UP protocol stack that supports Path 1 and Path 2 of the multi-path communications scheme according to Option 4.

Option 4 may be similar to Option 3 in the UP (e.g., as described with reference to FIG. 12). For example, Both of Options 3 and 4 may include PDCP duplication where one path is the direct path (e.g., Path 1) and the second Path (e.g., Path 2) flows over the F1-U layer (e.g., data packets having a second format may flow over the F1-U layer).

In some examples, Option 4 may include an Xn interface between the PDCP layer of the PLC 205-*e* CU layer and relay device 105-*e* CU layer. This may enable the PDCP-U to interact across the PLC 205-*e*/relay device 105-*e* connection for duplication, handover, etc. In some examples, the Xn interface may be associated with one or more headers of the second format for communicating the data packet.

FIG. 16 illustrates an example of a CP protocol stack 1600 that supports architecture and protocols to support industrial IoT and wireless PLC communications in accordance with aspects of the present disclosure. For example, the CP protocol stack 1600 may correspond a CP protocol stack that supports Path 1 of the multi-path communications scheme according to Option 4.

Option 4 may include a non-disaggregated design by maintaining a CU-CP containing an RRC at each PLC 205, which may enable the relay device 105-*e* and PLC 205-*e* PDCP-C to communicate via an Xn-AP interface in both the user and CP. The presence of an Xn-AP interface between the relay device 105-*e* and the PLC 205-*e* may enables gNB-PLC optimizations in interference management, mobility management and dual connectivity.

Figure 17A:
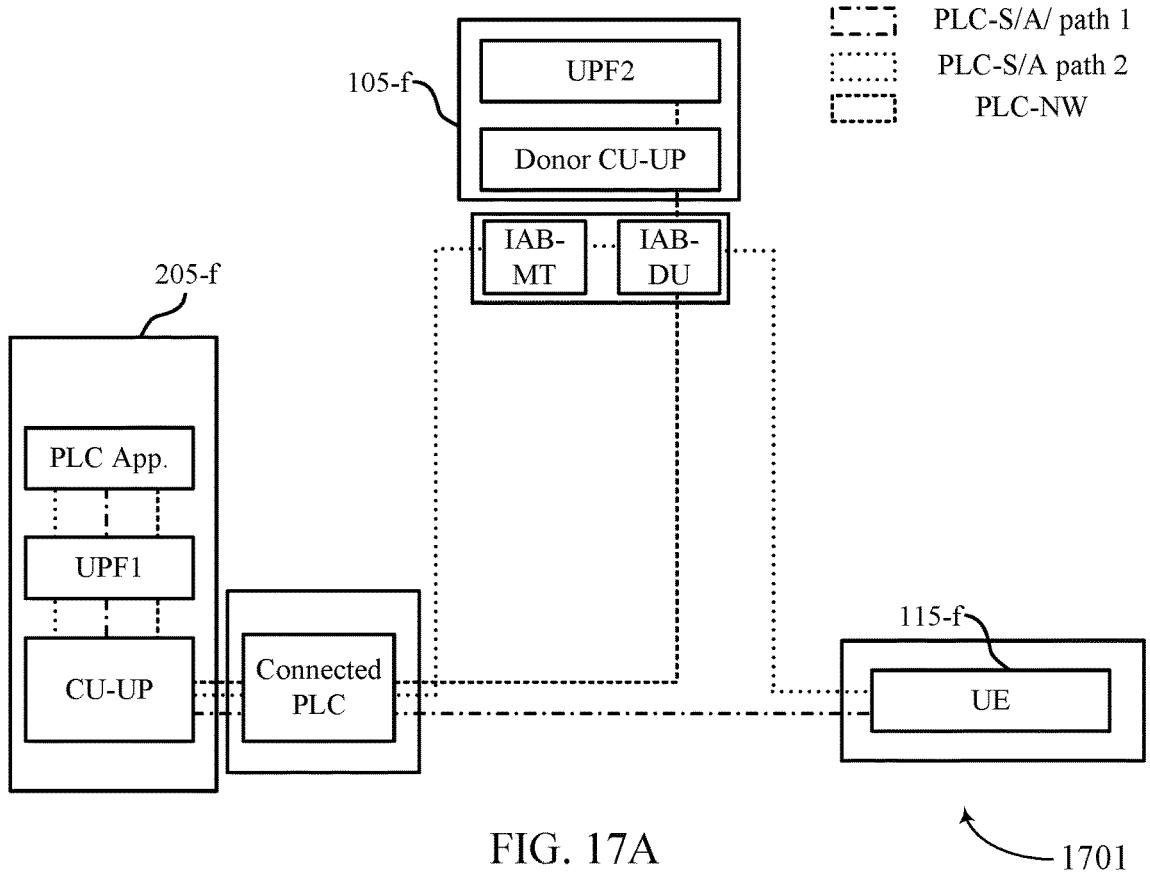
FIGS. 17A & 17B illustrate examples of a plane configuration that supports architecture and protocols to support industrial IoT and wireless PLC communications in accordance with aspects of the present disclosure.
Figure 17B:
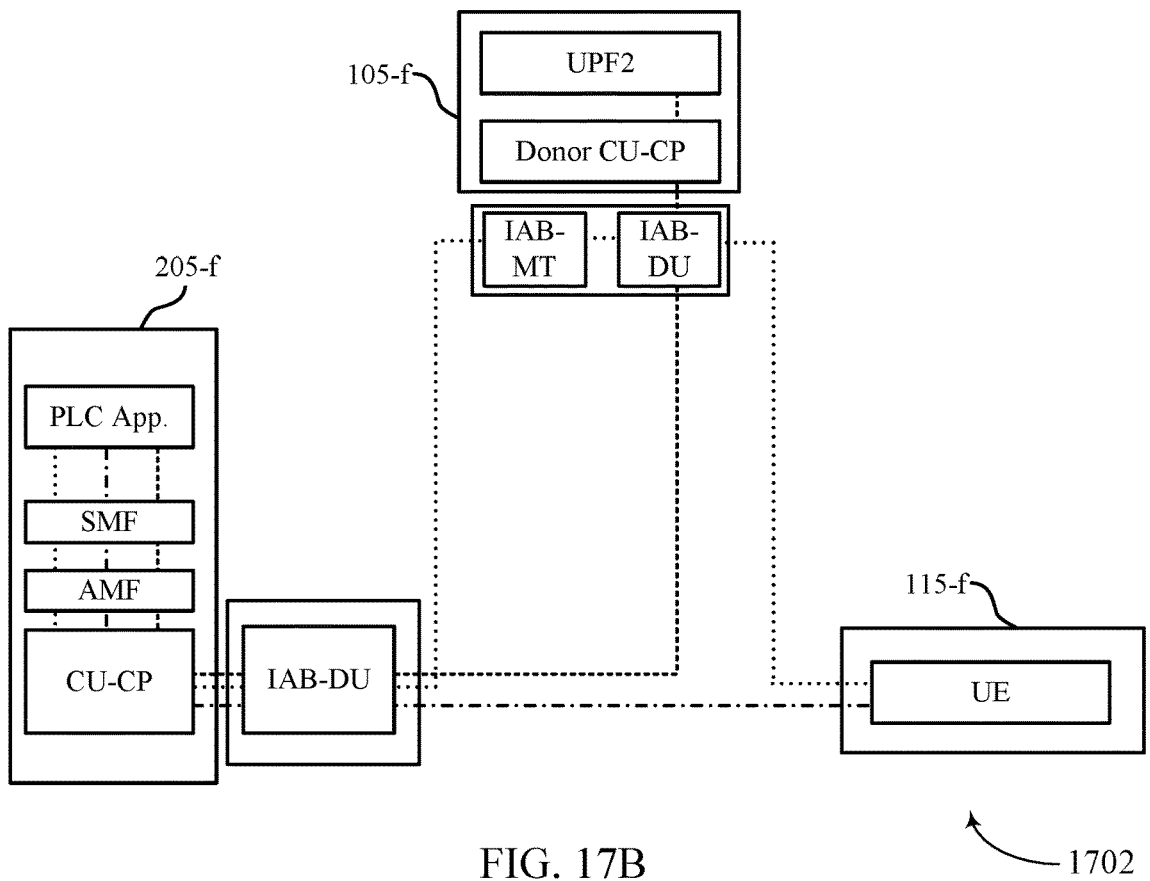

FIGS. 17A & 17B illustrates examples of a plane configuration 1701 and 1702 that each supports architecture and protocols to support industrial IoT and wireless PLC communications in accordance with aspects of the present disclosure. For example, FIG. 17A may illustrate a UP configuration 1701 for Option 5 and FIG. 17B may illustrate a CP configuration 1702 for Option 5. Each of FIGS. 17A & 17B may include a PLC 205-*f*, a relay device 105-*f* and an S/A 115-*f* which may be examples of the corresponding devices as described with reference to FIGS. 1 & 2.

Option 5 may include a traditional IAB structure with a small deviation, where instead of assuming that the relay device 105-*b* includes a donor, it may be assumed that each PLC of the network (e.g., including PLC 205-*f*) is a donor including UP and CP CN elements such as UPF, AMF and SMF (e.g., core network elements). This may enables the PLC 205-*f* to perform all donor functionalities (e.g., as previously performed by the relay device 105 with respect to Options 1-4) and may be similar to a "network-in-a-box" solution. This may present design challenges as PLC are generally relatively small devices. The PLC 205-*f* may use the relay device 105-*f* (or, for example, any other IAB node that may be connected to another PLC) for L2 BAP forwarding (e.g., backhaul forwarding). Option 5 may add complexity to each PLC deployment (e.g., compared to Options 1-4) and may present a significant challenge in terms of cost and complexity for deployments with a large number of PLCs.

Figure 18A:
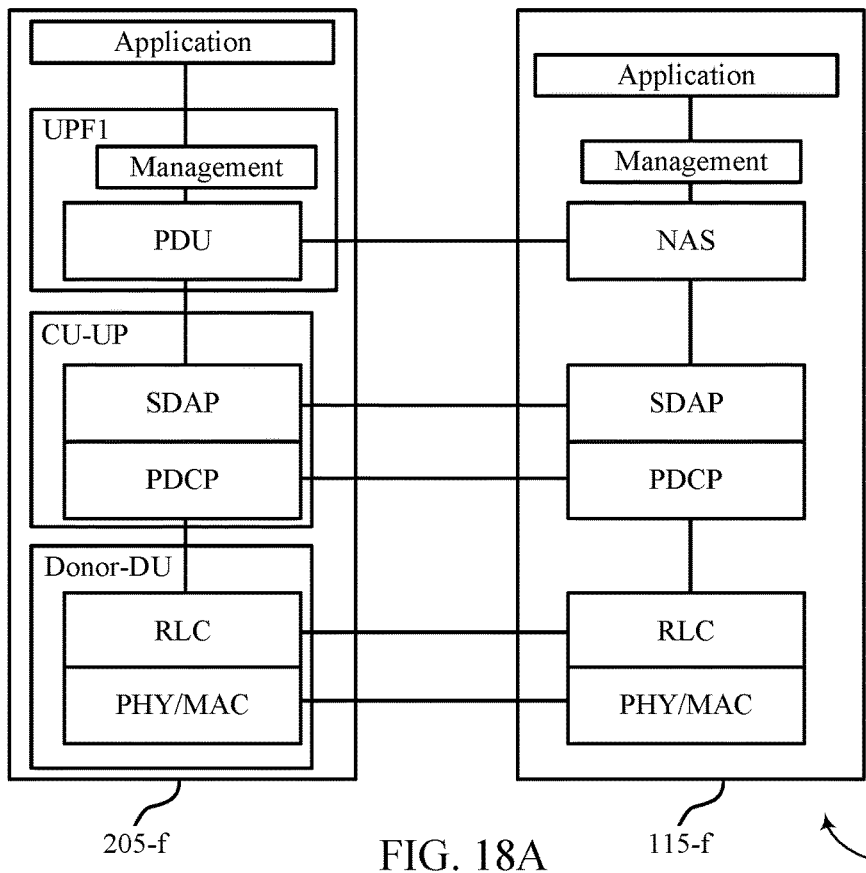
FIGS. 18A & 18B illustrate examples of a user plane protocol stack that supports architecture and protocols to support industrial IoT and wireless PLC communications in accordance with aspects of the present disclosure.
Figure 18B:
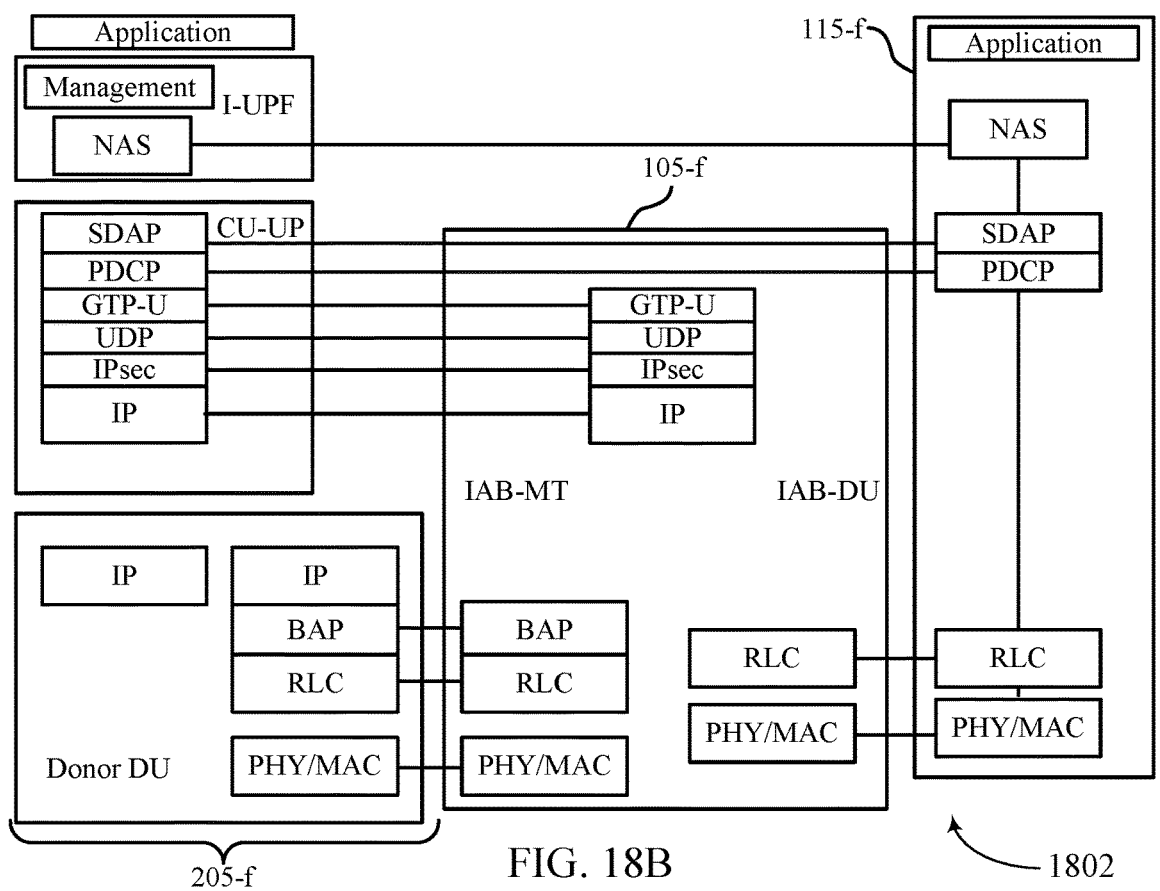

FIGS. 18A & 18B illustrate examples of UP protocol stacks 1801 and 1802 that each supports architecture and protocols to support industrial IoT and wireless PLC communications in accordance with aspects of the present disclosure. For example, the UP protocol stack 1801 may correspond to a UP protocol stack that supports Path 1 of the multi-path communications scheme and the UP protocol stack 1802 may correspond to a UP protocol stack that supports Path 2 of the multi-path communications scheme according to Option 5.

The architecture for Option 5 may include an IAB architecture with the donor components located at the PLC 205-*f*. The relay device 105-*f* in this case may be used as an IAB forwarding node (via BAP header) for Path 2. Additionally, or alternatively, any IAB node may be used to offer an alternative path, e.g., PLC 205-*f*→PLC 205-*x*→S/A 115-*f*.

Figure 19A:
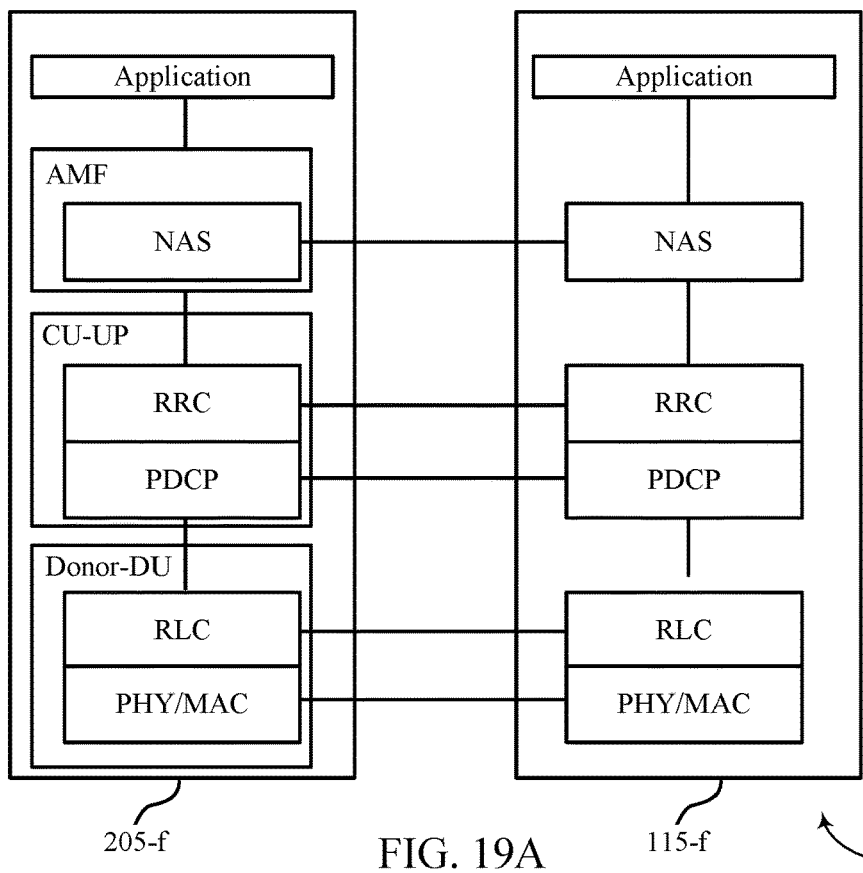
FIGS. 19A & 19B illustrate examples of a control plane protocol stack that supports architecture and protocols to support industrial IoT and wireless PLC communications in accordance with aspects of the present disclosure.
Figure 19B:
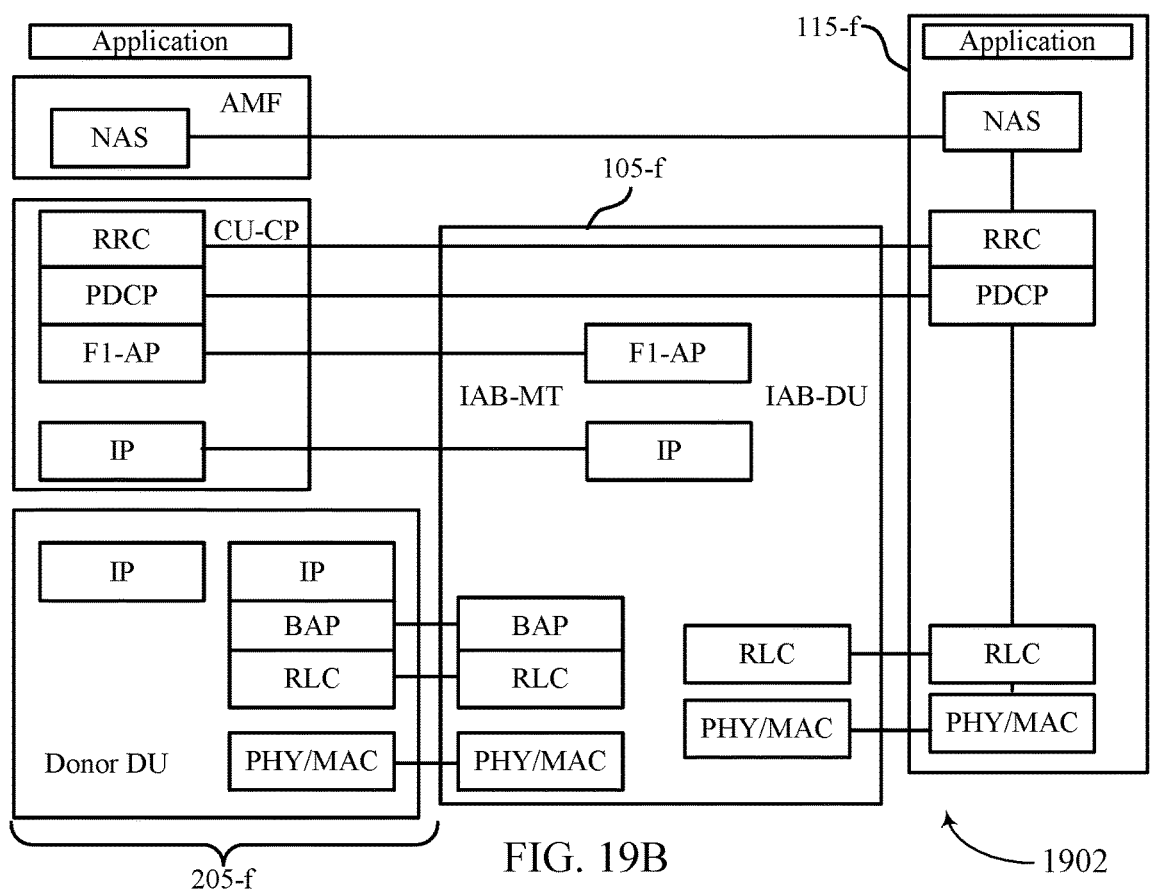

FIGS. 19A & 19B illustrate examples of CP protocol stacks 1901 and 1902 that each supports architecture and protocols to support industrial IoT and wireless PLC communications in accordance with aspects of the present disclosure. For example, the CP protocol stack 1600 may correspond a CP protocol stack that supports Path 1 and Path 2 of the multi-path communications scheme according to Option 5.

Option 5 may include placement of the AMF (and all CN functionality) at the PLC 205-*f* in a "network-in-a-box" architecture which may make the implementation of Option 5 complex with poor scaling and may also leave a gap on how the PLC AMFs may obtain an initial configuration. Option 5 may describe a deployment of an IAB-based architecture to support the application, however, placement of all CN functionality in the PLC 205-*f* may be a design challenge.

Figure 20:
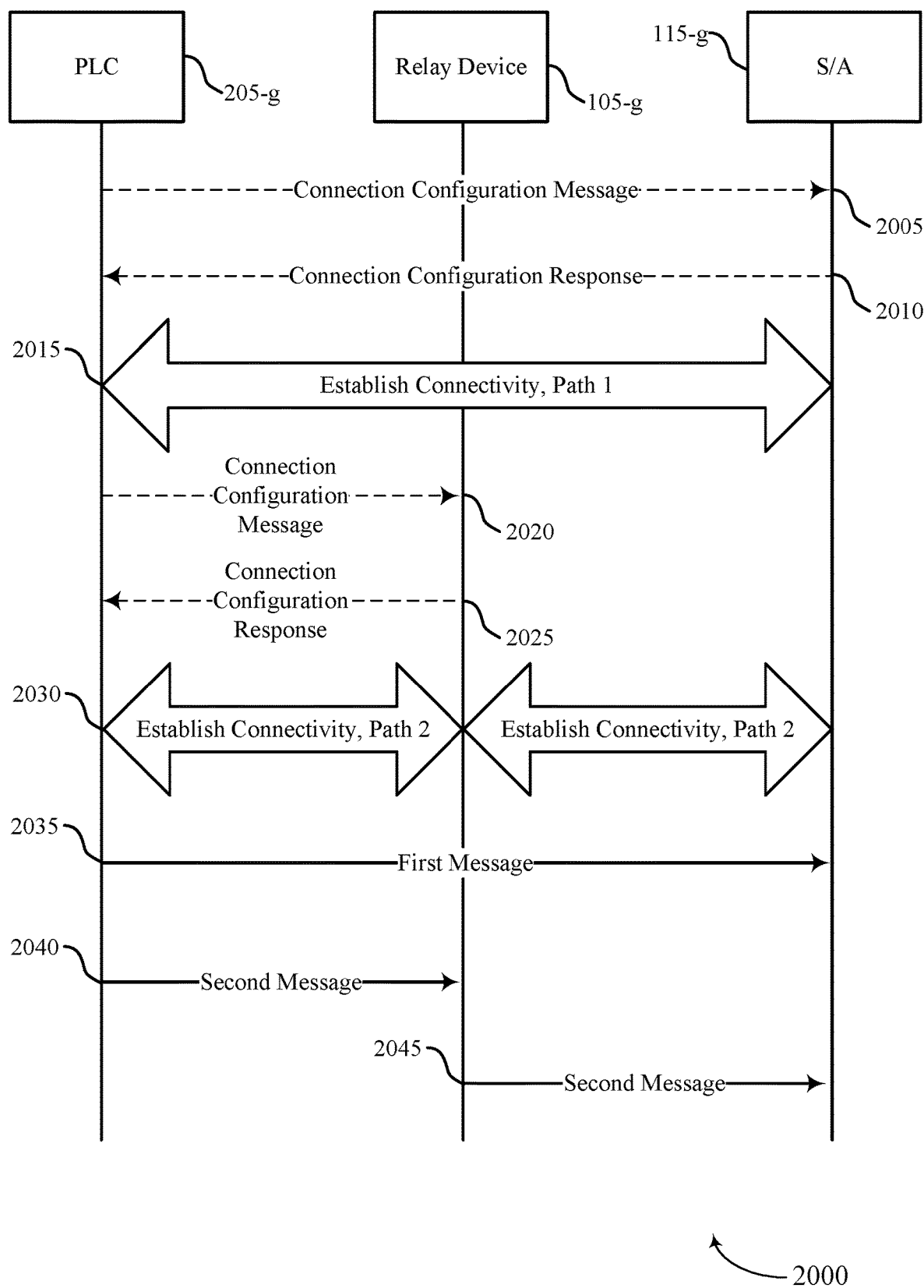
FIG. 20 illustrates an example of a process flow that supports architecture and protocols to support industrial IoT and wireless PLC communications in accordance with aspects of the present disclosure.

FIG. 20 illustrates an example of a process flow 2000 that supports architecture and protocols to support industrial IoT and wireless PLC communications in accordance with aspects of the present disclosure. For example, the process flow 2000 may illustrate operations between a PLC 205-*g*, a relay device 105-*g*, and an S/A 115-*g*, which may be examples of the corresponding devices as described with reference to FIGS. 1 & 2. In the following description of the process flow 2000, the operations between the PLC 205-*g*, the relay device 105-*g*, and the S/A 115-*g* may be transmitted in a different order than the example order shown, or the operations performed by the PLC 205-*g*, the relay device 105-*g*, and the S/A 115-*g* may be performed in different orders or at different times or by different devices. Some operations may also be omitted from the process flow 2000, and other operations may be added to the process flow 2000. One or more of the operations illustrated in process flow 2000 may be applicable to each of Options 1-5.

In some examples, at 2005, the PLC 205-*g* may transmit a connection configuration message to the S/A 115-*g*. In some examples, the connection configuration message may be a part of a first RRC (re)configuration procedure. In some examples, the RRC (re)configuration procedure may determine a first format of communications transmitted via an associated RRC connection.

In some examples, at 2010, the S/A 115-*g* may transmit a connection configuration response to the PLC 205-*g*. In some examples, the connection configuration response may be a part of the first RRC (re)configuration procedure.

At 2015, the PLC 205-*g* and the S/A 115-*g* may establish a Path 1 according to any of the example Options described herein (e.g., any of Options 1-5). In some examples, Path 1 may be established based on the first RRC (re)configuration procedure.

In some examples, at 2020, the PLC 205-*g* may transmit a connection configuration message to the relay device 105-*g*. In some examples, transmitting a connection configuration message to the relay device 105-*g* for establishing a Path 2 may be based on one or more channel conditions associated with Path 1 communications (e.g., interference, low reliability, etc.). For instance, an observed interference level on Path 1 exceeding a first threshold, an observed channel reliability level on Path 1 falling below a second threshold, or both, may prompt establishment of Path 2. In some examples, the connection configuration message may be a part of a second RRC (re)configuration procedure. In some examples, the second RRC (re)configuration procedure may determine a second format of communications transmitted via an associated second RRC connection.

In some examples, at 2025, the relay device 105-*g* may transmit a connection configuration response to the PLC 205-*g*. In some examples, the connection configuration response may be a part of the second RRC (re)configuration procedure.

At 2030, the PLC 205-*g* and the relay device 105-*g* may establish a Path 2 according to any of the example Options described herein (e.g., any of Options 1-5). In some examples, Path 2 may be established based on the second RRC (re)configuration procedure.

At 2035, the PLC 205-*g* may transmit data via a first data message via Path 1 to the S/A 115-*g*. In some examples, the first data message may be associated with or may have the first format.

At 2040, the PLC 205-*g* may transmit the data via a second data message via a first portion of Path 2 to the relay device 105-*g*. In some examples, the second data message transmitted via the first portion of Path 2 may be associated with or may have the second format that indicates the relay device 105-g should forward the data to the S/A 115-g.

At 2045, the relay device 105-g may forward the data via a third data message to the S/A 115-g via a second portion of Path 2. In some examples, the third data message transmitted via the second portion of Path 2 may be associated with or may have a third format.

Figure 21:
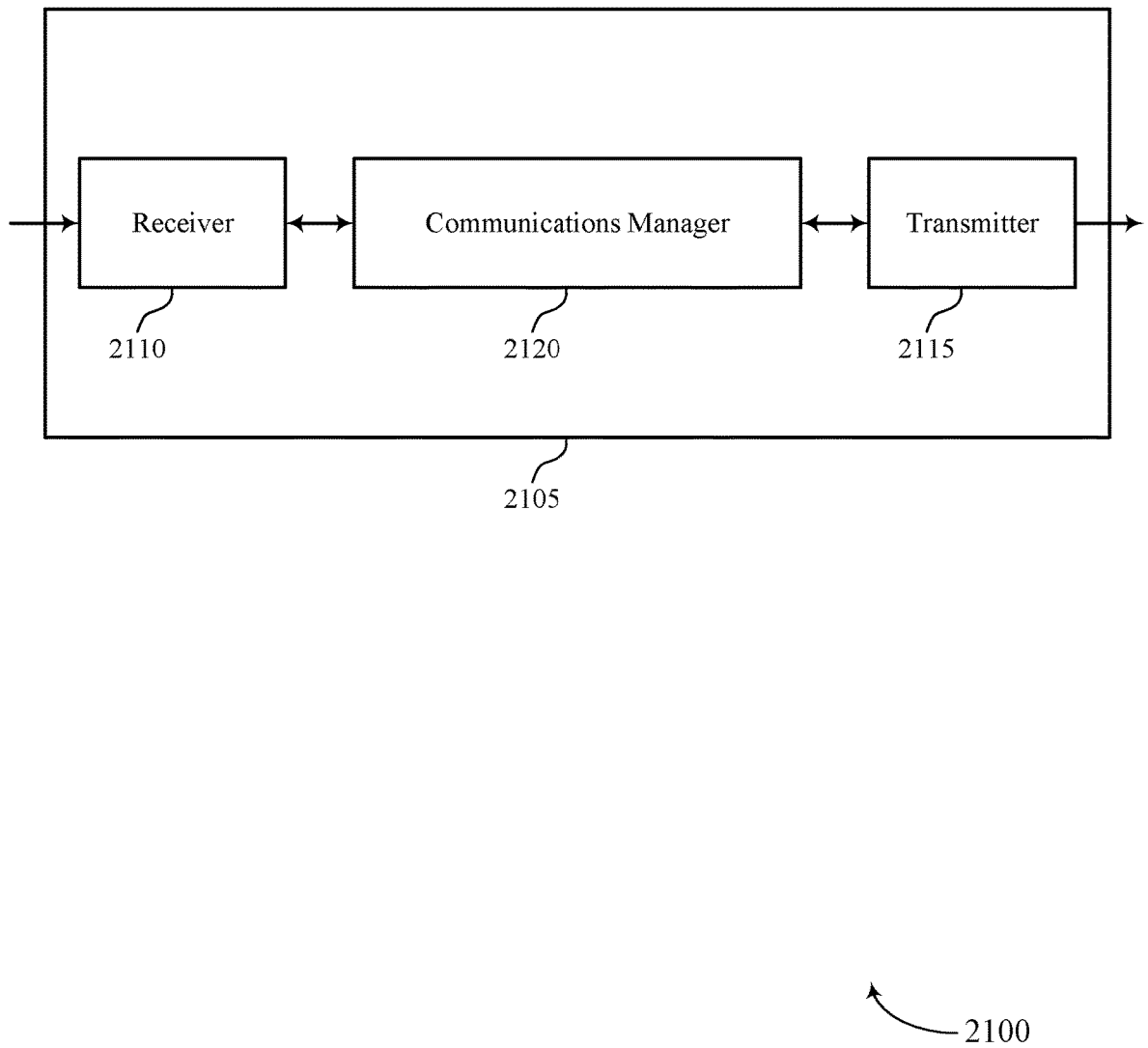
FIGS. 21 and 22 show block diagrams of devices that support architecture and protocols to support industrial IoT and wireless PLC communications in accordance with aspects of the present disclosure.

FIG. 21 shows a block diagram 2100 of a device 2105 that supports architecture and protocols to support industrial IoT and wireless PLC communications in accordance with aspects of the present disclosure. The device 2105 may be an example of aspects of a UE 115 as described herein. The device 2105 may include a receiver 2110, a transmitter 2115, and a communications manager 2120. The device 2105 may also include a processor. Each of these components may be in communication with one another (e.g., via one or more buses).

The receiver 2110 may provide a means for receiving information such as packets, user data, control information, or any combination thereof associated with various information channels (e.g., control channels, data channels, information channels related to architecture and protocols to support industrial IoT and wireless PLC communications). Information may be passed on to other components of the device 2105. The receiver 2110 may utilize a single antenna or a set of multiple antennas.

The transmitter 2115 may provide a means for transmitting signals generated by other components of the device 2105. For example, the transmitter 2115 may transmit information such as packets, user data, control information, or any combination thereof associated with various information channels (e.g., control channels, data channels, information channels related to architecture and protocols to support industrial IoT and wireless PLC communications). In some examples, the transmitter 2115 may be co-located with a receiver 2110 in a transceiver module. The transmitter 2115 may utilize a single antenna or a set of multiple antennas.

The communications manager 2120, the receiver 2110, the transmitter 2115, or various combinations thereof or various components thereof may be examples of means for performing various aspects of architecture and protocols to support industrial IoT and wireless PLC communications as described herein. For example, the communications manager 2120, the receiver 2110, the transmitter 2115, or various combinations or components thereof may support a method for performing one or more of the functions described herein.

In some examples, the communications manager 2120, the receiver 2110, the transmitter 2115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 2120, the receiver 2110, the transmitter 2115, or various combinations or components thereof may be implemented in code (e.g., as communications management software or firmware) executed by a processor. If implemented in code executed by a processor, the functions of the communications manager 2120, the receiver 2110, the transmitter 2115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 2120 may be configured to perform various operations (e.g., receiving, monitoring, transmitting) using or otherwise in cooperation with the receiver 2110, the transmitter 2115, or both. For example, the communications manager 2120 may receive information from the receiver 2110, send information to the transmitter 2115, or be integrated in combination with the receiver 2110, the transmitter 2115, or both to receive information, transmit information, or perform various other operations as described herein.

The communications manager 2120 may support wireless communication at wireless device in accordance with examples as disclosed herein. For example, the communications manager 2120 may be configured as or otherwise support a means for establishing connectivity between the wireless device and a UE via a first communication path, and between the wireless device and the UE via a second communication path that includes a relay device. The communications manager 2120 may be configured as or otherwise support a means for transmitting, via the first communication path, a first message in a first format to the UE, the first message including first data. The communications manager 2120 may be configured as or otherwise support a means for transmitting, via the second communication path to the relay device, a second message in a second format and including the first data, the second format indicating that the relay device is to relay the first data to the UE.

Additionally, or alternatively, the communications manager 2120 may support wireless communication at a UE in accordance with examples as disclosed herein. For example, the communications manager 2120 may be configured as or otherwise support a means for establishing connectivity between the UE and a wireless device via a first communication path, and between the UE and the wireless device via a second communication path that includes a relay device. The communications manager 2120 may be configured as or otherwise support a means for receiving, via the first communication path from the wireless device, a first message in a first format, the first message including first data. The communications manager 2120 may be configured as or otherwise support a means for receiving, via the second communication path from the relay device, a second message in a second format and including the first data, the second format indicating that the relay device is to relay the first data to the UE.

By including or configuring the communications manager 2120 in accordance with examples as described herein, the device 2105 (e.g., a processor controlling or otherwise coupled to the receiver 2110, the transmitter 2115, the communications manager 2120, or a combination thereof) may support techniques for reduced processing and reduced power consumption due to higher reliability communications, among other examples.

Figure 22:
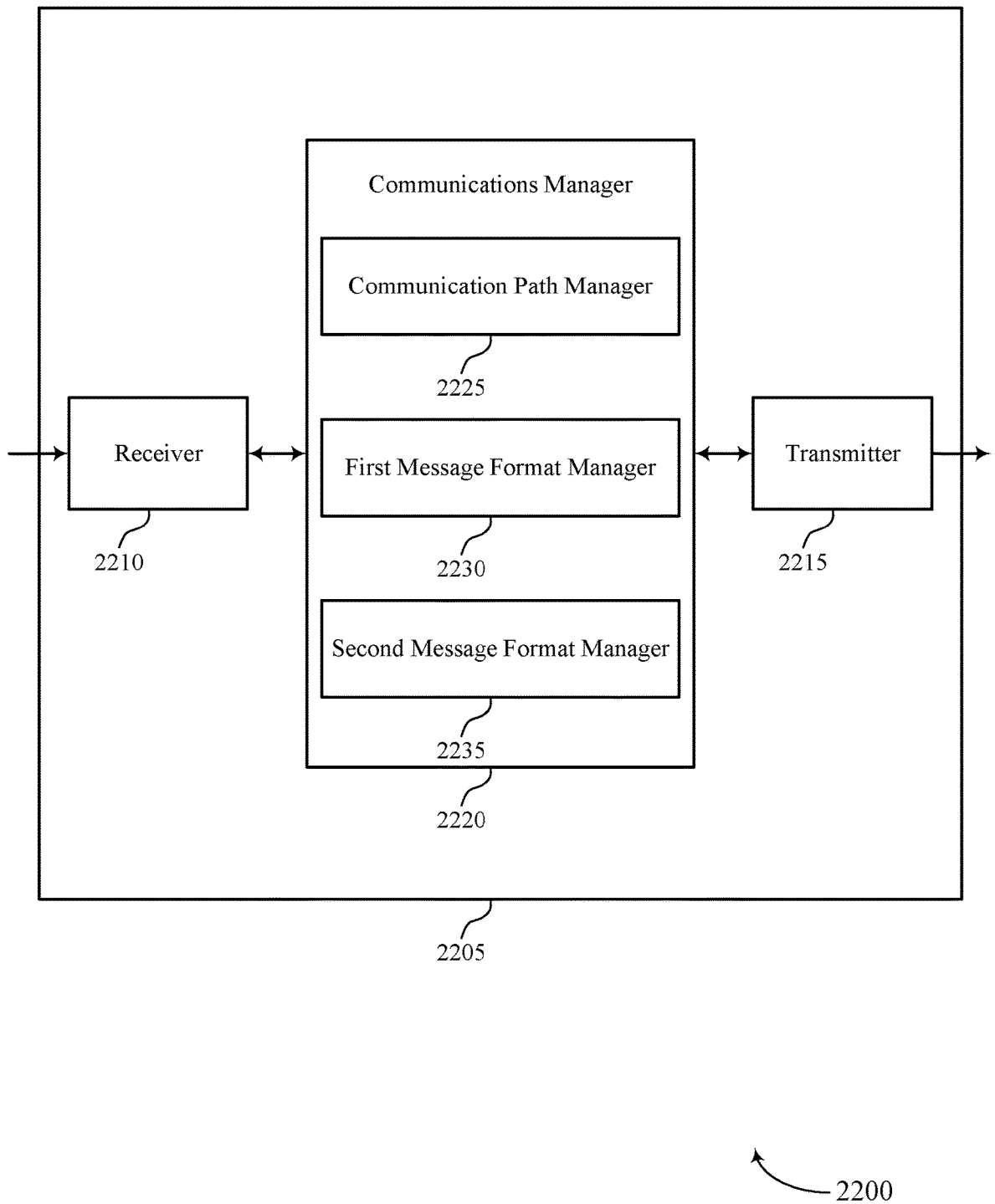

FIG. 22 shows a block diagram 2200 of a device 2205 that supports architecture and protocols to support industrial IoT and wireless PLC communications in accordance with aspects of the present disclosure. The device 2205 may be an example of aspects of a device 2105 or a UE 115 as described herein. The device 2205 may include a receiver 2210, a transmitter 2215, and a communications manager 2220. The device 2205 may also include a processor. Each of these components may be in communication with one another (e.g., via one or more buses).

The receiver 2210 may provide a means for receiving information such as packets, user data, control information, or any combination thereof associated with various information channels (e.g., control channels, data channels, information channels related to architecture and protocols to support industrial IoT and wireless PLC communications). Information may be passed on to other components of the device 2205. The receiver 2210 may utilize a single antenna or a set of multiple antennas.

The transmitter 2215 may provide a means for transmitting signals generated by other components of the device 2205. For example, the transmitter 2215 may transmit information such as packets, user data, control information, or any combination thereof associated with various information channels (e.g., control channels, data channels, information channels related to architecture and protocols to support industrial IoT and wireless PLC communications). In some examples, the transmitter 2215 may be co-located with a receiver 2210 in a transceiver module. The transmitter 2215 may utilize a single antenna or a set of multiple antennas.

The device 2205, or various components thereof, may be an example of means for performing various aspects of architecture and protocols to support industrial IoT and wireless PLC communications as described herein. For example, the communications manager 2220 may include a communication path manager 2225, a first message format manager 2230, a second message format manager 2235, or any combination thereof. The communications manager 2220 may be an example of aspects of a communications manager 2120 as described herein. In some examples, the communications manager 2220, or various components thereof, may be configured to perform various operations (e.g., receiving, monitoring, transmitting) using or otherwise in cooperation with the receiver 2210, the transmitter 2215, or both. For example, the communications manager 2220 may receive information from the receiver 2210, send information to the transmitter 2215, or be integrated in combination with the receiver 2210, the transmitter 2215, or both to receive information, transmit information, or perform various other operations as described herein.

The communications manager 2220 may support wireless communication at wireless device in accordance with examples as disclosed herein. The communication path manager 2225 may be configured as or otherwise support a means for establishing connectivity between the wireless device and a UE via a first communication path, and between the wireless device and the UE via a second communication path that includes a relay device. The first message format manager 2230 may be configured as or otherwise support a means for transmitting, via the first communication path, a first message in a first format to the UE, the first message including first data. The second message format manager 2235 may be configured as or otherwise support a means for transmitting, via the second communication path to the relay device, a second message in a second format and including the first data, the second format indicating that the relay device is to relay the first data to the UE.

Additionally, or alternatively, the communications manager 2220 may support wireless communication at a UE in accordance with examples as disclosed herein. The communication path manager 2225 may be configured as or otherwise support a means for establishing connectivity between the UE and a wireless device via a first communication path, and between the UE and the wireless device via a second communication path that includes a relay device. The first message format manager 2230 may be configured as or otherwise support a means for receiving, via the first communication path from the wireless device, a first message in a first format, the first message including first data. The second message format manager 2235 may be configured as or otherwise support a means for receiving, via the second communication path from the relay device, a second message in a second format and including the first data, the second format indicating that the relay device is to relay the first data to the UE.

Figure 23:
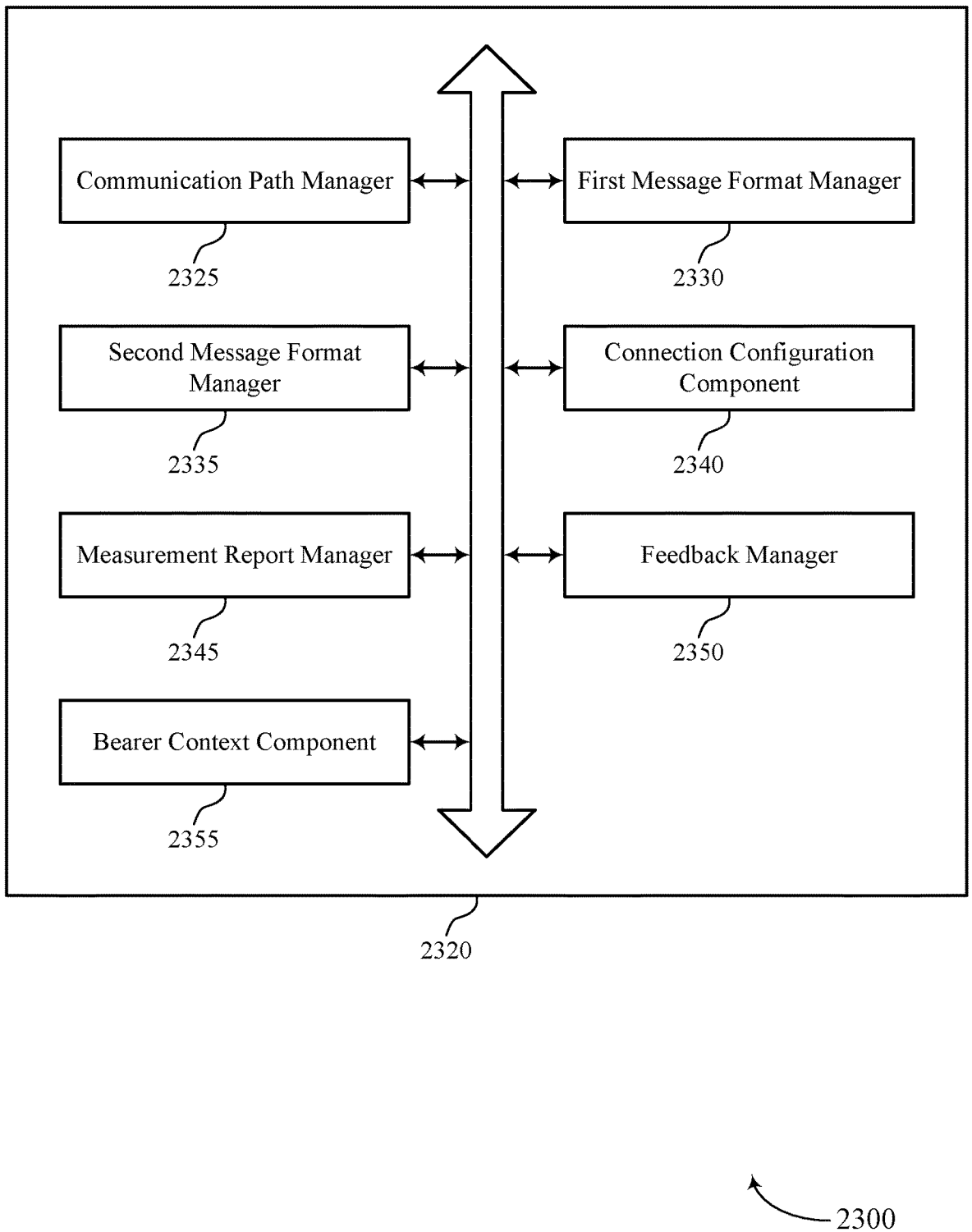
FIG. 23 shows a block diagram of a communications manager that supports architecture and protocols to support industrial IoT and wireless PLC communications in accordance with aspects of the present disclosure.

FIG. 23 shows a block diagram 2300 of a communications manager 2320 that supports architecture and protocols to support industrial IoT and wireless PLC communications in accordance with aspects of the present disclosure. The communications manager 2320 may be an example of aspects of a communications manager 2120, a communications manager 2220, or both, as described herein. The communications manager 2320, or various components thereof, may be an example of means for performing various aspects of architecture and protocols to support industrial IoT and wireless PLC communications as described herein. For example, the communications manager 2320 may include a communication path manager 2325, a first message format manager 2330, a second message format manager 2335, a connection configuration component 2340, a measurement report manager 2345, a feedback manager 2350, a bearer context component 2355, or any combination thereof. Each of these components may communicate, directly or indirectly, with one another (e.g., via one or more buses).

The communications manager 2320 may support wireless communication at wireless device in accordance with examples as disclosed herein. The communication path manager 2325 may be configured as or otherwise support a means for establishing connectivity between the wireless device and a UE via a first communication path, and between the wireless device and the UE via a second communication path that includes a relay device. The first message format manager 2330 may be configured as or otherwise support a means for transmitting, via the first communication path, a first message in a first format to the UE, the first message including first data. The second message format manager 2335 may be configured as or otherwise support a means for transmitting, via the second communication path to the relay device, a second message in a second format and including the first data, the second format indicating that the relay device is to relay the first data to the UE.

In some examples, to support establishing the connectivity between the wireless device and the UE via the first communication path, the connection configuration component 2340 may be configured as or otherwise support a means for transmitting a connection configuration message based on a management layer determination to establish the first communication path. In some examples, to support establishing the connectivity between the wireless device and the UE via the first communication path, the connection configuration component 2340 may be configured as or otherwise support a means for receiving a configuration response message indicating a network address associated with the UE via the first communication path based on the connection configuration message.

In some examples, to support establishing the connectivity between the wireless device and the UE via the second communication path, the connection configuration component 2340 may be configured as or otherwise support a means for transmitting, to the relay device, a first connection configuration message based on a management layer determination to establish the second communication path. In some examples, to support establishing the connectivity between the wireless device and the UE via the second communication path, the connection configuration component 2340 may be configured as or otherwise support a means for receiving, from the relay device, a configuration response message indicating a forwarding network address associated with the second communication path based on the first connection configuration message.

In some examples, to support establishing the connectivity between the wireless device and the UE via the first communication path, the bearer context component 2355 may be configured as or otherwise support a means for transmitting, to the relay device, a message transfer request for establishing a bearer context for communicating with the UE via the first communication path. In some examples, to support establishing the connectivity between the wireless device and the UE via the first communication path, the bearer context component 2355 may be configured as or otherwise support a means for receiving, from the relay device, a bearer context configuration for communicating bearer traffic between the wireless device and the UE based on the message transfer request. In some examples, to support establishing the connectivity between the wireless device and the UE via the first communication path, the bearer context component 2355 may be configured as or otherwise support a means for transmitting, to the UE, a configuration message indicating the bearer context configuration, where the first data transmitted via the first communication path is bearer data.

In some examples, to support establishing the connectivity between the wireless device and the UE via the second communication path, the measurement report manager 2345 may be configured as or otherwise support a means for forwarding, to the relay device, a measurement report based on receiving the measurement report from the UE. In some examples, to support establishing the connectivity between the wireless device and the UE via the second communication path, the connection configuration component 2340 may be configured as or otherwise support a means for receiving, from the relay device, a connection configuration transfer message for a secondary cell addition procedure. In some examples, to support establishing the connectivity between the wireless device and the UE via the second communication path, the connection configuration component 2340 may be configured as or otherwise support a means for transmitting, to the relay device, a first connection configuration message based on receiving the connection configuration transfer message.

In some examples, the second message is transmitted via an X2 interface between the wireless device and the relay device.

In some examples, the feedback manager 2350 may be configured as or otherwise support a means for receiving a negative feedback message from the UE or determining that the first message was associated with an error, where the second message is transmitted based on the negative feedback message or the error.

In some examples, a central unit of the wireless device includes a UP. In some examples, the central unit of the wireless device further includes a CP. In some examples, the wireless device includes a PLC, an integrated access and backhaul node, or a base station. In some examples, the relay device includes a central base station or a donor base station connected to an internet provider or a network entity. In some examples, the first message and the second message are transmitted simultaneously.

Additionally, or alternatively, the communications manager 2320 may support wireless communication at a UE in accordance with examples as disclosed herein. In some examples, the communication path manager 2325 may be configured as or otherwise support a means for establishing connectivity between the UE and a wireless device via a first communication path, and between the UE and the wireless device via a second communication path that includes a relay device. In some examples, the first message format manager 2330 may be configured as or otherwise support a means for receiving, via the first communication path from the wireless device, a first message in a first format, the first message including first data. In some examples, the second message format manager 2335 may be configured as or otherwise support a means for receiving, via the second communication path from the relay device, a second message in a second format and including the first data, the second format indicating that the relay device is to relay the first data to the UE.

In some examples, the feedback manager 2350 may be configured as or otherwise support a means for transmitting, to the wireless device via the first communication path or the second communication path, a negative feedback message, where receiving the second message is based on transmitting the negative feedback message.

Figure 24:
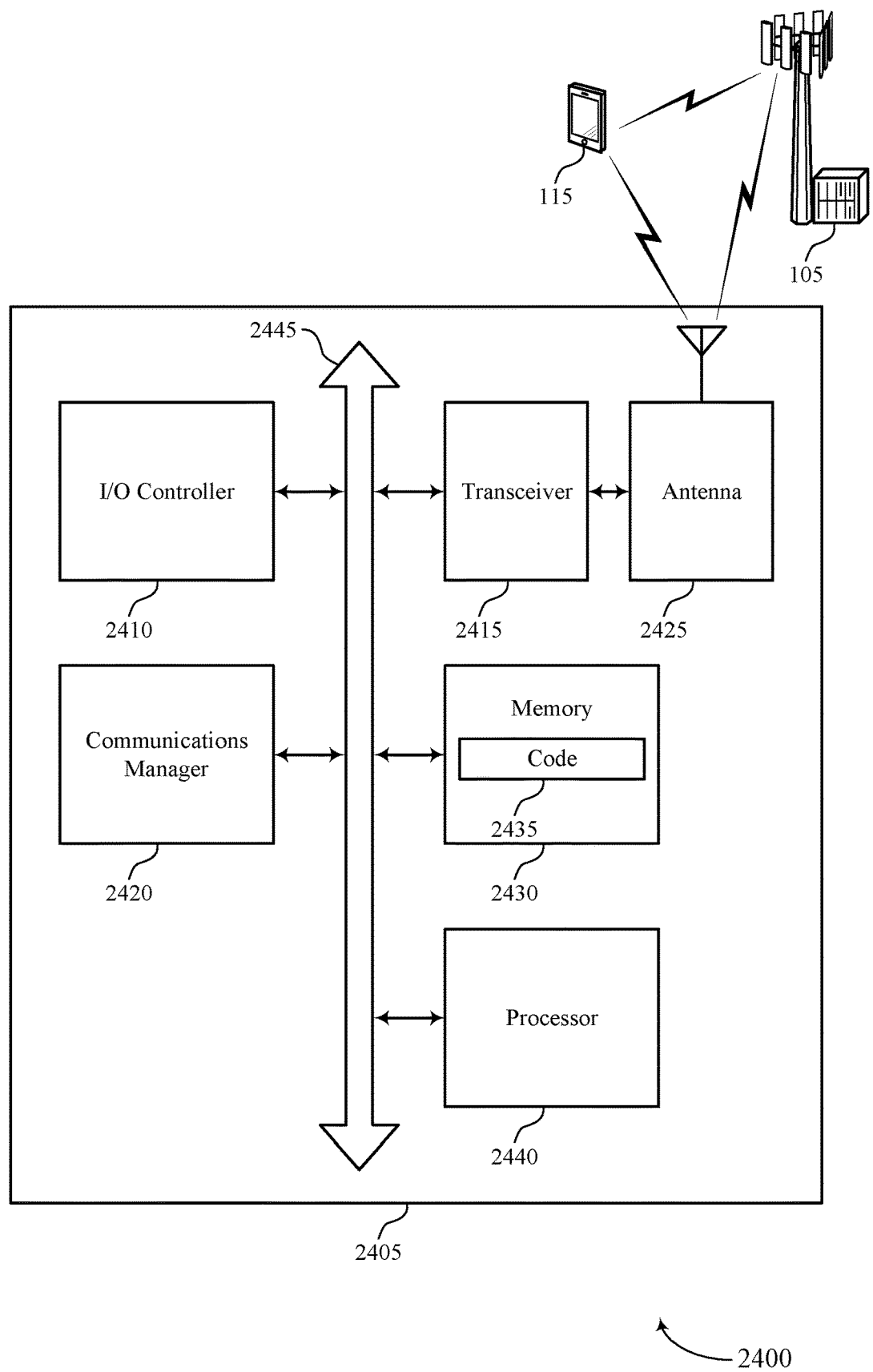
FIG. 24 shows a diagram of a system including a device that supports architecture and protocols to support industrial IoT and wireless PLC communications in accordance with aspects of the present disclosure.

FIG. 24 shows a diagram of a system 2400 including a device 2405 that supports architecture and protocols to support industrial IoT and wireless PLC communications in accordance with aspects of the present disclosure. The device 2405 may be an example of or include the components of a device 2105, a device 2205, or a UE 115 as described herein. The device 2405 may communicate wirelessly with one or more base stations 105, UEs 115, or any combination thereof. The device 2405 may include components for bi-directional voice and data communications including components for transmitting and receiving communications, such as a communications manager 2420, an input/output (I/O) controller 2410, a transceiver 2415, an antenna 2425, a memory 2430, code 2435, and a processor 2440. These components may be in electronic communication or otherwise coupled (e.g., operatively, communicatively, functionally, electronically, electrically) via one or more buses (e.g., a bus 2445).

The I/O controller 2410 may manage input and output signals for the device 2405. The I/O controller 2410 may also manage peripherals not integrated into the device 2405. In some cases, the I/O controller 2410 may represent a physical connection or port to an external peripheral. In some cases, the I/O controller 2410 may utilize an operating system such as iOS®, ANDROID®, MS-DOS®, MS-WINDOWS®, OS/2®, UNIX®, LINUX®, or another known operating system. Additionally, or alternatively, the I/O controller 2410 may represent or interact with a modem, a keyboard, a mouse, a touchscreen, or a similar device. In some cases, the I/O controller 2410 may be implemented as part of a processor, such as the processor 2440. In some cases, a user may interact with the device 2405 via the I/O controller 2410 or via hardware components controlled by the I/O controller 2410.

In some cases, the device 2405 may include a single antenna 2425. However, in some other cases, the device 2405 may have more than one antenna 2425, which may be capable of concurrently transmitting or receiving multiple wireless transmissions. The transceiver 2415 may communicate bi-directionally, via the one or more antennas 2425, wired, or wireless links as described herein. For example, the transceiver 2415 may represent a wireless transceiver and may communicate bi-directionally with another wireless transceiver. The transceiver 2415 may also include a modem to modulate the packets, to provide the modulated packets to one or more antennas 2425 for transmission, and to demodulate packets received from the one or more antennas 2425. The transceiver 2415, or the transceiver 2415 and one or more antennas 2425, may be an example of a transmitter 2115, a transmitter 2215, a receiver 2110, a receiver 2210, or any combination thereof or component thereof, as described herein.

The memory 2430 may include random access memory (RAM) and read-only memory (ROM). The memory 2430 may store computer-readable, computer-executable code 2435 including instructions that, when executed by the processor 2440, cause the device 2405 to perform various functions described herein. The code 2435 may be stored in a non-transitory computer-readable medium such as system memory or another type of memory. In some cases, the code 2435 may not be directly executable by the processor 2440 but may cause a computer (e.g., when compiled and executed) to perform functions described herein. In some cases, the memory 2430 may contain, among other things, a basic I/O system (BIOS) which may control basic hardware or software operation such as the interaction with peripheral components or devices.

The processor 2440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2440 may be configured to operate a memory array using a memory controller. In some other cases, a memory controller may be integrated into the processor 2440. The processor 2440 may be configured to execute computer-readable instructions stored in a memory (e.g., the memory 2430) to cause the device 2405 to perform various functions (e.g., functions or tasks supporting architecture and protocols to support industrial IoT and wireless PLC communications). For example, the device 2405 or a component of the device 2405 may include a processor 2440 and memory 2430 coupled with or to the processor 2440, the processor 2440 and memory 2430 configured to perform various functions described herein.

The communications manager 2420 may support wireless communication at wireless device in accordance with examples as disclosed herein. For example, the communications manager 2420 may be configured as or otherwise support a means for establishing connectivity between the wireless device and a UE via a first communication path, and between the wireless device and the UE via a second communication path that includes a relay device. The communications manager 2420 may be configured as or otherwise support a means for transmitting, via the first communication path, a first message in a first format to the UE, the first message including first data. The communications manager 2420 may be configured as or otherwise support a means for transmitting, via the second communication path to the relay device, a second message in a second format and including the first data, the second format indicating that the relay device is to relay the first data to the UE.

Additionally, or alternatively, the communications manager 2420 may support wireless communication at a UE in accordance with examples as disclosed herein. For example, the communications manager 2420 may be configured as or otherwise support a means for establishing connectivity between the UE and a wireless device via a first communication path, and between the UE and the wireless device via a second communication path that includes a relay device. The communications manager 2420 may be configured as or otherwise support a means for receiving, via the first communication path from the wireless device, a first message in a first format, the first message including first data. The communications manager 2420 may be configured as or otherwise support a means for receiving, via the second communication path from the relay device, a second message in a second format and including the first data, the second format indicating that the relay device is to relay the first data to the UE.

By including or configuring the communications manager 2420 in accordance with examples as described herein, the device 2405 may support techniques for improved communication reliability, reduced latency, improved user experience related to reduced latency, and improved coordination between devices, among other examples.

In some examples, the communications manager 2420 may be configured to perform various operations (e.g., receiving, monitoring, transmitting) using or otherwise in cooperation with the transceiver 2415, the one or more antennas 2425, or any combination thereof. Although the communications manager 2420 is illustrated as a separate component, in some examples, one or more functions described with reference to the communications manager 2420 may be supported by or performed by the processor 2440, the memory 2430, the code 2435, or any combination thereof. For example, the code 2435 may include instructions executable by the processor 2440 to cause the device 2405 to perform various aspects of architecture and protocols to support industrial IoT and wireless PLC communications as described herein, or the processor 2440 and the memory 2430 may be otherwise configured to perform or support such operations.

Figure 25:
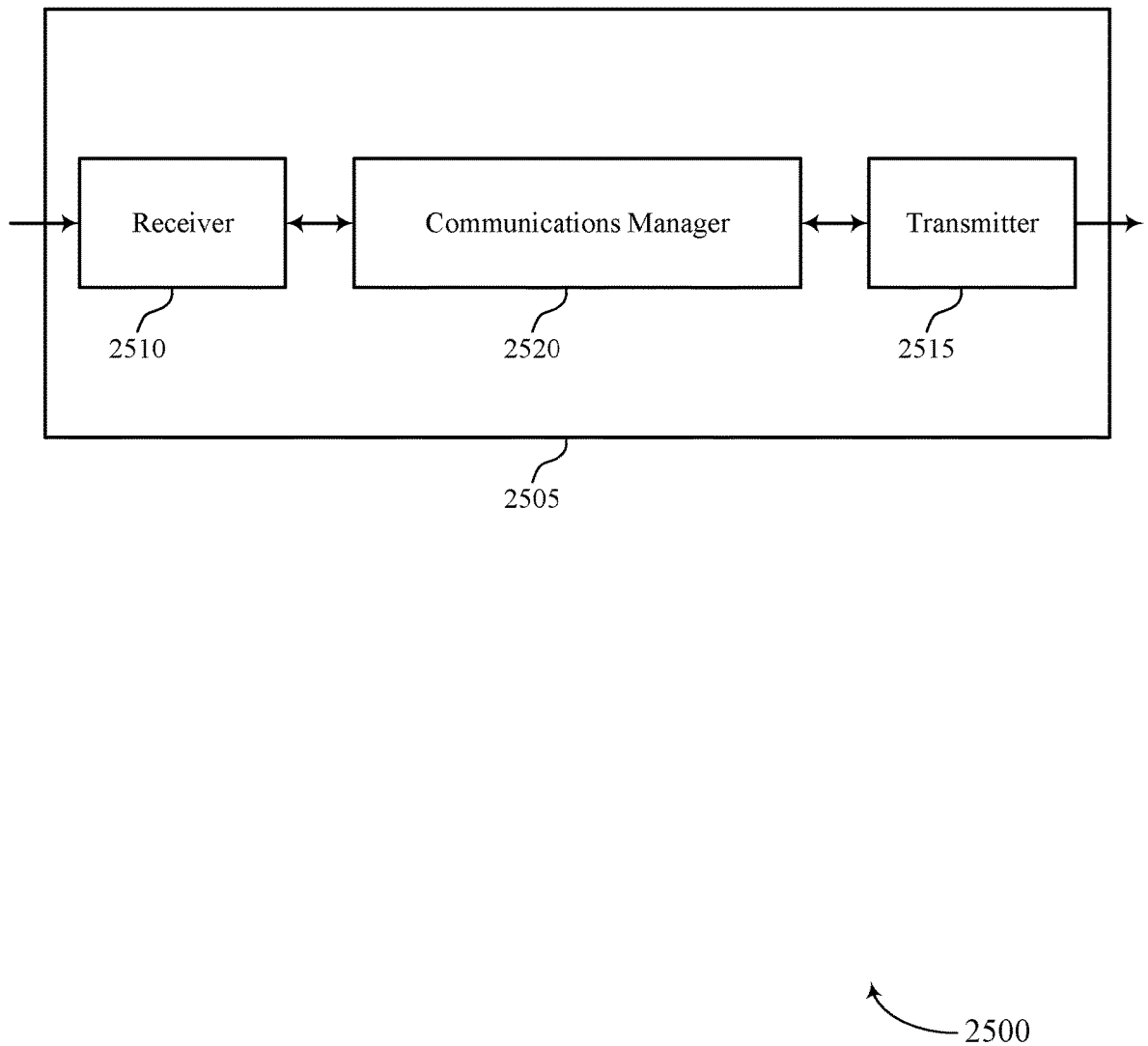
FIGS. 25 and 26 show block diagrams of devices that support architecture and protocols to support industrial IoT and wireless PLC communications in accordance with aspects of the present disclosure.

FIG. 25 shows a block diagram 2500 of a device 2505 that supports architecture and protocols to support industrial IoT and wireless PLC communications in accordance with aspects of the present disclosure. The device 2505 may be an example of aspects of a base station 105 as described herein. The device 2505 may include a receiver 2510, a transmitter 2515, and a communications manager 2520. The device 2505 may also include a processor. Each of these components may be in communication with one another (e.g., via one or more buses).

The receiver 2510 may provide a means for receiving information such as packets, user data, control information, or any combination thereof associated with various information channels (e.g., control channels, data channels, information channels related to architecture and protocols to support industrial IoT and wireless PLC communications). Information may be passed on to other components of the device 2505. The receiver 2510 may utilize a single antenna or a set of multiple antennas.

The transmitter 2515 may provide a means for transmitting signals generated by other components of the device 2505. For example, the transmitter 2515 may transmit information such as packets, user data, control information, or any combination thereof associated with various information channels (e.g., control channels, data channels, information channels related to architecture and protocols to support industrial IoT and wireless PLC communications). In some examples, the transmitter 2515 may be co-located with a receiver 2510 in a transceiver module. The transmitter 2515 may utilize a single antenna or a set of multiple antennas.

The communications manager 2520, the receiver 2510, the transmitter 2515, or various combinations thereof or various components thereof may be examples of means for performing various aspects of architecture and protocols to support industrial IoT and wireless PLC communications as described herein. For example, the communications manager 2520, the receiver 2510, the transmitter 2515, or various combinations or components thereof may support a method for performing one or more of the functions described herein.

In some examples, the communications manager 2520, the receiver 2510, the transmitter 2515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 2520, the receiver 2510, the transmitter 2515, or various combinations or components thereof may be implemented in code (e.g., as communications management software or firmware) executed by a processor. If implemented in code executed by a processor, the functions of the communications manager 2520, the receiver 2510, the transmitter 2515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 2520 may be configured to perform various operations (e.g., receiving, monitoring, transmitting) using or otherwise in cooperation with the receiver 2510, the transmitter 2515, or both. For example, the communications manager 2520 may receive information from the receiver 2510, send information to the transmitter 2515, or be integrated in combination with the receiver 2510, the transmitter 2515, or both to receive information, transmit information, or perform various other operations as described herein.

The communications manager 2520 may support wireless communication at wireless device in accordance with examples as disclosed herein. For example, the communications manager 2520 may be configured as or otherwise support a means for establishing connectivity between the wireless device and a UE via a first communication path, and between the wireless device and the UE via a second communication path that includes a relay device. The communications manager 2520 may be configured as or otherwise support a means for transmitting, via the first communication path, a first message in a first format to the UE, the first message including first data. The communications manager 2520 may be configured as or otherwise support a means for transmitting, via the second communication path to the relay device, a second message in a second format and including the first data, the second format indicating that the relay device is to relay the first data to the UE.

Additionally, or alternatively, the communications manager 2520 may support wireless communication at a relay device in accordance with examples as disclosed herein. For example, the communications manager 2520 may be configured as or otherwise support a means for receiving, from a wireless device via a first portion of a path, a first message in a first format and including a first data, the first format indicating that the relay device is to relay the first data to a UE, the first portion associated with a first type of communications link. The communications manager 2520 may be configured as or otherwise support a means for transmitting, to the UE via a second portion of the path, a second message in a second format and including the first data, the second portion associated with a second type of communications link.

By including or configuring the communications manager 2520 in accordance with examples as described herein, the device 2505 (e.g., a processor controlling or otherwise coupled to the receiver 2510, the transmitter 2515, the communications manager 2520, or a combination thereof) may support techniques for reduced processing and reduced power consumption due to higher reliability, among other examples.

Figure 26:
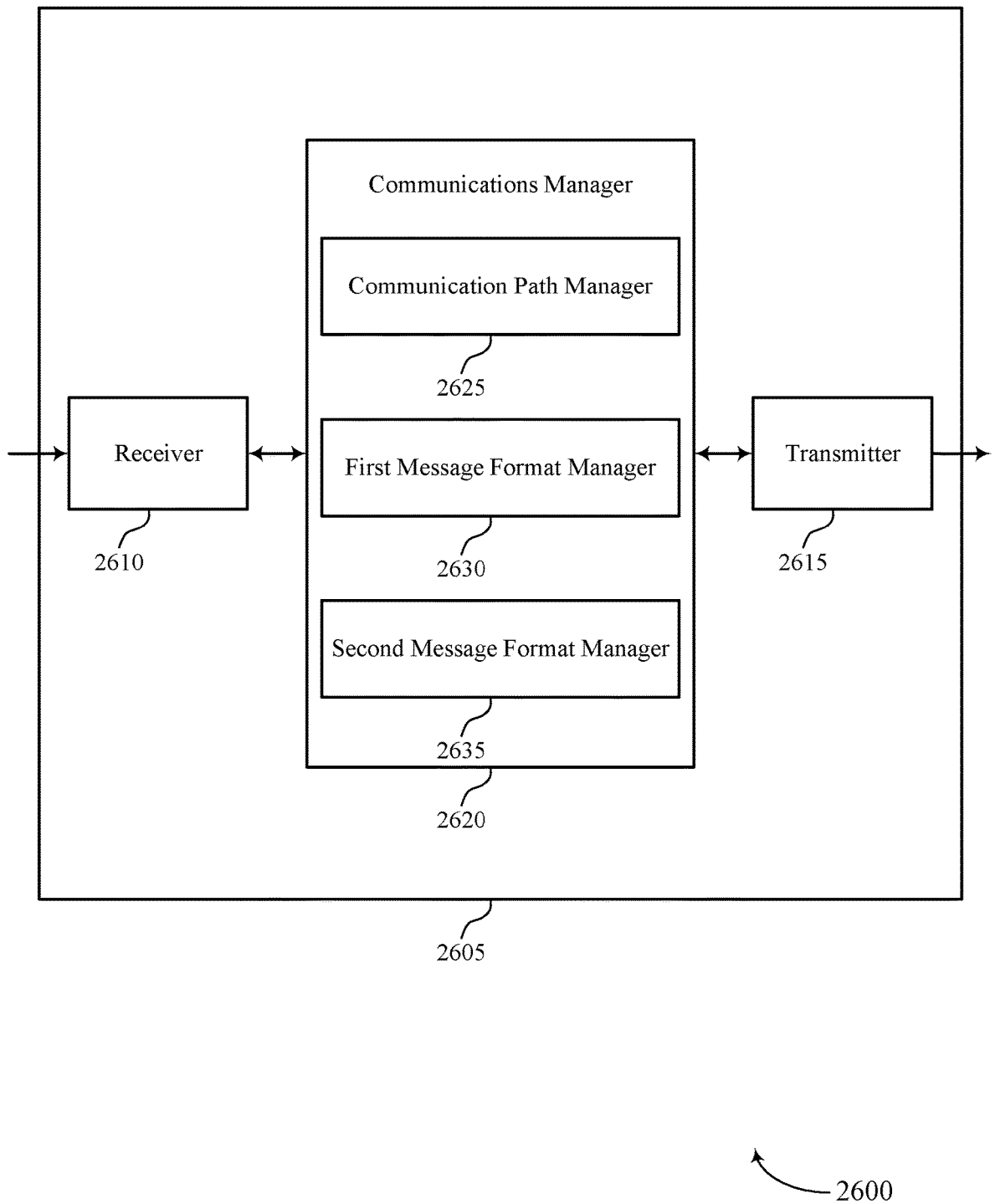

FIG. 26 shows a block diagram 2600 of a device 2605 that supports architecture and protocols to support industrial IoT and wireless PLC communications in accordance with aspects of the present disclosure. The device 2605 may be an example of aspects of a device 2505 or a base station 105 as described herein. The device 2605 may include a receiver 2610, a transmitter 2615, and a communications manager 2620. The device 2605 may also include a processor. Each of these components may be in communication with one another (e.g., via one or more buses).

The receiver 2610 may provide a means for receiving information such as packets, user data, control information, or any combination thereof associated with various information channels (e.g., control channels, data channels, information channels related to architecture and protocols to support industrial IoT and wireless PLC communications). Information may be passed on to other components of the device 2605. The receiver 2610 may utilize a single antenna or a set of multiple antennas.

The transmitter 2615 may provide a means for transmitting signals generated by other components of the device 2605. For example, the transmitter 2615 may transmit information such as packets, user data, control information, or any combination thereof associated with various information channels (e.g., control channels, data channels, information channels related to architecture and protocols to support industrial IoT and wireless PLC communications). In some examples, the transmitter 2615 may be co-located with a receiver 2610 in a transceiver module. The transmitter 2615 may utilize a single antenna or a set of multiple antennas.

The device 2605, or various components thereof, may be an example of means for performing various aspects of architecture and protocols to support industrial IoT and wireless PLC communications as described herein. For example, the communications manager 2620 may include a communication path manager 2625, a first message format manager 2630, a second message format manager 2635, or any combination thereof. The communications manager 2620 may be an example of aspects of a communications manager 2520 as described herein. In some examples, the communications manager 2620, or various components thereof, may be configured to perform various operations (e.g., receiving, monitoring, transmitting) using or otherwise in cooperation with the receiver 2610, the transmitter 2615, or both. For example, the communications manager 2620 may receive information from the receiver 2610, send information to the transmitter 2615, or be integrated in combination with the receiver 2610, the transmitter 2615, or both to receive information, transmit information, or perform various other operations as described herein.

The communications manager 2620 may support wireless communication at wireless device in accordance with examples as disclosed herein. The communication path manager 2625 may be configured as or otherwise support a means for establishing connectivity between the wireless device and a UE via a first communication path, and between the wireless device and the UE via a second communication path that includes a relay device. The first message format manager 2630 may be configured as or otherwise support a means for transmitting, via the first communication path, a first message in a first format to the UE, the first message including first data. The second message format manager 2635 may be configured as or otherwise support a means for transmitting, via the second communication path to the relay device, a second message in a second format and including the first data, the second format indicating that the relay device is to relay the first data to the UE.

Additionally, or alternatively, the communications manager 2620 may support wireless communication at a relay device in accordance with examples as disclosed herein. The first message format manager 2630 may be configured as or otherwise support a means for receiving, from a wireless device via a first portion of a path, a first message in a first format and including a first data, the first format indicating that the relay device is to relay the first data to a UE, the first portion associated with a first type of communications link. The second message format manager 2635 may be configured as or otherwise support a means for transmitting, to the UE via a second portion of the path, a second message in a second format and including the first data, the second portion associated with a second type of communications link.

Figure 27:
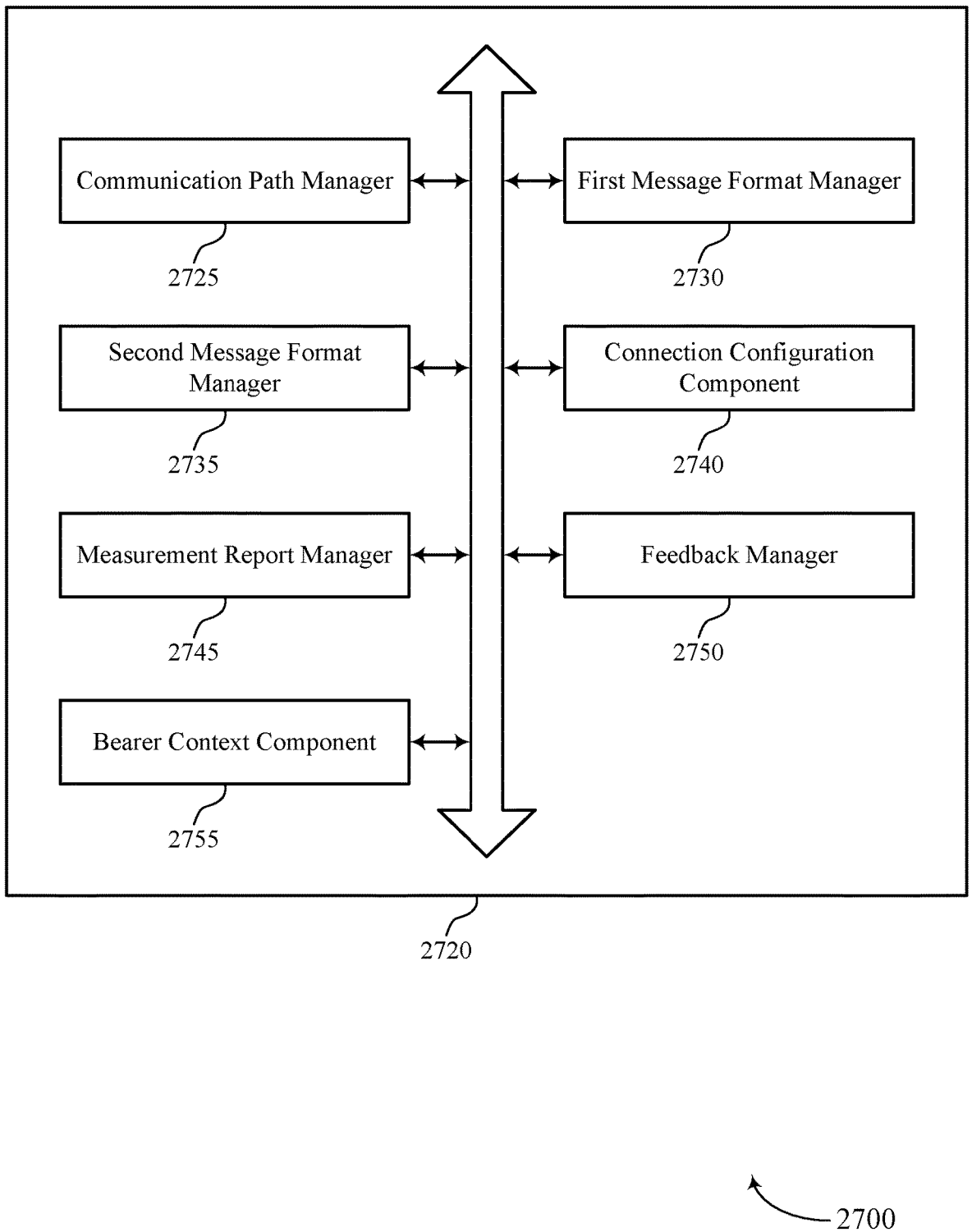
FIG. 27 shows a block diagram of a communications manager that supports architecture and protocols to support industrial IoT and wireless PLC communications in accordance with aspects of the present disclosure.

FIG. 27 shows a block diagram 2700 of a communications manager 2720 that supports architecture and protocols to support industrial IoT and wireless PLC communications in accordance with aspects of the present disclosure. The communications manager 2720 may be an example of aspects of a communications manager 2520, a communications manager 2620, or both, as described herein. The communications manager 2720, or various components thereof, may be an example of means for performing various aspects of architecture and protocols to support industrial IoT and wireless PLC communications as described herein. For example, the communications manager 2720 may include a communication path manager 2725, a first message format manager 2730, a second message format manager 2735, a connection configuration component 2740, a measurement report manager 2745, a feedback manager 2750, a bearer context component 2755, or any combination thereof. Each of these components may communicate, directly or indirectly, with one another (e.g., via one or more buses).

The communications manager 2720 may support wireless communication at wireless device in accordance with examples as disclosed herein. The communication path manager 2725 may be configured as or otherwise support a means for establishing connectivity between the wireless device and a UE via a first communication path, and between the wireless device and the UE via a second communication path that includes a relay device. The first message format manager 2730 may be configured as or otherwise support a means for transmitting, via the first communication path, a first message in a first format to the UE, the first message including first data. The second message format manager 2735 may be configured as or otherwise support a means for transmitting, via the second communication path to the relay device, a second message in a second format and including the first data, the second format indicating that the relay device is to relay the first data to the UE.

In some examples, to support establishing the connectivity between the wireless device and the UE via the first communication path, the connection configuration component 2740 may be configured as or otherwise support a means for transmitting a connection configuration message based on a management layer determination to establish the first communication path. In some examples, to support establishing the connectivity between the wireless device and the UE via the first communication path, the connection configuration component 2740 may be configured as or otherwise support a means for receiving a configuration response message indicating a network address associated with the UE via the first communication path based on the connection configuration message.

In some examples, to support establishing the connectivity between the wireless device and the UE via the second communication path, the connection configuration component 2740 may be configured as or otherwise support a means for transmitting, to the relay device, a first connection configuration message based on a management layer determination to establish the second communication path. In some examples, to support establishing the connectivity between the wireless device and the UE via the second communication path, the connection configuration component 2740 may be configured as or otherwise support a means for receiving, from the relay device, a configuration response message indicating a forwarding network address associated with the second communication path based on the first connection configuration message.

In some examples, to support establishing the connectivity between the wireless device and the UE via the first communication path, the bearer context component 2755 may be configured as or otherwise support a means for transmitting, to the relay device, a message transfer request for establishing a bearer context for communicating with the UE via the first communication path. In some examples, to support establishing the connectivity between the wireless device and the UE via the first communication path, the bearer context component 2755 may be configured as or otherwise support a means for receiving, from the relay device, a bearer context configuration for communicating bearer traffic between the wireless device and the UE based on the message transfer request. In some examples, to support establishing the connectivity between the wireless device and the UE via the first communication path, the bearer context component 2755 may be configured as or otherwise support a means for transmitting, to the UE, a configuration message indicating the bearer context configuration, where the first data transmitted via the first communication path is bearer data.

In some examples, to support establishing the connectivity between the wireless device and the UE via the second communication path, the measurement report manager 2745 may be configured as or otherwise support a means for forwarding, to the relay device, a measurement report based on receiving the measurement report from the UE. In some examples, to support establishing the connectivity between the wireless device and the UE via the second communication path, the connection configuration component 2740 may be configured as or otherwise support a means for receiving, from the relay device, a connection configuration transfer message for a secondary cell addition procedure. In some examples, to support establishing the connectivity between the wireless device and the UE via the second communication path, the connection configuration component 2740 may be configured as or otherwise support a means for transmitting, to the relay device, a first connection configuration message based on receiving the connection configuration transfer message.

In some examples, the second message is transmitted via an X2 interface between the wireless device and the relay device.

In some examples, the feedback manager 2750 may be configured as or otherwise support a means for receiving a negative feedback message from the UE or determining that the first message was associated with an error, where the second message is transmitted based on the negative feedback message or the error.

In some examples, a central unit of the wireless device includes a UP. In some examples, the central unit of the wireless device further includes a CP. In some examples, the wireless device includes a PLC, an integrated access and backhaul node, or a base station. In some examples, the relay device includes a central base station or a donor base station connected to an internet provider or a network entity. In some examples, the first message and the second message are transmitted simultaneously.

Additionally, or alternatively, the communications manager 2720 may support wireless communication at a relay device in accordance with examples as disclosed herein. In some examples, the first message format manager 2730 may be configured as or otherwise support a means for receiving, from a wireless device via a first portion of a path, a first message in a first format and including a first data, the first format indicating that the relay device is to relay the first data to a UE, the first portion associated with a first type of communications link. In some examples, the second message format manager 2735 may be configured as or otherwise support a means for transmitting, to the UE via a second portion of the path, a second message in a second format and including the first data, the second portion associated with a second type of communications link.

In some examples, the connection configuration component 2740 may be configured as or otherwise support a means for receiving, from the wireless device, a first connection configuration message based on a management layer determination to establish the path. In some examples, the connection configuration component 2740 may be configured as or otherwise support a means for transmitting, to the wireless device, a configuration response message indicating a forwarding network address associated with the path based on the first connection configuration message.

In some examples, the measurement report manager 2745 may be configured as or otherwise support a means for receiving, from the wireless device, a measurement report associated with the UE. In some examples, the connection configuration component 2740 may be configured as or otherwise support a means for transmitting, to the wireless device, a connection configuration transfer message for a secondary cell addition procedure. In some examples, the connection configuration component 2740 may be configured as or otherwise support a means for receiving, from the wireless device, a first connection configuration message based on receiving the connection configuration transfer message.

In some examples, the second message in the second format is transmitted via L2 radio link control signaling, L3 internet protocol signaling, or L2 backhaul adaption protocol signaling.

Figure 28:
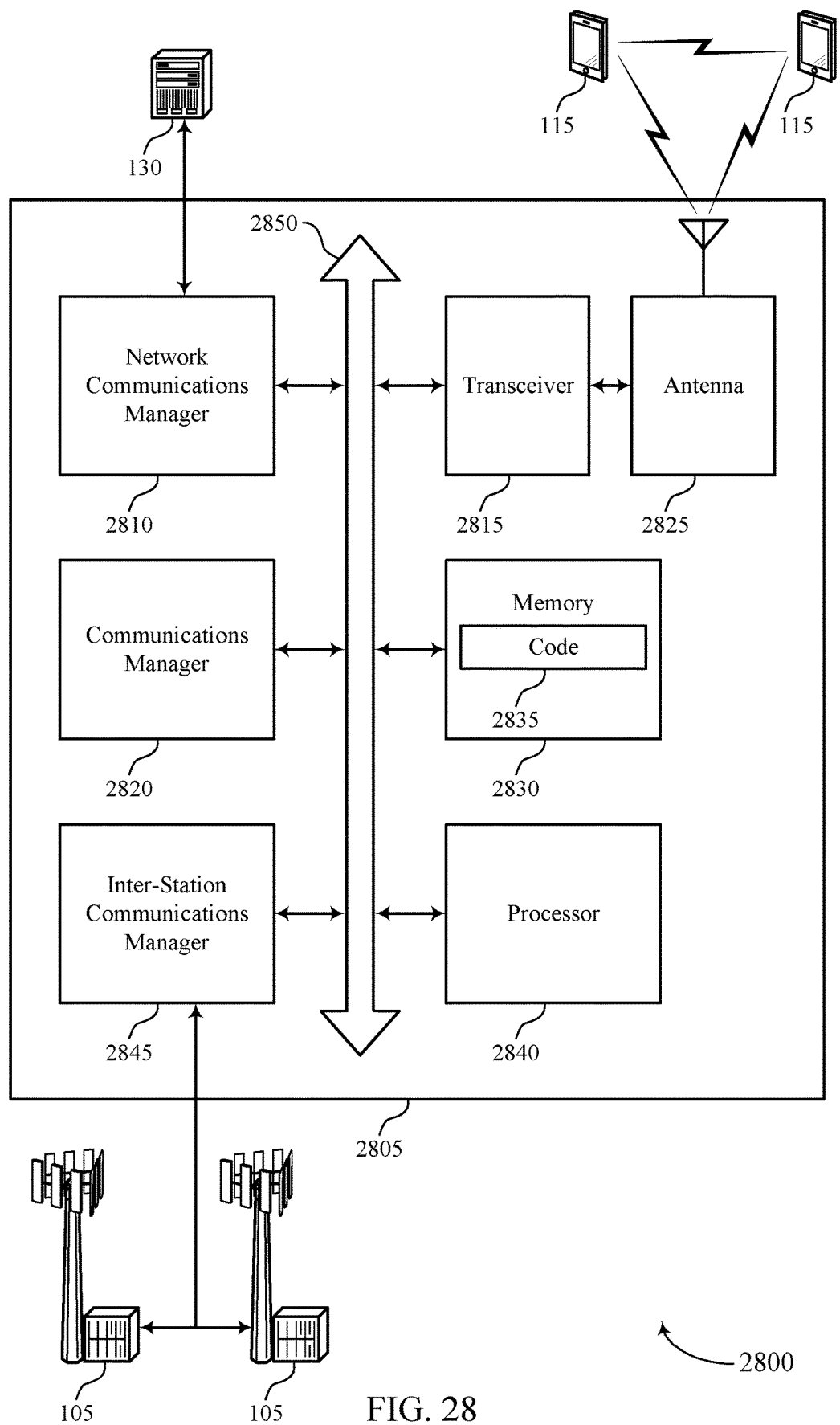
FIG. 28 shows a diagram of a system including a device that supports architecture and protocols to support industrial IoT and wireless PLC communications in accordance with aspects of the present disclosure.

FIG. 28 shows a diagram of a system 2800 including a device 2805 that supports architecture and protocols to support industrial IoT and wireless PLC communications in accordance with aspects of the present disclosure. The device 2805 may be an example of or include the components of a device 2505, a device 2605, or a base station 105 as described herein. The device 2805 may communicate wirelessly with one or more base stations 105, UEs 115, or any combination thereof. The device 2805 may include components for bi-directional voice and data communications including components for transmitting and receiving communications, such as a communications manager 2820, a network communications manager 2810, a transceiver 2815, an antenna 2825, a memory 2830, code 2835, a processor 2840, and an inter-station communications manager 2845. These components may be in electronic communication or otherwise coupled (e.g., operatively, communicatively, functionally, electronically, electrically) via one or more buses (e.g., a bus 2850).

The network communications manager 2810 may manage communications with a core network 130 (e.g., via one or more wired backhaul links). For example, the network communications manager 2810 may manage the transfer of data communications for client devices, such as one or more UEs 115.

In some cases, the device 2805 may include a single antenna 2825. However, in some other cases the device 2805 may have more than one antenna 2825, which may be capable of concurrently transmitting or receiving multiple wireless transmissions. The transceiver 2815 may communicate bi-directionally, via the one or more antennas 2825, wired, or wireless links as described herein. For example, the transceiver 2815 may represent a wireless transceiver and may communicate bi-directionally with another wireless transceiver. The transceiver 2815 may also include a modem to modulate the packets, to provide the modulated packets to one or more antennas 2825 for transmission, and to demodulate packets received from the one or more antennas 2825. The transceiver 2815, or the transceiver 2815 and one or more antennas 2825, may be an example of a transmitter 2515, a transmitter 2615, a receiver 2510, a receiver 2610, or any combination thereof or component thereof, as described herein.

The memory 2830 may include RAM and ROM. The memory 2830 may store computer-readable, computer-executable code 2835 including instructions that, when executed by the processor 2840, cause the device 2805 to perform various functions described herein. The code 2835 may be stored in a non-transitory computer-readable medium such as system memory or another type of memory. In some cases, the code 2835 may not be directly executable by the processor 2840 but may cause a computer (e.g., when compiled and executed) to perform functions described herein. In some cases, the memory 2830 may contain, among other things, a BIOS which may control basic hardware or software operation such as the interaction with peripheral components or devices.

The processor 2840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2840 may be configured to operate a memory array using a memory controller. In some other cases, a memory controller may be integrated into the processor 2840. The processor 2840 may be configured to execute computer-readable instructions stored in a memory (e.g., the memory 2830) to cause the device 2805 to perform various functions (e.g., functions or tasks supporting architecture and protocols to support industrial IoT and wireless PLC communications). For example, the device 2805 or a component of the device 2805 may include a processor 2840 and memory 2830 coupled with or to the processor 2840, the processor 2840 and memory 2830 configured to perform various functions described herein.

The inter-station communications manager 2845 may manage communications with other base stations 105, and may include a controller or scheduler for controlling communications with UEs 115 in cooperation with other base stations 105. For example, the inter-station communications manager 2845 may coordinate scheduling for transmissions to UEs 115 for various interference mitigation techniques such as beamforming or joint transmission. In some examples, the inter-station communications manager 2845 may provide an X2 interface within an LTE/LTE-A wireless communications network technology to provide communication between base stations 105.

The communications manager 2820 may support wireless communication at wireless device in accordance with examples as disclosed herein. For example, the communications manager 2820 may be configured as or otherwise support a means for establishing connectivity between the wireless device and a UE via a first communication path, and between the wireless device and the UE via a second communication path that includes a relay device. The communications manager 2820 may be configured as or otherwise support a means for transmitting, via the first communication path, a first message in a first format to the UE, the first message including first data. The communications manager 2820 may be configured as or otherwise support a means for transmitting, via the second communication path to the relay device, a second message in a second format and including the first data, the second format indicating that the relay device is to relay the first data to the UE.

Additionally, or alternatively, the communications manager 2820 may support wireless communication at a relay device in accordance with examples as disclosed herein. For example, the communications manager 2820 may be configured as or otherwise support a means for receiving, from a wireless device via a first portion of a path, a first message in a first format and including a first data, the first format indicating that the relay device is to relay the first data to a UE, the first portion associated with a first type of communications link. The communications manager 2820 may be configured as or otherwise support a means for transmitting, to the UE via a second portion of the path, a second message in a second format and including the first data, the second portion associated with a second type of communications link.

By including or configuring the communications manager 2820 in accordance with examples as described herein, the device 2805 may support techniques for improved communication reliability, reduced latency, improved user experience related to reduced latency, and improved coordination between devices, among other examples.

In some examples, the communications manager 2820 may be configured to perform various operations (e.g., receiving, monitoring, transmitting) using or otherwise in cooperation with the transceiver 2815, the one or more antennas 2825, or any combination thereof. Although the communications manager 2820 is illustrated as a separate component, in some examples, one or more functions described with reference to the communications manager 2820 may be supported by or performed by the processor 2840, the memory 2830, the code 2835, or any combination thereof. For example, the code 2835 may include instructions executable by the processor 2840 to cause the device 2805 to perform various aspects of architecture and protocols to support industrial IoT and wireless PLC communications as described herein, or the processor 2840 and the memory 2830 may be otherwise configured to perform or support such operations.

Figure 29:
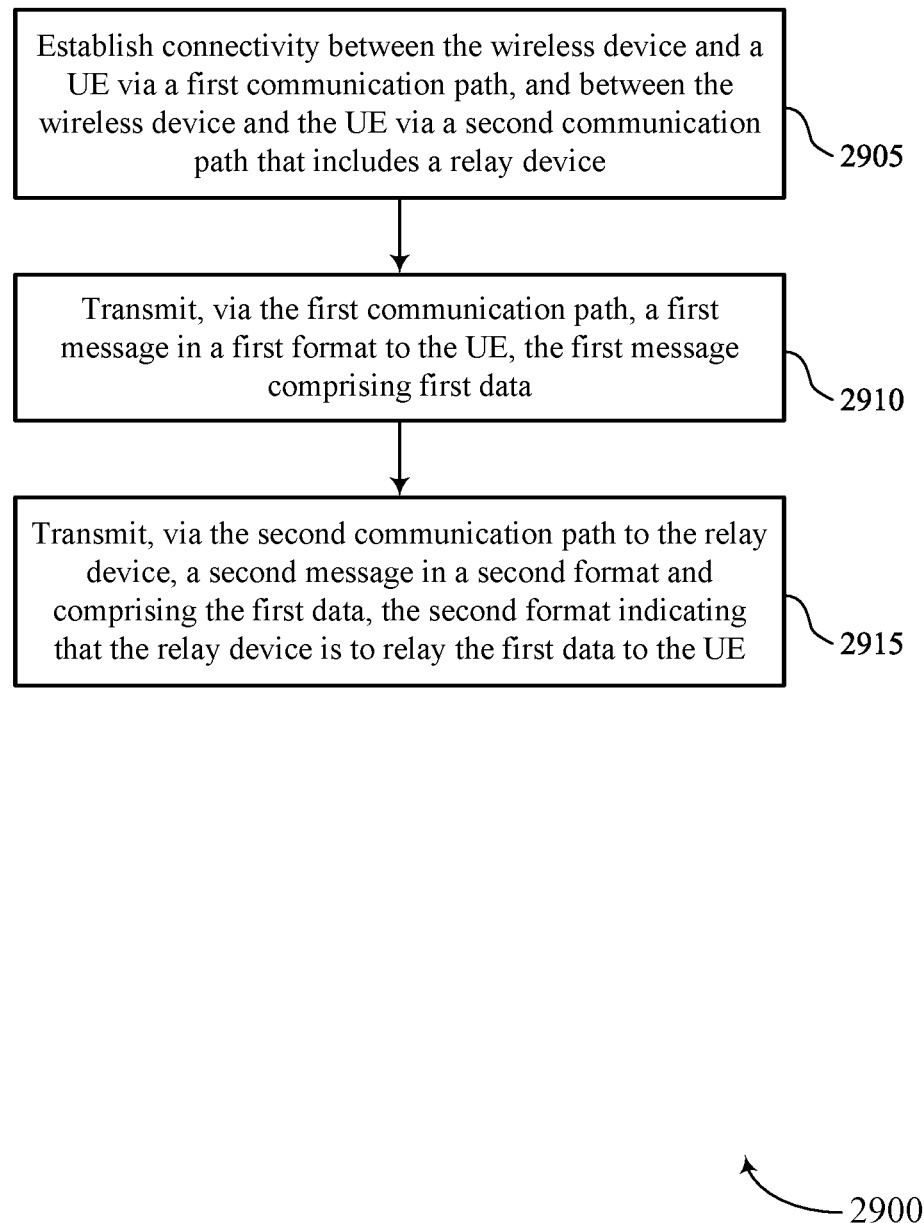
FIGS. 29 through 35 show flowcharts illustrating methods that support architecture and protocols to support industrial IoT and wireless PLC communications in accordance with aspects of the present disclosure.

FIG. 29 shows a flowchart illustrating a method 2900 that supports architecture and protocols to support industrial IoT and wireless PLC communications in accordance with aspects of the present disclosure. The operations of the method 2900 may be implemented by a UE or a base station or its components as described herein. For example, the operations of the method 2900 may be performed by a UE 115 as described with reference to FIGS. 1 through 24 or a base station 105 as described with reference to FIGS. 1 through 20 and 25 through 28. In some examples, a UE or a base station may execute a set of instructions to control the functional elements of the UE or the base station to perform the described functions. Additionally, or alternatively, the UE or the base station may perform aspects of the described functions using special-purpose hardware.

At 2905, the method may include establishing connectivity between the wireless device and a UE via a first communication path, and between the wireless device and the UE via a second communication path that includes a relay device. The operations of 2905 may be performed in accordance with examples as disclosed herein. In some examples, aspects of the operations of 2905 may be performed by a communication path manager 2325 or a communication path manager 2725 as described with reference to FIGS. 23 and 27.

At 2910, the method may include transmitting, via the first communication path, a first message in a first format to the UE, the first message including first data. The operations of 2910 may be performed in accordance with examples as disclosed herein. In some examples, aspects of the operations of 2910 may be performed by a first message format manager 2330 or a first message format manager 2730 as described with reference to FIGS. 23 and 27.

At 2915, the method may include transmitting, via the second communication path to the relay device, a second message in a second format and including the first data, the second format indicating that the relay device is to relay the first data to the UE. The operations of 2915 may be performed in accordance with examples as disclosed herein. In some examples, aspects of the operations of 2915 may be performed by a second message format manager 2335 or a second message format manager 2735 as described with reference to FIGS. 23 and 27.

Figure 30:
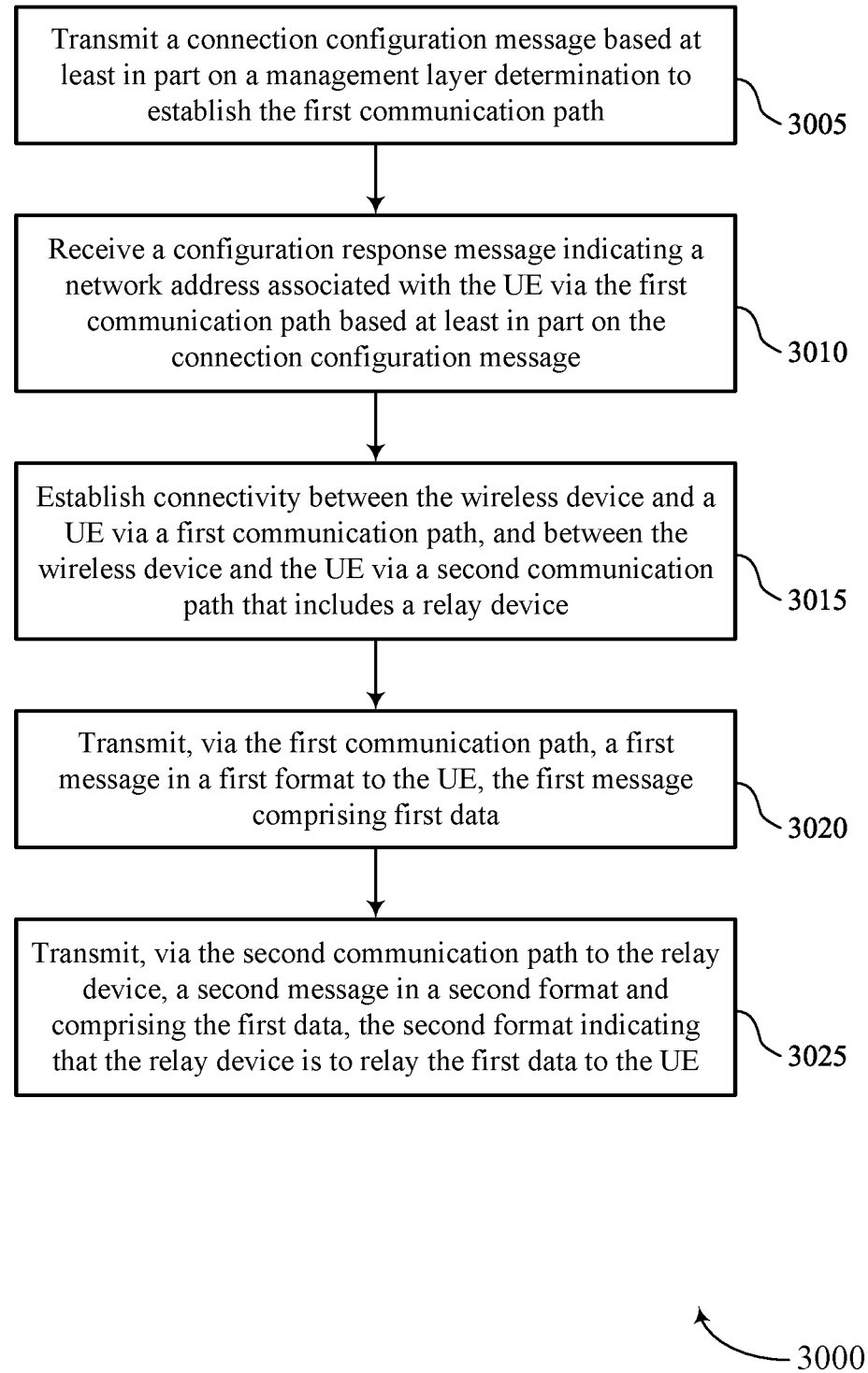

FIG. 30 shows a flowchart illustrating a method 3000 that supports architecture and protocols to support industrial IoT and wireless PLC communications in accordance with aspects of the present disclosure. The operations of the method 3000 may be implemented by a UE or a base station or its components as described herein. For example, the operations of the method 3000 may be performed by a UE 115 as described with reference to FIGS. 1 through 24 or a base station 105 as described with reference to FIGS. 1 through 20 and 25 through 28. In some examples, a UE or a base station may execute a set of instructions to control the functional elements of the UE or the base station to perform the described functions. Additionally, or alternatively, the UE or the base station may perform aspects of the described functions using special-purpose hardware.

At 3005, the method may include transmitting a connection configuration message based on a management layer determination to establish the first communication path. The operations of 3005 may be performed in accordance with examples as disclosed herein. In some examples, aspects of the operations of 3005 may be performed by a connection configuration component 2340 or a connection configuration component 2740 as described with reference to FIGS. 23 and 27.

At 3010, the method may include receiving a configuration response message indicating a network address associated with the UE via the first communication path based on the connection configuration message. The operations of 3010 may be performed in accordance with examples as disclosed herein. In some examples, aspects of the operations of 3010 may be performed by a connection configuration component 2340 or a connection configuration component 2740 as described with reference to FIGS. 23 and 27.

At 3015, the method may include establishing connectivity between the wireless device and a UE via a first communication path, and between the wireless device and the UE via a second communication path that includes a relay device. The operations of 3015 may be performed in accordance with examples as disclosed herein. In some examples, aspects of the operations of 3015 may be performed by a communication path manager 2325 or a communication path manager 2725 as described with reference to FIGS. 23 and 27.

At 3020, the method may include transmitting, via the first communication path, a first message in a first format to the UE, the first message including first data. The operations of 3020 may be performed in accordance with examples as disclosed herein. In some examples, aspects of the operations of 3020 may be performed by a first message format manager 2330 or a first message format manager 2730 as described with reference to FIGS. 23 and 27.

At 3025, the method may include transmitting, via the second communication path to the relay device, a second message in a second format and including the first data, the second format indicating that the relay device is to relay the first data to the UE. The operations of 3025 may be performed in accordance with examples as disclosed herein. In some examples, aspects of the operations of 3025 may be performed by a second message format manager 2335 or a second message format manager 2735 as described with reference to FIGS. 23 and 27.

Figure 31:
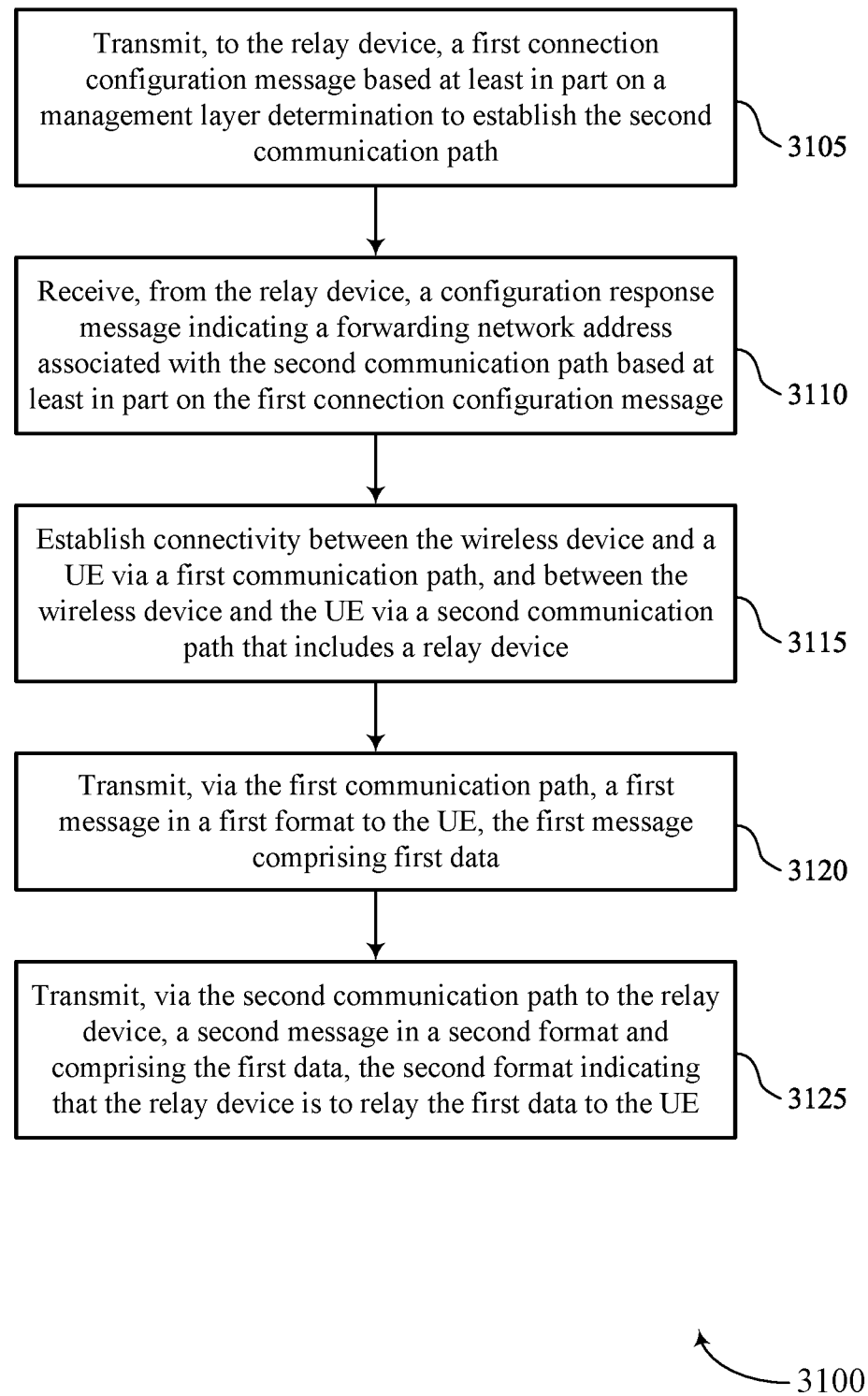

FIG. 31 shows a flowchart illustrating a method 3100 that supports architecture and protocols to support industrial IoT and wireless PLC communications in accordance with aspects of the present disclosure. The operations of the method 3100 may be implemented by a UE or a base station or its components as described herein. For example, the operations of the method 3100 may be performed by a UE 115 as described with reference to FIGS. 1 through 24 or a base station 105 as described with reference to FIGS. 1 through 20 and 25 through 28. In some examples, a UE or a base station may execute a set of instructions to control the functional elements of the UE or the base station to perform the described functions. Additionally, or alternatively, the UE or the base station may perform aspects of the described functions using special-purpose hardware.

At 3105, the method may include transmitting, to the relay device, a first connection configuration message based on a management layer determination to establish the second communication path. The operations of 3105 may be performed in accordance with examples as disclosed herein. In some examples, aspects of the operations of 3105 may be performed by a connection configuration component 2340 or a connection configuration component 2740 as described with reference to FIGS. 23 and 27.

At 3110, the method may include receiving, from the relay device, a configuration response message indicating a forwarding network address associated with the second communication path based on the first connection configuration message. The operations of 3110 may be performed in accordance with examples as disclosed herein. In some examples, aspects of the operations of 3110 may be performed by a connection configuration component 2340 or a connection configuration component 2740 as described with reference to FIGS. 23 and 27.

At 3115, the method may include establishing connectivity between the wireless device and a UE via a first communication path, and between the wireless device and the UE via a second communication path that includes a relay device. The operations of 3115 may be performed in accordance with examples as disclosed herein. In some examples, aspects of the operations of 3115 may be performed by a communication path manager 2325 or a communication path manager 2725 as described with reference to FIGS. 23 and 27.

At 3120, the method may include transmitting, via the first communication path, a first message in a first format to the UE, the first message including first data. The operations of 3120 may be performed in accordance with examples as disclosed herein. In some examples, aspects of the operations of 3120 may be performed by a first message format manager 2330 or a first message format manager 2730 as described with reference to FIGS. 23 and 27.

At 3125, the method may include transmitting, via the second communication path to the relay device, a second message in a second format and including the first data, the second format indicating that the relay device is to relay the first data to the UE. The operations of 3125 may be performed in accordance with examples as disclosed herein. In some examples, aspects of the operations of 3125 may be performed by a second message format manager 2335 or a second message format manager 2735 as described with reference to FIGS. 23 and 27.

Figure 32:
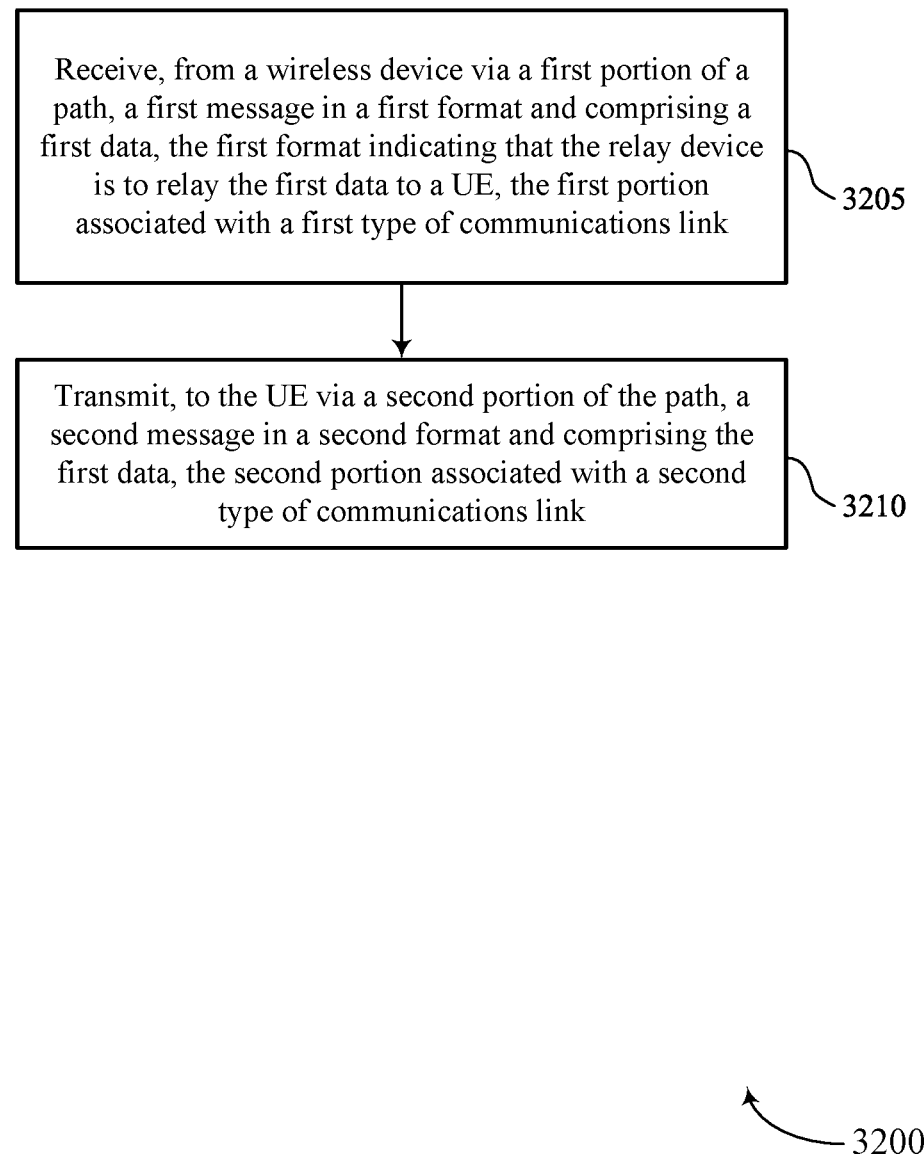

FIG. 32 shows a flowchart illustrating a method 3200 that supports architecture and protocols to support industrial IoT and wireless PLC communications in accordance with aspects of the present disclosure. The operations of the method 3200 may be implemented by a base station or its components as described herein. For example, the operations of the method 3200 may be performed by a base station 105 as described with reference to FIGS. 1 through 20 and 25 through 28. In some examples, a base station may execute a set of instructions to control the functional elements of the base station to perform the described functions. Additionally, or alternatively, the base station may perform aspects of the described functions using special-purpose hardware.

At 3205, the method may include receiving, from a wireless device via a first portion of a path, a first message in a first format and including a first data, the first format indicating that the relay device is to relay the first data to a UE, the first portion associated with a first type of communications link. The operations of 3205 may be performed in accordance with examples as disclosed herein. In some examples, aspects of the operations of 3205 may be performed by a first message format manager 2730 as described with reference to FIG. 27.

At 3210, the method may include transmitting, to the UE via a second portion of the path, a second message in a second format and including the first data, the second portion associated with a second type of communications link. The operations of 3210 may be performed in accordance with examples as disclosed herein. In some examples, aspects of the operations of 3210 may be performed by a second message format manager 2735 as described with reference to FIG. 27.

Figure 33:
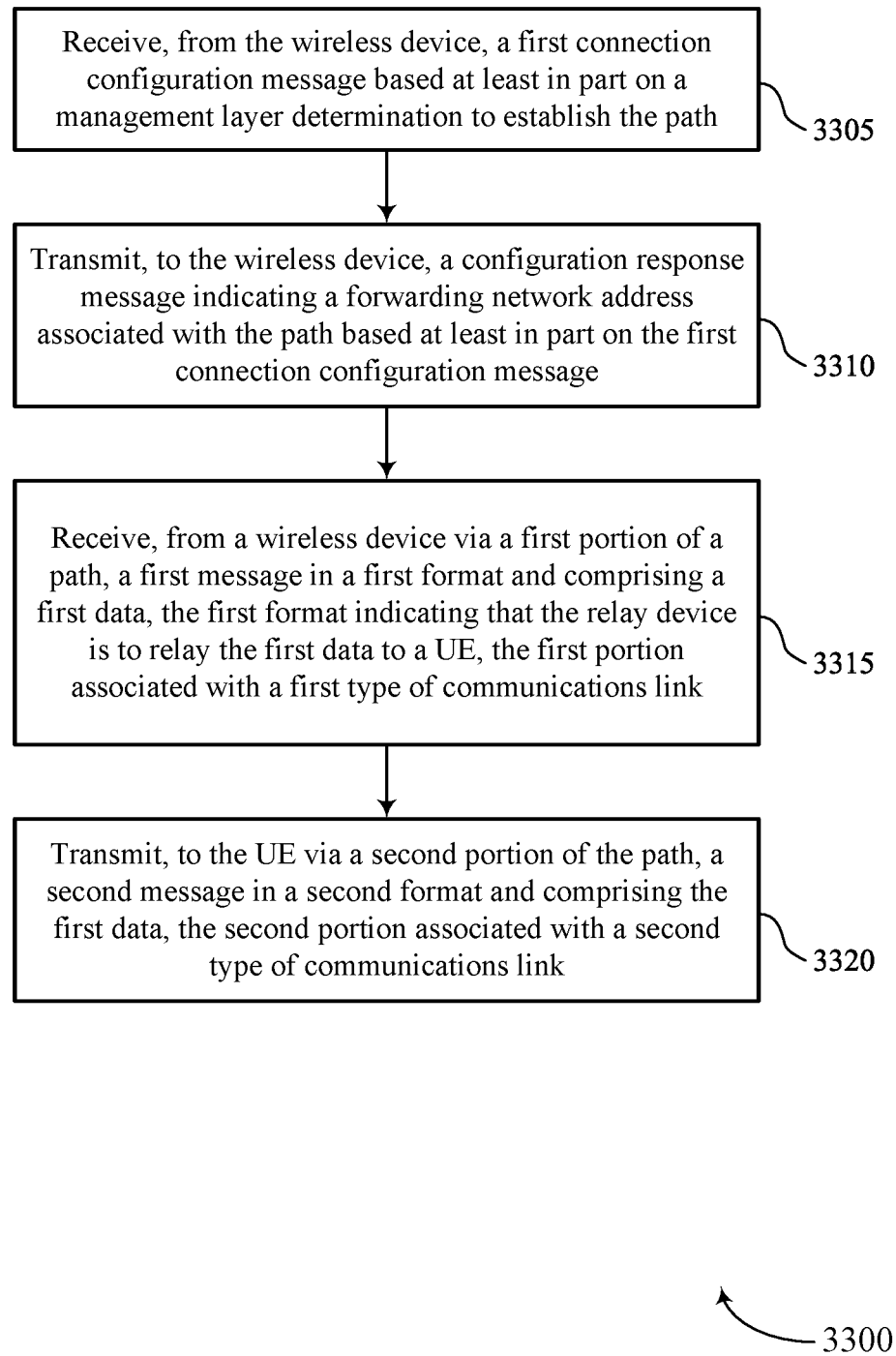

FIG. 33 shows a flowchart illustrating a method 3300 that supports architecture and protocols to support industrial IoT and wireless PLC communications in accordance with aspects of the present disclosure. The operations of the method 3300 may be implemented by a base station or its components as described herein. For example, the operations of the method 3300 may be performed by a base station 105 as described with reference to FIGS. 1 through 20 and 25 through 28. In some examples, a base station may execute a set of instructions to control the functional elements of the base station to perform the described functions. Additionally, or alternatively, the base station may perform aspects of the described functions using special-purpose hardware.

At 3305, the method may include receiving, from the wireless device, a first connection configuration message based on a management layer determination to establish the path. The operations of 3305 may be performed in accordance with examples as disclosed herein. In some examples, aspects of the operations of 3305 may be performed by a connection configuration component 2740 as described with reference to FIG. 27.

At 3310, the method may include transmitting, to the wireless device, a configuration response message indicating a forwarding network address associated with the path based on the first connection configuration message. The operations of 3310 may be performed in accordance with examples as disclosed herein. In some examples, aspects of the operations of 3310 may be performed by a connection configuration component 2740 as described with reference to FIG. 27.

At 3315, the method may include receiving, from a wireless device via a first portion of a path, a first message in a first format and including a first data, the first format indicating that the relay device is to relay the first data to a UE, the first portion associated with a first type of communications link. The operations of 3315 may be performed in accordance with examples as disclosed herein. In some examples, aspects of the operations of 3315 may be performed by a first message format manager 2730 as described with reference to FIG. 27.

At 3320, the method may include transmitting, to the UE via a second portion of the path, a second message in a second format and including the first data, the second portion associated with a second type of communications link. The operations of 3320 may be performed in accordance with examples as disclosed herein. In some examples, aspects of the operations of 3320 may be performed by a second message format manager 2735 as described with reference to FIG. 27.

Figure 34:
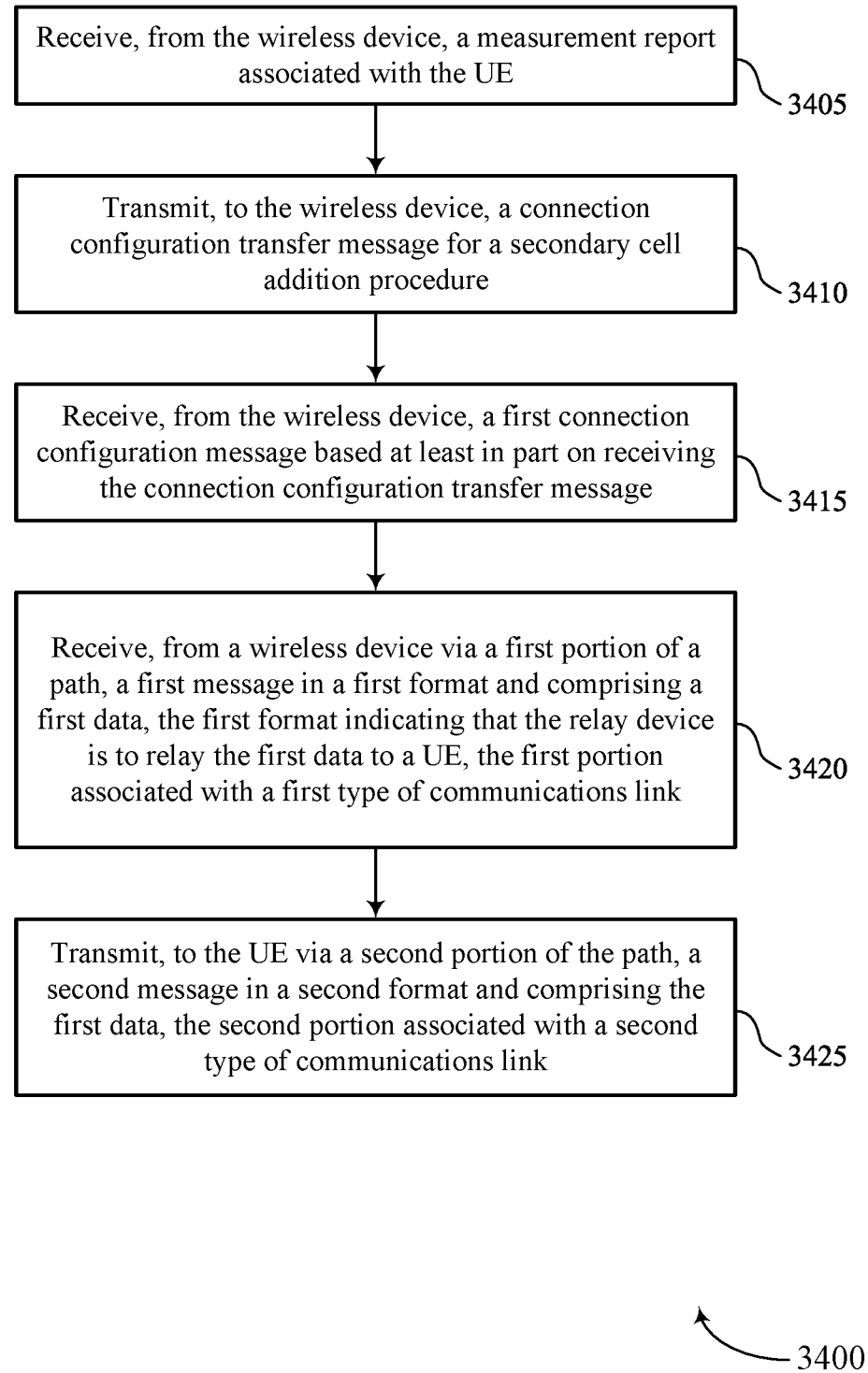

FIG. 34 shows a flowchart illustrating a method 3400 that supports architecture and protocols to support industrial IoT and wireless PLC communications in accordance with aspects of the present disclosure. The operations of the method 3400 may be implemented by a base station or its components as described herein. For example, the operations of the method 3400 may be performed by a base station 105 as described with reference to FIGS. 1 through 20 and 25 through 28. In some examples, a base station may execute a set of instructions to control the functional elements of the base station to perform the described functions. Additionally, or alternatively, the base station may perform aspects of the described functions using special-purpose hardware.

At 3405, the method may include receiving, from the wireless device, a measurement report associated with the UE. The operations of 3405 may be performed in accordance with examples as disclosed herein. In some examples, aspects of the operations of 3405 may be performed by a measurement report manager 2745 as described with reference to FIG. 27.

At 3410, the method may include transmitting, to the wireless device, a connection configuration transfer message for a secondary cell addition procedure. The operations of 3410 may be performed in accordance with examples as disclosed herein. In some examples, aspects of the operations of 3410 may be performed by a connection configuration component 2740 as described with reference to FIG. 27.

At 3415, the method may include receiving, from the wireless device, a first connection configuration message based on receiving the connection configuration transfer message. The operations of 3415 may be performed in accordance with examples as disclosed herein. In some examples, aspects of the operations of 3415 may be performed by a connection configuration component 2740 as described with reference to FIG. 27.

At 3420, the method may include receiving, from a wireless device via a first portion of a path, a first message in a first format and including a first data, the first format indicating that the relay device is to relay the first data to a UE, the first portion associated with a first type of communications link. The operations of 3420 may be performed in accordance with examples as disclosed herein. In some examples, aspects of the operations of 3420 may be performed by a first message format manager 2730 as described with reference to FIG. 27.

At 3425, the method may include transmitting, to the UE via a second portion of the path, a second message in a second format and including the first data, the second portion associated with a second type of communications link. The operations of 3425 may be performed in accordance with examples as disclosed herein. In some examples, aspects of the operations of 3425 may be performed by a second message format manager 2735 as described with reference to FIG. 27.

Figure 35:
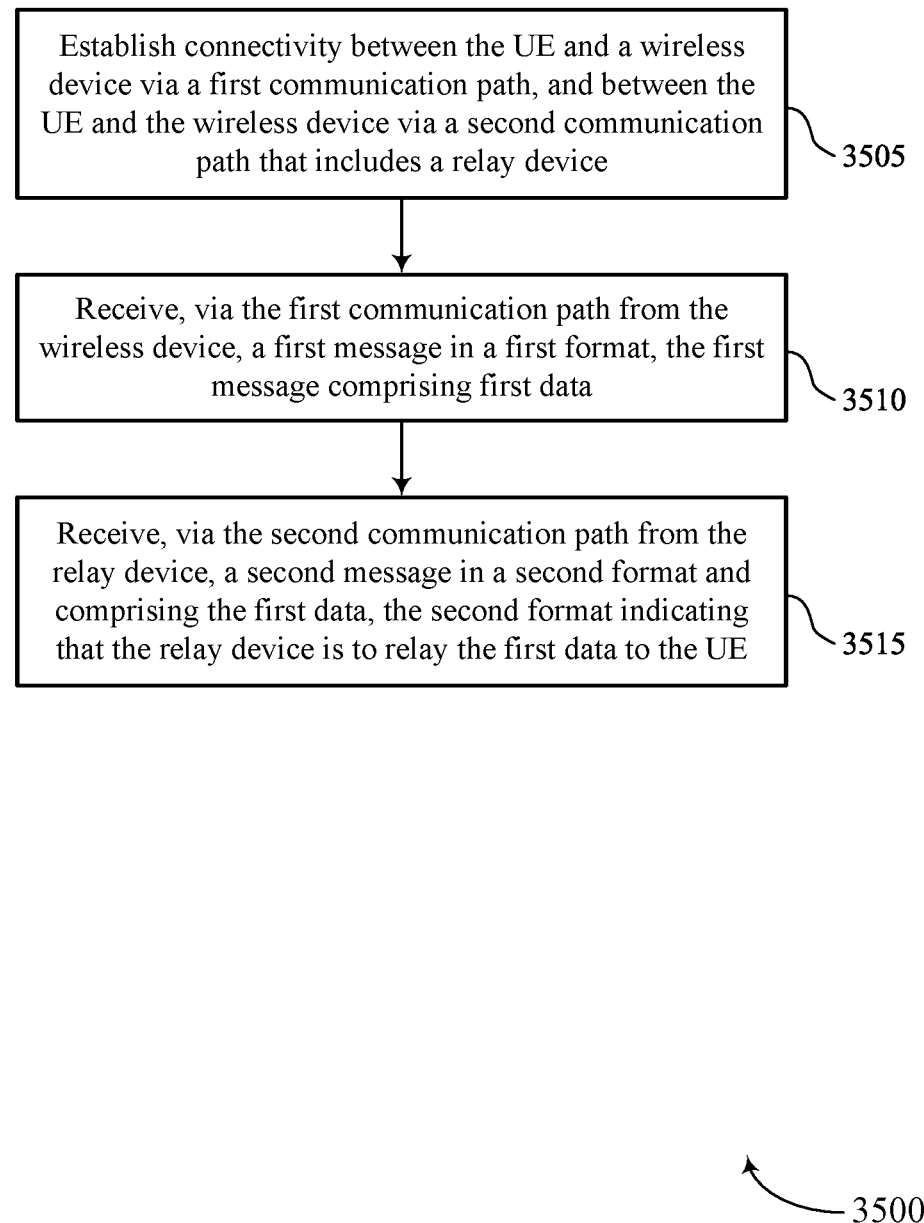

FIG. 35 shows a flowchart illustrating a method 3500 that supports architecture and protocols to support industrial IoT and wireless PLC communications in accordance with aspects of the present disclosure. The operations of the method 3500 may be implemented by a UE or its components as described herein. For example, the operations of the method 3500 may be performed by a UE 115 as described with reference to FIGS. 1 through 24. In some examples, a UE may execute a set of instructions to control the functional elements of the UE to perform the described functions. Additionally, or alternatively, the UE may perform aspects of the described functions using special-purpose hardware.

At 3505, the method may include establishing connectivity between the UE and a wireless device via a first communication path, and between the UE and the wireless device via a second communication path that includes a relay device. The operations of 3505 may be performed in accordance with examples as disclosed herein. In some examples, aspects of the operations of 3505 may be performed by a communication path manager 2325 as described with reference to FIG. 23.

At 3510, the method may include receiving, via the first communication path from the wireless device, a first message in a first format, the first message including first data. The operations of 3510 may be performed in accordance with examples as disclosed herein. In some examples, aspects of the operations of 3510 may be performed by a first message format manager 2330 as described with reference to FIG. 23.

At 3515, the method may include receiving, via the second communication path from the relay device, a second message in a second format and including the first data, the second format indicating that the relay device is to relay the first data to the UE. The operations of 3515 may be performed in accordance with examples as disclosed herein. In some examples, aspects of the operations of 3515 may be performed by a second message format manager 2335 as described with reference to FIG. 23.

The following provides an overview of aspects of the present disclosure:

Aspect 1: A method for wireless communication at wireless device, comprising: establishing connectivity between the wireless device and a UE via a first communication path, and between the wireless device and the UE via a second communication path that includes a relay device; transmitting, via the first communication path, a first message in a first format to the UE, the first message comprising first data; and transmitting, via the second communication path to the relay device, a second message in a second format and comprising the first data, the second format indicating that the relay device is to relay the first data to the UE.

Aspect 2: The method of aspect 1, wherein establishing the connectivity between the wireless device and the UE via the first communication path comprises: transmitting a connection configuration message based at least in part on a management layer determination to establish the first communication path; and receiving a configuration response message indicating a network address associated with the UE via the first communication path based at least in part on the connection configuration message.

Aspect 3: The method of any of aspects 1 through 2, wherein establishing the connectivity between the wireless device and the UE via the second communication path comprises: transmitting, to the relay device, a first connection configuration message based at least in part on a management layer determination to establish the second communication path; and receiving, from the relay device, a configuration response message indicating a forwarding network address associated with the second communication path based at least in part on the first connection configuration message.

Aspect 4: The method of aspect 3, wherein establishing the connectivity between the wireless device and the UE via the first communication path comprises: transmitting, to the relay device, a message transfer request for establishing a bearer context for communicating with the UE via the first communication path; receiving, from the relay device, a bearer context configuration for communicating bearer traffic between the wireless device and the UE based at least in part on the message transfer request; transmitting, to the UE, a configuration message indicating the bearer context configuration, wherein the first data transmitted via the first communication path is bearer data.

Aspect 5: The method of any of aspects 1 through 4, wherein establishing the connectivity between the wireless device and the UE via the second communication path comprises: forwarding, to the relay device, a measurement report based at least in part on receiving the measurement report from the UE; receiving, from the relay device, a connection configuration transfer message for a secondary cell addition procedure; and transmitting, to the relay device, a first connection configuration message based at least in part on receiving the connection configuration transfer message.

Aspect 6: The method of any of aspects 1 through 5, wherein the second message is transmitted via an X2 interface between the wireless device and the relay device.

Aspect 7: The method of any of aspects 1 through 6, further comprising: receiving a negative feedback message from the UE or determining that the first message was associated with an error, wherein the second message is transmitted based at least in part on the negative feedback message or the error.

Aspect 8: The method of any of aspects 1 through 7, wherein a central unit of the wireless device comprises a user plane.

Aspect 9: The method of aspect 8, wherein the central unit of the wireless device further comprises a control plane.

Aspect 10: The method of any of aspects 1 through 9, wherein the wireless device comprises a programmable logic controller, an integrated access and backhaul node, or a base station.

Aspect 11: The method of any of aspects 1 through 10, wherein the relay device comprises a central base station or a donor base station connected to an internet provider or a network entity.

Aspect 12: The method of any of aspects 1 through 11, wherein the first message and the second message are transmitted simultaneously.

Aspect 13: A method for wireless communication at a relay device, comprising: receiving, from a wireless device via a first portion of a path, a first message in a first format and comprising a first data, the first format indicating that the relay device is to relay the first data to a UE, the first portion associated with a first type of communications link; and transmitting, to the UE via a second portion of the path, a second message in a second format and comprising the first data, the second portion associated with a second type of communications link.

Aspect 14: The method of aspect 13, further comprising: receiving, from the wireless device, a first connection configuration message based at least in part on a management layer determination to establish the path; and transmitting, to the wireless device, a configuration response message indicating a forwarding network address associated with the path based at least in part on the first connection configuration message.

Aspect 15: The method of any of aspects 13 through 14, further comprising: receiving, from the wireless device, a measurement report associated with the UE; transmitting, to the wireless device, a connection configuration transfer message for a secondary cell addition procedure; and receiving, from the wireless device, a first connection configuration message based at least in part on receiving the connection configuration transfer message.

Aspect 16: The method of any of aspects 13 through 15, wherein the second message in the second format is transmitted via L2 radio link control signaling, L3 internet protocol signaling, or L2 backhaul adaption protocol signaling.

Aspect 17: A method for wireless communication at a UE, comprising: establishing connectivity between the UE and a wireless device via a first communication path, and between the UE and the wireless device via a second communication path that includes a relay device; receiving, via the first communication path from the wireless device, a first message in a first format, the first message comprising first data; and receiving, via the second communication path from the relay device, a second message in a second format and comprising the first data, the second format indicating that the relay device is to relay the first data to the UE.

Aspect 18: The method of aspect 17, further comprising: transmitting, to the wireless device via the first communication path or the second communication path, a negative feedback message, wherein receiving the second message is based at least in part on transmitting the negative feedback message.

Aspect 19: An apparatus for wireless communication at wireless device, comprising a processor; memory coupled with the processor; and instructions stored in the memory and executable by the processor to cause the apparatus to perform a method of any of aspects 1 through 12.

Aspect 20: An apparatus for wireless communication at wireless device, comprising at least one means for performing a method of any of aspects 1 through 12.

Aspect 21: A non-transitory computer-readable medium storing code for wireless communication at wireless device, the code comprising instructions executable by a processor to perform a method of any of aspects 1 through 12.

Aspect 22: An apparatus for wireless communication at a relay device, comprising a processor; memory coupled with the processor; and instructions stored in the memory and executable by the processor to cause the apparatus to perform a method of any of aspects 13 through 16.

Aspect 23: An apparatus for wireless communication at a relay device, comprising at least one means for performing a method of any of aspects 13 through 16.

Aspect 24: A non-transitory computer-readable medium storing code for wireless communication at a relay device, the code comprising instructions executable by a processor to perform a method of any of aspects 13 through 16.

Aspect 25: An apparatus for wireless communication at a UE, comprising a processor; memory coupled with the processor; and instructions stored in the memory and executable by the processor to cause the apparatus to perform a method of any of aspects 17 through 18.

Aspect 26: An apparatus for wireless communication at a UE, comprising at least one means for performing a method of any of aspects 17 through 18.

Aspect 27: A non-transitory computer-readable medium storing code for wireless communication at a UE, the code comprising instructions executable by a processor to perform a method of any of aspects 17 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at wireless device, comprising:
 a processor;
 memory coupled with the processor; and
 instructions stored in the memory and executable by the processor to cause the apparatus to:
  establish connectivity between the wireless device and a user equipment (UE) via a first communication path, and between the wireless device and the UE via a second communication path that includes a relay device;
  transmit, via the first communication path, a first message in a first format to the UE, the first message comprising first data; and
  transmit, via the second communication path to the relay device, a second message in a second format and comprising the first data, the second format indicating that the relay device is to relay the first data to the UE,
  wherein the instructions to establish the connectivity between the wireless device and the UE via the second communication path are executable by the processor to cause the apparatus to:
   forward, to the relay device, a measurement report based at least in part on receiving the measurement report from the UE;
   receive, from the relay device, a connection configuration transfer message for a secondary cell addition procedure; and
   transmit, to the relay device, a first connection configuration message based at least in part on receiving the connection configuration transfer message.

2. The apparatus of claim 1, wherein the instructions to establish the connectivity between the wireless device and the UE via the first communication path are executable by the processor to cause the apparatus to:
 transmit a connection configuration message based at least in part on a management layer determination to establish the first communication path; and
 receive a configuration response message indicating a network address associated with the UE via the first communication path based at least in part on the connection configuration message.

3. The apparatus of claim 1, wherein:
 the second message is transmitted via an X2 interface between the wireless device and the relay device.

4. The apparatus of claim 1, wherein the instructions are further executable by the processor to cause the apparatus to:
 receive a negative feedback message from the UE or determining that the first message was associated with an error, wherein:
  the second message is transmitted based at least in part on the negative feedback message or the error.

5. The apparatus of claim 1, wherein:
 a central unit of the wireless device comprises a user plane.

6. The apparatus of claim 5, wherein:
 the central unit of the wireless device further comprises a control plane.

7. The apparatus of claim 1, wherein:
 the wireless device comprises a programmable logic controller, an integrated access and backhaul node, or a base station.

8. The apparatus of claim 1, wherein:
the relay device comprises a central base station or a donor base station connected to an internet provider or a network entity.

9. The apparatus of claim 1, wherein:
the first message and the second message are transmitted simultaneously.

10. An apparatus for wireless communication at a relay device, comprising:
a processor;
memory coupled with the processor; and
instructions stored in the memory and executable by the processor to cause the apparatus to:
receive, from a wireless device, a measurement report associated with a user equipment (UE);
transmit, to the wireless device, a connection configuration transfer message for a secondary cell addition procedure;
receive, from the wireless device, a first connection configuration message for a path based at least in part on receiving the connection configuration transfer message;
receive, from the wireless device via a first portion of the path, a first message in a first format and comprising a first data, the first format indicating that the relay device is to relay the first data to a UE, the first portion associated with a first type of communications link; and
transmit, to the UE via a second portion of the path, a second message in a second format and comprising the first data, the second portion associated with a second type of communications link.

11. The apparatus of claim 10, wherein:
the second message in the second format is transmitted via L2 radio link control signaling, L3 internet protocol signaling, or L2 backhaul adaption protocol signaling.

12. An apparatus for wireless communication at a user equipment (UE), comprising:
a processor;
memory coupled with the processor; and
instructions stored in the memory and executable by the processor to cause the apparatus to:
establish connectivity between the UE and a wireless device via a first communication path, and between the UE and the wireless device via a second communication path that includes a relay device;
receive, via the first communication path from the wireless device, a first message in a first format, the first message comprising first data; and
receive, via the second communication path from the relay device, a second message in a second format and comprising the first data, the second format indicating that the relay device is to relay the first data to the UE,
wherein the instructions to establish the connectivity between the UE and the wireless device via the second communication path are executable by the processor to cause the apparatus to:
transmit, to the wireless device, a measurement report based at least in part on receiving a UE capability enquiry from the relay device; and
receive, from the relay device and based at least in part on the measurement report, a secondary cell activation message associated with the second communication path.

13. The apparatus of claim 12, wherein the instructions are further executable by the processor to cause the apparatus to:
transmit, to the wireless device via the first communication path or the second communication path, a negative feedback message, wherein receiving the second message is based at least in part on transmitting the negative feedback message.

14. A method for wireless communication at wireless device, comprising:
establishing connectivity between the wireless device and a user equipment (UE) via a first communication path, and between the wireless device and the UE via a second communication path that includes a relay device;
transmitting, via the first communication path, a first message in a first format to the UE, the first message comprising first data; and
transmitting, via the second communication path to the relay device, a second message in a second format and comprising the first data, the second format indicating that the relay device is to relay the first data to the UE,
wherein establishing the connectivity between the wireless device and the UE via the second communication path comprises:
transmitting, to the relay device, a first connection configuration message based at least in part on a management layer determination to establish the second communication path; and
receiving, from the relay device, a configuration response message indicating a forwarding network address associated with the second communication path based at least in part on the first connection configuration message; and
wherein establishing the connectivity between the wireless device and the UE via the first communication path comprises:
transmitting, to the relay device, a message transfer request for establishing a bearer context for communicating with the UE via the first communication path;
receiving, from the relay device, a bearer context configuration for communicating bearer traffic between the wireless device and the UE based at least in part on the message transfer request; and
transmitting, to the UE, a configuration message indicating the bearer context configuration, wherein the first data transmitted via the first communication path is bearer data.

15. The method of claim 14, wherein establishing the connectivity between the wireless device and the UE via the first communication path comprises:
transmitting a connection configuration message based at least in part on a management layer determination to establish the first communication path; and
receiving a configuration response message indicating a network address associated with the UE via the first communication path based at least in part on the connection configuration message.

16. The method of claim 14, further comprising:
receiving a negative feedback message from the UE or determining that the first message was associated with an error, wherein:
the second message is transmitted based at least in part on the negative feedback message or the error.

17. A method for wireless communication at a relay device, comprising:

receiving, from a wireless device, a first connection configuration message;

transmitting, to the wireless device, a configuration response message indicating a forwarding network address associated with a second communication path based at least in part on the first connection configuration message;

receiving, form the wireless device, a message transfer request for establishing a bearer context for communicating with a user equipment (UE) via a first communication path;

transmitting, to the wireless device, a bearer context configuration for communicating bearer traffic between the wireless device and the UE based at least in part on the message transfer request;

receiving, from the wireless device via a first portion of the second communication path, a first message in a first format and comprising a first data, the first format indicating that the relay device is to relay the first data to a UE, the first portion associated with a first type of communications link; and transmitting, to the UE via a second portion of the second communication path, a second message in a second format and comprising the first data, the second portion associated with a second type of communications link.

18. The method of claim 17, wherein:

the second message in the second format is transmitted via L2 radio link control signaling, L3 internet protocol signaling, or L2 backhaul adaption protocol signaling.

19. A method for wireless communication at a user equipment (UE), comprising:

establishing connectivity between the UE and a wireless device via a first communication path, and between the UE and the wireless device via a second communication path that includes a relay device;

receiving, via the first communication path from the wireless device, a first message in a first format, the first message comprising first data; and receiving, via the second communication path from the relay device, a second message in a second format and comprising the first data, the second format indicating that the relay device is to relay the first data to the UE, wherein establishing the connectivity between the UE and the wireless device via the second communication path comprises:

transmitting, to the wireless device, a measurement report based at least in part on receiving a UE capability enquiry from the relay device; and receiving, from the relay device and based at least in part on the measurement report, a secondary cell activation message associated with the second communication path.

20. The method of claim 19, further comprising:

transmitting, to the wireless device via the first communication path or the second communication path, a negative feedback message, wherein:

receiving the second message is based at least in part on transmitting the negative feedback message.

* * * * *